(12) United States Patent
Hunt

(10) Patent No.: US 10,920,737 B2
(45) Date of Patent: Feb. 16, 2021

(54) ENGINE IGNITION TIMING AND POWER SUPPLY SYSTEM

(71) Applicant: Continental Motors, Inc., Mobile, AL (US)

(72) Inventor: Jeffrey K. Hunt, Bay Minette, AL (US)

(73) Assignee: Continental Motors, Inc., Mobile, AL (US)

( * ) Notice: Subject to any disclaimer, the term of this patent is extended or adjusted under 35 U.S.C. 154(b) by 0 days.

(21) Appl. No.: 16/848,074

(22) Filed: Apr. 14, 2020

(65) Prior Publication Data

US 2020/0240383 A1    Jul. 30, 2020

Related U.S. Application Data

(63) Continuation of application No. 16/361,104, filed on Mar. 21, 2019, now Pat. No. 10,753,335.

(Continued)

(51) Int. Cl.
  *F02P 1/00* (2006.01)
  *F02P 5/06* (2006.01)
  (Continued)

(52) U.S. Cl.
  CPC ............ *F02P 5/06* (2013.01); *B64D 27/04* (2013.01); *F02P 1/00* (2013.01); *F02P 3/00* (2013.01); *F02P 3/08* (2013.01)

(58) Field of Classification Search
  CPC ...... F02P 1/00; F02P 1/005; F02P 3/00; F02P 5/00; F02P 5/05
  See application file for complete search history.

(56) References Cited

U.S. PATENT DOCUMENTS 2,367,023 A * 1/1945 Horton ..................... 123/640
2,608,603 A * 8/1952 Azola ...................... F02P 5/02
                                                          324/391

(Continued)

FOREIGN PATENT DOCUMENTS

DE    3539407         5/1987
DE    3539407 A1      5/1987

(Continued)

OTHER PUBLICATIONS

Savier, Klaus; "Installation and Operation Manual for Plasma III, II+, and II CDI Systems Four and Six Cylinder Installations"; Light Speed Engineering, LLC; Version Mar. 17, 2013; 45 pages.

(Continued)

*Primary Examiner* — Thomas N Moulis
(74) *Attorney, Agent, or Firm* — Winstead PC

(57) ABSTRACT

An internal combustion engine for an aircraft can include a crankshaft configured to drive a propeller; a camshaft coupled to the crankshaft; and an ignition controller coupled to the camshaft and including a visual indicator, the visual indicator configured to produce a visual signal at a predetermined angular position of the engine. An ignition controller for an internal combustion engine can include a housing and a P-lead connection extending from the housing, the ignition controller configured to selectively supply or cut main electrical power from the engine via the P-lead connection, the ignition controller also configured to selectively supply its own power.

4 Claims, 35 Drawing Sheets

US 10,920,737 B2

Page 2

Related U.S. Application Data

(60) Provisional application No. 62/647,627, filed on Mar. 23, 2018, provisional application No. 62/646,906, filed on Mar. 22, 2018.

(51) Int. Cl.
*B64D 27/04* (2006.01)
*F02P 3/00* (2006.01)
*F02P 3/08* (2006.01)

(56) References Cited

U.S. PATENT DOCUMENTS

| | | | |
|---|---|---|---|
| 2,944,122 A * | 7/1960 | Thedick | F02P 5/02 200/19.21 |
| 3,076,332 A * | 2/1963 | Lopes | G01B 5/003 73/114.64 |
| 3,505,864 A * | 4/1970 | Crawford | F02P 17/04 73/114.64 |
| 3,781,655 A | 12/1973 | Lane | |
| 3,883,795 A * | 5/1975 | Klein | F02P 17/10 324/392 |
| 4,054,114 A * | 10/1977 | Saita | F02P 5/145 123/640 |
| 4,072,891 A | 2/1978 | Campbell | |
| 4,177,781 A | 12/1979 | Marchelletta et al. | |
| 4,198,942 A * | 4/1980 | Kuroda | F02P 15/02 123/406.48 |
| 4,229,687 A | 10/1980 | Newman | |
| 4,359,037 A | 11/1982 | Stangl | |
| 4,454,856 A | 6/1984 | Fox et al. | |
| 4,473,752 A | 9/1984 | Cronin | |
| 4,494,372 A | 1/1985 | Cronin | |
| 4,871,970 A * | 10/1989 | Liebergesell | F02P 17/02 324/389 |
| 5,083,544 A | 1/1992 | Brighigna | |
| 5,170,125 A | 12/1992 | Bates, Jr. | |
| 5,184,080 A | 2/1993 | Remmers | |
| 5,233,960 A * | 8/1993 | Kato | F02P 17/04 123/146.5 A |
| 5,309,081 A | 5/1994 | Shah et al. | |
| 5,331,935 A * | 7/1994 | Daino | F02N 11/087 123/179.5 |
| 5,513,617 A | 5/1996 | Bass | |
| 5,531,402 A | 7/1996 | Dahl | |
| 5,587,647 A | 12/1996 | Bansal et al. | |
| 5,610,450 A | 3/1997 | Saeki et al. | |
| 5,630,384 A | 5/1997 | Mottier et al. | |
| 5,654,859 A | 8/1997 | Shi | |
| 5,671,714 A * | 9/1997 | Fukui | F02D 41/009 123/406.62 |
| 5,713,338 A * | 2/1998 | Wheeler | F02P 15/008 123/637 |
| 5,729,059 A | 3/1998 | Kilroy et al. | |
| 5,754,011 A | 5/1998 | Frus et al. | |
| 5,764,502 A | 6/1998 | Morgan et al. | |
| 5,875,763 A * | 3/1999 | Mottier | F02P 3/0456 123/406.13 |
| 5,892,299 A | 4/1999 | Siewert et al. | |
| 5,899,411 A | 5/1999 | Latos et al. | |
| 5,954,037 A * | 9/1999 | Grimes | F02P 3/02 123/609 |
| 5,977,645 A | 11/1999 | Glennon | |
| 6,018,233 A | 1/2000 | Glennon | |
| 6,098,591 A | 8/2000 | Iwata | |
| 6,142,418 A | 11/2000 | Weber et al. | |
| 6,157,168 A | 12/2000 | Malik | |
| 6,191,536 B1 | 2/2001 | Dolmovich | |
| 6,225,708 B1 | 5/2001 | Furukawa et al. | |
| 6,279,519 B1 | 8/2001 | Nagel et al. | |
| 6,344,700 B1 | 2/2002 | Eisenhauer et al. | |
| 6,351,090 B1 | 2/2002 | Boyer et al. | |
| 6,353,293 B1 | 3/2002 | Frus et al. | |
| 6,357,427 B1 | 3/2002 | Luttrelll et al. | |
| 6,405,708 B1 * | 6/2002 | Watson | F02B 75/243 123/406.6 |
| 6,459,175 B1 | 10/2002 | Potega | |
| 6,624,533 B1 | 9/2003 | Swanson et al. | |
| 6,745,748 B2 * | 6/2004 | Kobayashi | F02D 41/009 123/406.13 |
| 6,789,533 B1 | 9/2004 | Hashimoto et al. | |
| 7,002,265 B2 | 2/2006 | Potega | |
| 7,162,998 B1 | 1/2007 | Bartlett et al. | |
| 7,205,681 B2 | 4/2007 | Nguyen | |
| 7,242,167 B2 | 7/2007 | Patterson | |
| 7,339,809 B2 | 3/2008 | Bennett et al. | |
| 7,377,258 B2 | 5/2008 | Ishikawa et al. | |
| 7,439,634 B2 | 10/2008 | Michalko | |
| 7,503,209 B2 * | 3/2009 | Platt | F02D 35/023 73/114.61 |
| 7,508,086 B2 | 3/2009 | Huang et al. | |
| 7,538,521 B2 | 5/2009 | Berenger | |
| 7,554,303 B1 | 6/2009 | Kawamura | |
| 7,568,382 B2 | 8/2009 | Pruszenski | |
| 7,635,922 B2 | 12/2009 | Becker | |
| 7,663,264 B2 | 2/2010 | Dubois et al. | |
| 7,675,194 B2 | 3/2010 | Guillot | |
| 7,687,927 B2 | 3/2010 | Shander et al. | |
| 7,875,989 B2 | 1/2011 | Morris et al. | |
| 8,015,962 B2 * | 9/2011 | Lysinger | F02D 41/009 123/406.58 |
| 8,069,838 B2 | 12/2011 | Tseng et al. | |
| 8,131,406 B2 | 3/2012 | Morris et al. | |
| 8,237,416 B2 | 8/2012 | Rozman et al. | |
| 8,490,598 B2 | 7/2013 | Qu et al. | |
| 8,657,227 B1 | 2/2014 | Bayliss et al. | |
| 8,941,265 B2 | 1/2015 | Oldenburg et al. | |
| 9,246,425 B2 | 1/2016 | Palfreyman et al. | |
| 10,014,707 B2 | 7/2018 | Rideau et al. | |
| 2004/0053082 A1 | 3/2004 | McCluskey et al. | |
| 2004/0149269 A1 * | 8/2004 | Karem | F02D 41/0082 123/481 |
| 2005/0006956 A1 | 1/2005 | Shi | |
| 2006/0016423 A1 | 1/2006 | Kuo et al. | |
| 2006/0042846 A1 | 3/2006 | Kojori et al. | |
| 2006/0061213 A1 | 3/2006 | Michalko | |
| 2006/0102801 A1 | 5/2006 | Manley | |
| 2006/0118157 A1 | 6/2006 | Johnson et al. | |
| 2006/0125321 A1 | 6/2006 | Olsen | |
| 2006/0130811 A1 * | 6/2006 | Carlson | F02P 7/061 123/406.53 |
| 2006/0152085 A1 | 7/2006 | Flett et al. | |
| 2006/0168968 A1 | 8/2006 | Zielinski et al. | |
| 2006/0235601 A1 | 10/2006 | Uruno et al. | |
| 2006/0267411 A1 | 11/2006 | Farmer | |
| 2007/0139019 A1 | 6/2007 | Wiegman et al. | |
| 2008/0027620 A1 | 1/2008 | Feuerlinger et al. | |
| 2008/0211237 A1 | 9/2008 | Berenger | |
| 2008/0258560 A1 | 10/2008 | Dubois et al. | |
| 2009/0200870 A1 | 8/2009 | Uno et al. | |
| 2009/0229569 A1 | 9/2009 | Glugla et al. | |
| 2013/0219905 A1 | 8/2013 | Marconi et al. | |
| 2015/0360630 A1 | 12/2015 | Rideau et al. | |
| 2015/0360793 A1 * | 12/2015 | Horn | B64D 37/04 244/118.2 |
| 2017/0122282 A1 * | 5/2017 | Cathcart | F02P 9/007 |
| 2018/0142665 A1 * | 5/2018 | Dement | B64D 31/04 |
| 2018/0187604 A1 | 7/2018 | Poumarede et al. | |
| 2019/0128230 A1 * | 5/2019 | Ihde | H02K 11/20 |

FOREIGN PATENT DOCUMENTS

| | | |
|---|---|---|
| EP | 1050672 | 11/2000 |
| EP | 1050672 A2 | 11/2000 |
| EP | 1075724 | 2/2001 |
| EP | 1075724 A1 | 2/2001 |
| FR | 2694341 | 2/1994 |
| FR | 2694341 A1 | 2/1994 |
| KR | 20040018612 | 3/2004 |
| KR | 20040018612 A | 3/2004 |
| WO | 2006087379 | 12/1999 |
| WO | WO 9963212 | 12/1999 |

(56) References Cited

FOREIGN PATENT DOCUMENTS

| WO | WO-9963212 A1 | 12/1999 |
|---|---|---|
| WO | WO-2006087379 | 12/1999 |
| WO | 2006121425 | 11/2006 |
| WO | WO-2006121425 | 11/2006 |

OTHER PUBLICATIONS

Eastern Technology Corporation; Article entitled: "Aircraft Magneto Timing Light Model E50", located at <http://www.easterntech.com/e50.html>, accessed on Oct. 6, 2017, 1 pg.
Instructions for "Model E-50 Magneto Sy7nchronizer", publicly available prior to Mar. 22, 2019, 1 pg.
Laude, David; Artilce entltitled: "Ideal Diode Controller Elminates Energy Wasting Diodes in Power OR-ing Applications", Linear Technology, vol. X11 No. 4, published Dec. 2002, 4 pgs.
Linear Technology; Advertisement for "Ideal Diode Controller Eliminates Energy Wasting Diodesin Power OR-ing Applications—Design Note 1003", Copyright 2003, 2pgs.
Linear Technology; Data Sheet for "Low Loss PowerPath Controller in ThinSOT", Copyright 2002, 14 pgs.
Pilotshop.com; Article entitled: "Eastern Electronics Magneto Timing Light—Model E50", located at <http://www.pilotshop.com/catalog/topages/magneto-timlt.php>, accessed on Oct. 6, 2017, 3 pgs.
Teledyne Continental Motors, Inc.; Service Bulletin MSB94-8D for Magneto to Engine Timing, Copyright 2010, 7 pgs.
US Dept of Transportation; Advisory Circular AC33.28-3, published May 23, 2014, 81 pgs.
E-MAG Ignitions; Installation and Operating Guide to E-MAG Ignition Models E-114 and P-114 for Lycoming 4 Cylinder and Continental O-200 Engines, publicly available prior to Mar. 22, 2018, 28 pgs.
Teledyne Continental Motors, Inc.; Brochure for Tips on Engine Care, copyright 2010, 73 pgs.
Hunt, Jeffrey K.; Invitation to Pay Additional Fees for PCT/US2019/023479, filed Mar. 21, 2019, dated May 30, 2019, 2 pgs.
Hunt, Jeffrey K.; Invititation to Pay Additional Fees for PCT/US2019/023480, filed Mar. 21, 2019, dated May 2, 2019, 2 pgs.
Hunt, Jeffrey K.; Invitation to Pay Additional Fees for PCT/US2019/023481, filed Mar. 21, 2019, dated May 2, 2019, 2 pgs.
Champion Aerospace; Brochure for SlickSTART, copyright 2009, 2 pgs.
Champion Aerospace; Article entitled: "Electronic Ignition", located at <http://www.g3ignition.com>, publicly available prior to Mar. 22, 2018, 4 pgs.
G3i Ignition; Artilce entitled: "Electronic aircraft ignition system", located at <http://www.g3ignition.com>, publicly available to Mar. 22, 2018, 2 pgs.
Champion Aerospace; Brochure for SlickSTART, published Mar. 21, 2017, 2 pgs.
Continental Aerospace Technologies, ARticle entitled: "Ignition Systems", located at <http://www.continentalmotors.aero/parts/ignition-systems.aspx>, publicly available prior to Mar. 22, 2018, 6 pgs.
Federal Aviation Administration; FAA Approved Model List (AML) No. SA02987CH, issued Jul. 5, 2011, 9 pgs.
Electroair Acquisistion Corp; FAA Approved Flight Manual Supplement for System Installation of EIS-41000, publicly available prior to Mar. 22, 2019, 14 pgs.
Electroair Acquisition Corp; EIS-41000 Installation Manual, published Apr. 26, 2018, 57 pgs.
Electroair Acquisition Corp; EIS-41000 Instructions for Continued Airworthiness, published Jun. 23, 2014, 11 pgs.
Electroair Acquisition Corp; Experimental Installation Manual EIS-1 & EIS-2, published May 13, 2015, 31 pgs.
Light Speed Engineering, LLC; Article entitled: "PLASMA IIII Capacitive Discharge Ignition System", located at <http://lightspeed-aero.com/Products/IgnitionIII.htm>, publicly available prior to Mar. 22, 2018, 2 pgs.
Electroair; Press Release dated Mar. 10, 2015, located at http://www.electroair.net/press_releases.html, 4 pgs.
Flyefii. Article entitled: "System 32", located at <https://www.flyefii.com/sy7stem-32/>, publicly available prior to Mar. 22, 2018, 4pgs.
Flyefii; Article entitled: Downloads and Additional Info, located at <https://www.flyefii.com/downloads/>, publicly available prior to Mar. 22, 2018, 1 pg.
EFII. EFII Ignition System Installation Instructions and User Guide, published Sep. 2013, 15 pgs.
Light Speed Engineering, LLC; Installation and Operation Manual for Plasma III, II+, and II CDI Systems, last updated Mar. 15, 2013, 45 pgs.
Light Speed Engineering, LLC; Plasma II, Plasma II Plus and Plasma III Images, published Feb. 22, 2009, 4 pgs.
Light Speed Engineering, LLC; Plasma I CDI Systems Installation and Operation Manual, copyright 1998, 35 pgs.
Electroair; Article entitled: "Ignition Switch Panel EIS Magneto Configuration", located at <http://www.electroair.net/>, publicly available prior to Mar. 22, 2018, 1 pg.
Surefly Partners, Ltd.; Installation Instructions for SIM4P, revised Jul. 26, 2018, 13 pgs.
Department of Transportation; Supplemental Type Certificate, issued Oct. 31, 2018, 1 pg.
Surefly; Sim4 Hardware Kit, published May 21, 2018, 5 pgs.
Surefly Partners, Ltd.; Instructions for Continued Airworthiness—Sim4P, Sim4N, Sim6C & Sim6L, released Sep. 26, 2018, 7 pgs.
Federal Aviation Administration; FAA Approved Model List (AML) No. SE04349CH, issued Oct. 31, 2018, 11 pgs.
Flyefii; Article entitled: "System 32 EFII Kits", located at <https://www.flyefii.com/oroducts/efii-systems/>, publicly available prior to Mar. 22, 2018, 2 pgs.
E-MAG Ignitions; Article entitled: "114 Series", located at <https://emagair.com/114-series/, publicly available prior to Mar. 22, 2018, 1 pg.

* cited by examiner

| Ignition Switch Position | Left "P-Lead" Input | Right "P-Lead" Input |
|---|---|---|
| Off | Disable | Disable |
| Right | Disable | Generator |
| Left | Generator | Disable |
| Both | Battery & Generator | Battery & Generator |
| Start | Battery & Generator | Battery & Generator |

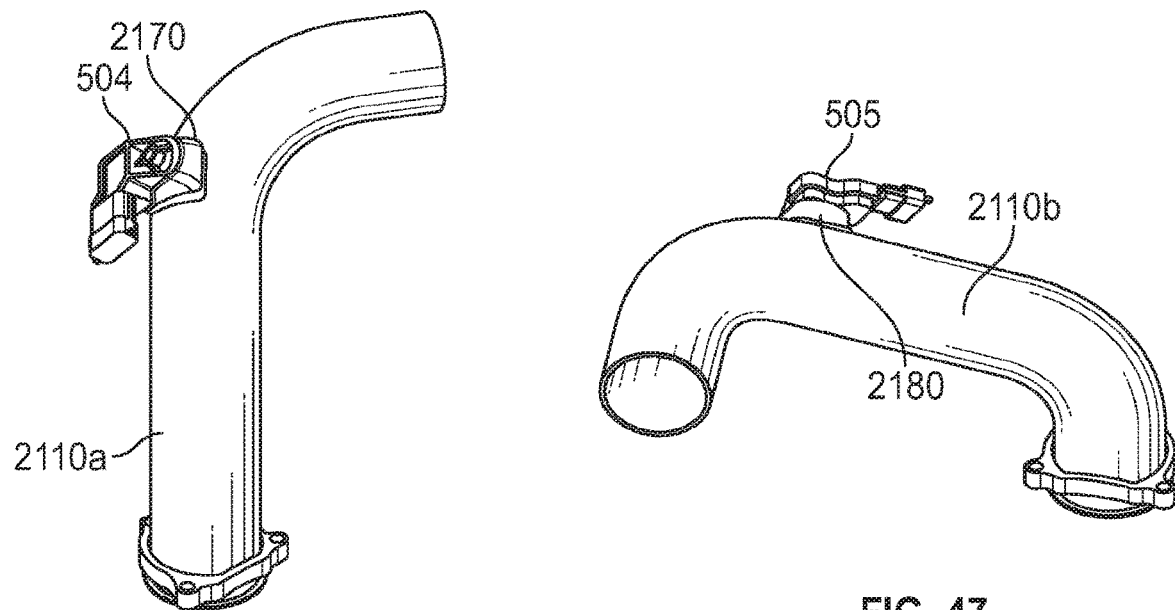
FIG. 46
FIG. 47
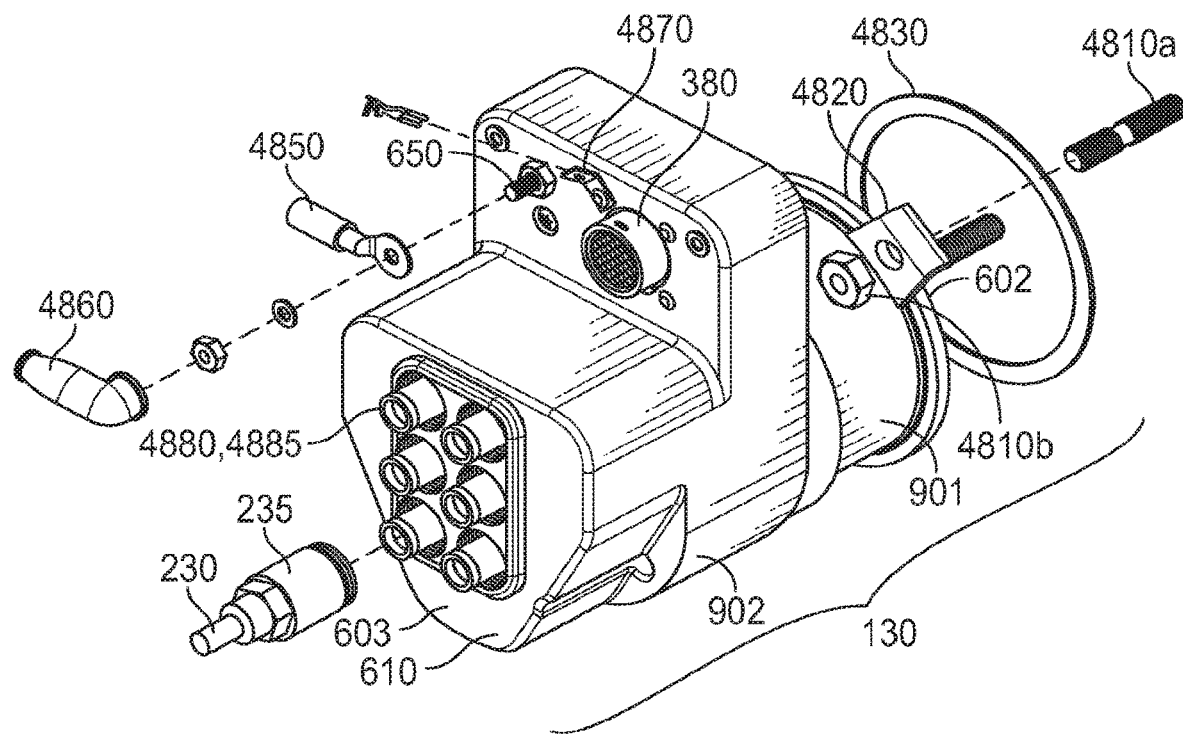
FIG. 48

ENGINE IGNITION TIMING AND POWER SUPPLY SYSTEM

REFERENCE TO RELATED APPLICATIONS

This application is a continuation of U.S. patent application Ser. No. 16/361,104, filed Mar. 21, 2019. U.S. patent application Ser. No. 16/361,104 claims the benefit of U.S. Provisional Application No. 62/647,627, filed Mar. 23, 2018, and the benefit of U.S. Provisional Application No. 62/646,906, filed Mar. 22, 2018. Each of U.S. patent application Ser. No. 16/361,104, U.S. Provisional Application No. 62/647,627, and U.S. Provisional Application No. 62/646,906 is hereby specifically incorporated by reference herein in its entirety.

TECHNICAL FIELD

Field of Use

This disclosure relates to ignition systems for internal combustion engines. More specifically, this disclosure relates to systems for setting, adjusting, and error-checking the ignition system timing and powering of piston-powered aircraft engines.

Related Art

An engine such as an internal combustion engine generally comprises fuel igniting devices that deliver a spark at a particular moment in time matching when a piston and cylinder of the engine reach a certain point in a fuel-air mixture compression cycle. An ignition system as typically designed uses a standard magneto, which is a fairly simple electromechanical device not controlled by any computer program but rather by the position of the engine. A magneto, however, can be cumbersome to synchronize or time initially and can also result in inefficient energy usage due to the lack of input from the engine during operation. In addition, when a magneto fails there is generally no back-up power to keep the ignition system operational other than the back-up magneto, which can also fail.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is an internal combustion engine for an aircraft, the engine comprising: a crankshaft configured to drive a propeller; a camshaft coupled to the crankshaft; and an ignition controller coupled to the camshaft and comprising an indicator; the indicator configured to produce a signal at a predetermined angular position of the engine.

In a further aspect, disclosed is an ignition controller comprising: a body configured to mount in place of a magneto on an internal combustion engine of an aircraft; a permanent magnet generator positioned within the body and configured to supply an independent source of power to the engine; and a visual indicator configured to produce a signal on an outer surface of a body of the ignition controller at a predetermined angular position of the engine during initial synchronization of the ignition controller with the engine.

In yet another aspect, disclosed is a method of timing an internal combustion engine of an aircraft, the method comprising: rotating a crankshaft of the engine to a predetermined angular position of the engine; rotating an ignition controller of the engine with respect to the engine, the ignition controller being an electronic engine controller, the electronic engine controller comprising a permanent magnet generator; activating a visual indicator of the ignition controller when a drive shaft of the ignition controller reaches an angular position that corresponds to the predetermined angular position of the engine; and securing the ignition controller to the engine after the ignition controller reaches the predetermined angular position of the engine.

In yet another aspect, disclosed is an internal combustion engine for an aircraft; the engine comprising: a crankshaft configured to drive a driven element; a first camshaft coupled to the crankshaft; a second camshaft coupled to the crankshaft; a first ignition controller coupled to the first camshaft and comprising an indicator, the indicator configured to produce a signal at a predetermined angular position of the first ignition controller; a P-lead connection of the first ignition controller in electrical communication with a main battery of the aircraft; and a second ignition controller coupled to the second camshaft and comprising an indicator, the indicator configured to produce a signal at a predetermined angular position of the second ignition controller, a P-lead connection of the second ignition controller in electrical communication with a main battery of the aircraft; and a switch connected to each of the P-lead connection of the first ignition controller, the P-lead connection of the second ignition controller; and the main battery, the switch configured to selectively connect to ground or disconnect from the main battery the P-lead connection of the first electronic engine controller and selectively connect to ground or disconnect from the main battery the P-lead connection of the second electronic engine controller.

In yet another aspect, disclosed is an ignition controller comprising: a body configured to mount in place of a magneto on an internal combustion engine; a permanent magnet generator positioned within the body and configured to supply an independent source of power to the engine; and a visual indicator configured to produce a signal on an outer surface of a body of the ignition controller at a predetermined angular position of the engine during initial synchronization of the ignition controller with the engine.

In yet another aspect, disclosed is a method of timing an internal combustion engine of an aircraft, the method comprising: rotating a crankshaft of the engine to a predetermined angular position of the engine; the predetermined angular position of the engine being a one of a full advance and a top dead center position of a number one cylinder of the engine; rotating an ignition controller of the engine with respect to the engine, the ignition controller being an electronic engine controller, the electronic engine controller comprising a permanent magnet generator; activating a visual indicator of the ignition controller when a drive shaft of the ignition controller reaches an angular position that corresponds to the predetermined angular position of the engine; and securing the ignition controller to the engine after the ignition controller reaches the predetermined angular position of the engine.

In yet another aspect, disclosed is a method of testing a pair of electronic engine controllers in an internal combustion engine, the method comprising: grounding a P-lead connection of a first electronic engine controller of the pair of electronic engine controllers while opening a P-lead connection to a second electronic engine controller of the pair of electronic engine controllers; checking for normal operation of the second electronic engine controller while the P-lead connection of the first electronic engine controller is grounded and while the P-lead connection of the second electronic engine controller is open; grounding the P-lead connection of the second electronic engine controller while opening the P-lead connection to the first electronic engine controller; and checking for normal operation of the first electronic engine controller while the P-lead connection of the second electronic engine controller is grounded and while the P-lead connection of the first electronic engine controller is open.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

FIG. 46 is a top front view of a first intake manifold of the engine of FIG. 44, FIG. 47 is a top front view of a second intake manifold of the engine of FIG. 44.

FIG. 48 is a partially exploded view of an EEC of the pair of EEGs of FIG. 45.

DETAILED DESCRIPTION

Figure 1:
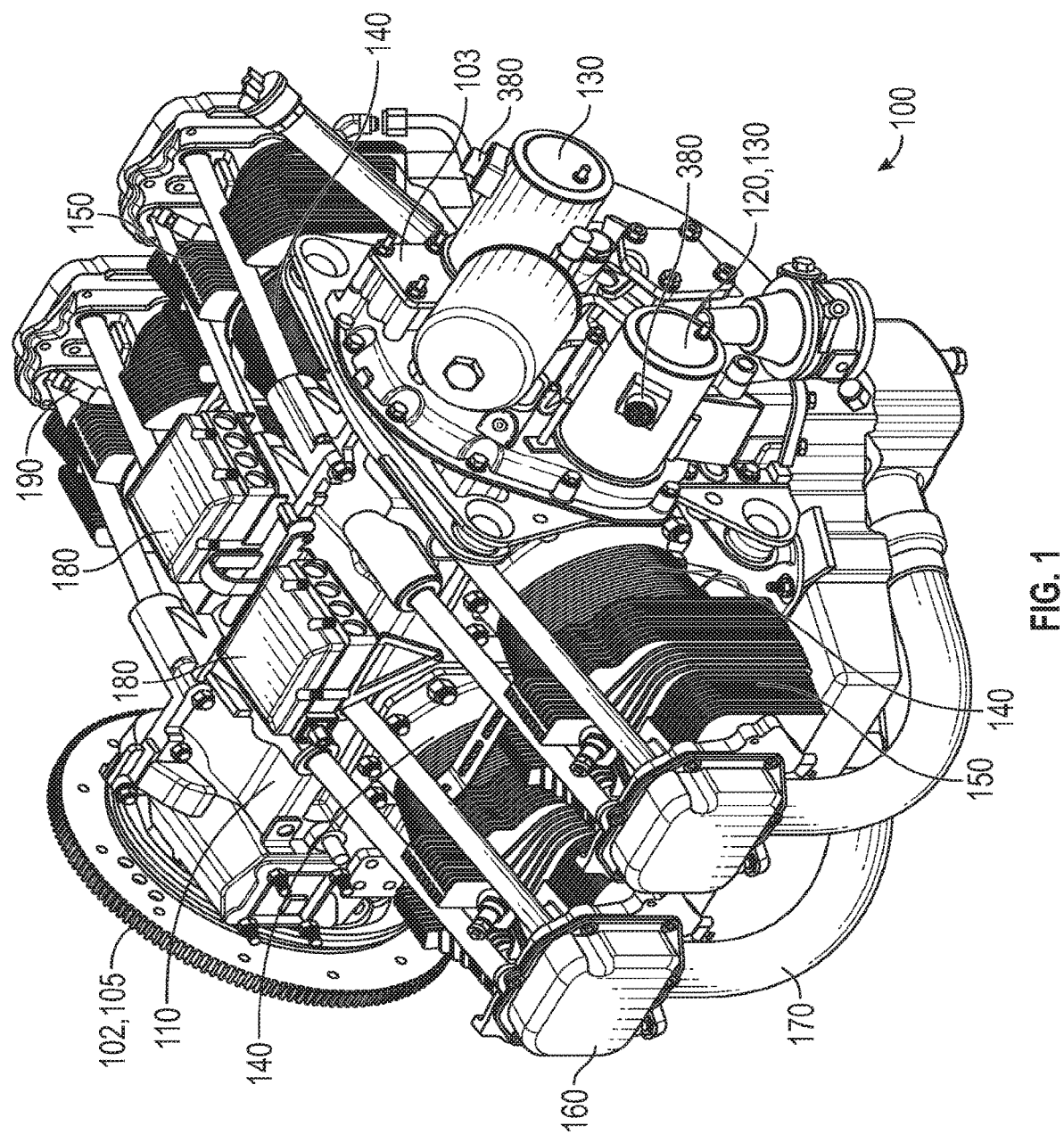
FIG. 1 is a top rear perspective view of an internal combustion engine for a small aircraft comprising an ignition system, the ignition system comprising a pair of electronic engine controllers (EECs), each of which can comprise a permanent magnet generator, and a pair of coil packs, all in accordance with one aspect of the current disclosure and with spark plug wires and other mechanical and electrical components removed.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein; the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

To simplify the description of various elements disclosed herein, the conventions of "left" "right," "front," "rear," "top," "bottom," "upper," "lower," "inside," "outside," "inboard," "outboard," "horizontal," and/or "vertical" may be referenced. Unless stated otherwise, "front" describes that end of the vehicle, engine; system, or component thereof nearest to or facing a forwardmost end the vehicle; "rear" is that end of the vehicle, engine, system, or component that is opposite or distal the front; "left" is that which is to the left of or facing left from a person sitting in the vehicle and facing towards the front; and "right" is that which is to the right of or facing right from that same person while sitting in the vehicle and facing towards the front. "Horizontal" or "horizontal orientation" describes that which is in a plane extending from left to right and aligned with the horizon. "Vertical" or "vertical orientation" describes that which is in a plane that is angled at 90 degrees to the horizontal.

In one aspect, an ignition controller for an engine and associated methods, systems, devices, and various apparatuses are disclosed herein. In one aspect, the ignition controller can comprise a visual indicator to assist in the timing of the engine or a P-lead connection to selectively supply, cut, or test various sources of power connected to the ignition controller.

A vehicle such as an aircraft 80 (shown in FIG. 54) can comprise an internal combustion engine (ICE) 100. As shown in FIG. 1, the engine 100 can be, for example and without limitation, a 4-stroke piston-powered gasoline engine comprising a crankcase 110, which can also be considered an engine block, and a crankshaft (not shown), The engine 100 can further comprise an ignition system 120. The engine 100 and the crankshaft specifically can be configured to drive driven elements such as a propeller (not shown), which can be considered separate from the engine, and components that can be considered part of the engine such as, for example and without limitation, a flywheel 105 and ignition controllers 130.

Figure 3:
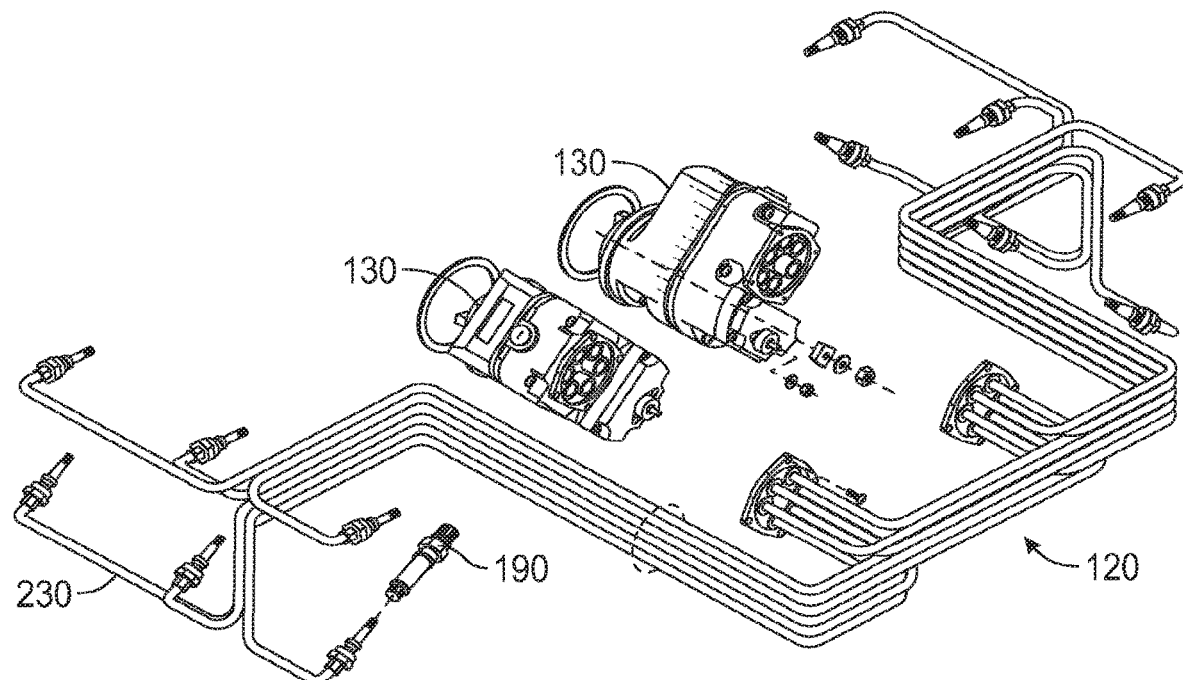
FIG. 3 is a rear perspective view of an ignition system of the engine of FIG. 1 comprising a pair of magnetos in substitution for the ignition system comprising the EECs in accordance with another aspect of the current disclosure.

In some aspects, as shown in FIG. 3, the ignition controller 130 can comprise a magneto. In other aspects, as shown in FIG. 1, the ignition controller 130 can be an electronic engine controller (EEC), which can comprise a permanent magnet generator (PMG) comprising a connection hub 380. The engine 100 can comprise a plurality of camshafts (not shown) to mechanically control fuel and air mixture delivery and exhaust removal into and from each of several combustion chambers (not shown) in the engine 100. Each of the camshafts can control such fuel and air delivery by opening and closing valves (not shown) providing access to the respective combustion chambers. As shown, the engine 100 can define a front end 102, which can be defined at least in part by the flywheel 105, and a rear end 103 disposed distally from the front end 102.

An electronic engine controller (EEC) is contemplated to include any one of a family of electrical or electronic engine control systems including, for example and without limitation, full authority digital engine controls (FADEC), supervisory controls, ignitions systems, and derivatives thereof. FADEC is contemplated to include an EEC in which the primary functions are provided electronically and the EEC has full-range authority over the engine power or thrust. An ignition system is the system in an engine that provides electrical energy to each combustion chamber of an internal combustion engine at the appropriate time.

Figure 9:
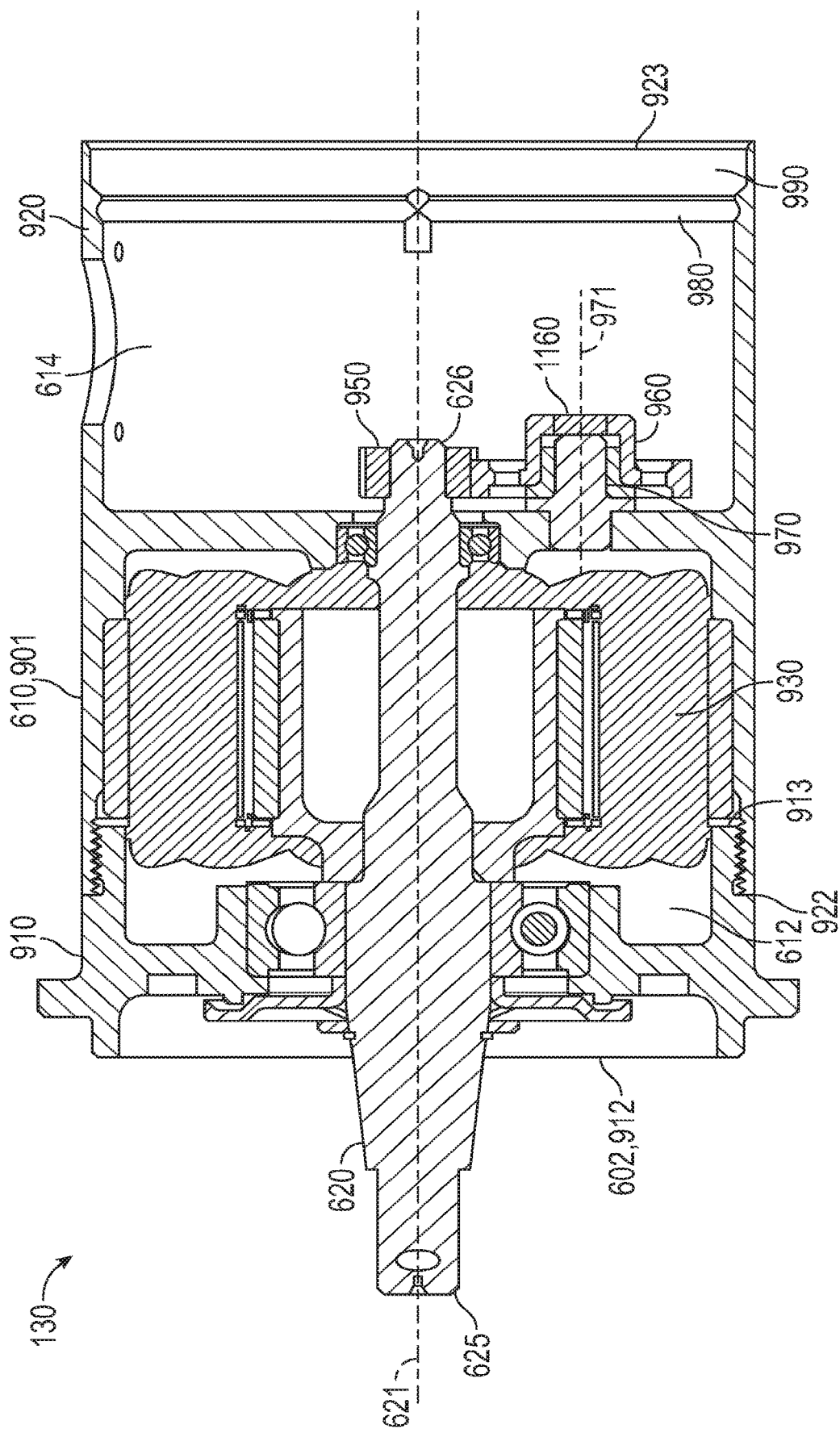
FIG. 9 is a sectional view of the EEC of FIG. 6 taken along line 9-9 of FIG. 6.
Figure 52:
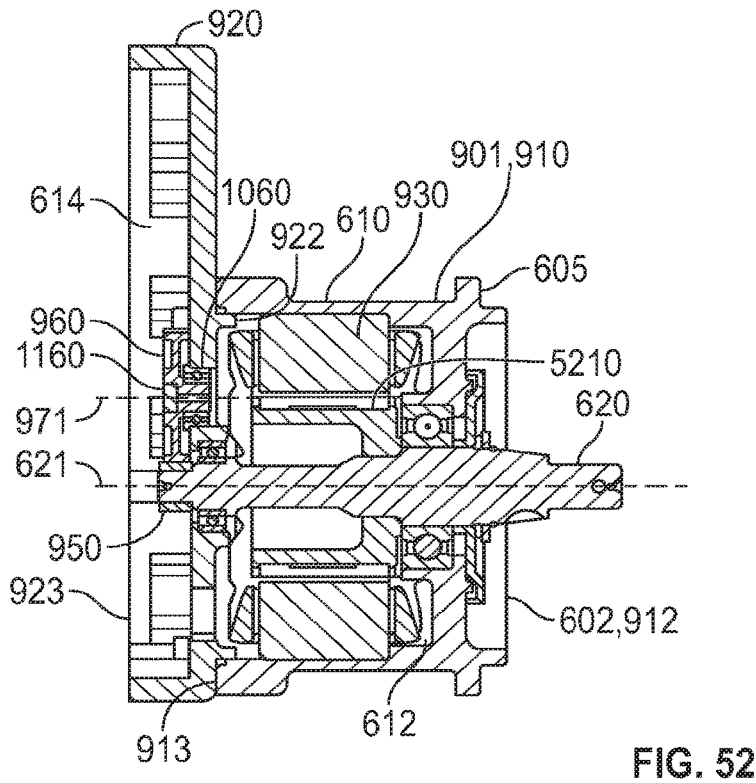
FIG. 52 is a partially exploded sectional view of a first portion of the EEC of FIG. 48 taken from line 52-52 of FIG. 50.

A permanent magnet generator is contemplated to include any device that converts mechanical energy to electrical energy by translating changes in a magnetic field produced by mechanical motion to the electrical energy. In some aspects, a permanent magnet generator can be a direct-current-producing device in which an "armature" in the form of wound wire rotates within or about a permanent magnet "stator." Such a DC power permanent magnet generator, shown in one exemplary aspect in FIG. 9, is sometimes referred to as a "generator" but in a narrower sense than contemplated here. In other aspects, a permanent magnet generator can be an alternating-current-producing device in which a permanent magnet rotor typically rotates within or about a stationary stator—and armature—in the form of wound wire. Such an AC power permanent magnet generator, shown in one exemplary aspect in FIG. 52, is sometimes referred to as an alternator.

Each of the ignition controllers 130 of the ignition system 120 of the engine 100 can be coupled to a drive shaft (not shown) extending from the engine 100. A permanent magnet generator of a first ignition controller or EEC 130 of the pair of ignition controllers 130 can be driven by the first driveshaft, and a permanent magnet generator of a second ignition controller or EEC 130 of the pair of ignition controllers or EECs 130 can be driven by the second driveshaft. Each of the permanent magnet generator of the first EEC 130 and the permanent magnet generator of the second EEC 130 can be configured to generate AC power and then supply DC power to a first programmable controller 1400 (for example and without limitation, as shown and embodied in a control board 1410 of the first EEC 130 in FIG. 14) and a second programmable controller 1400 (for example and without limitation, as embodied in the control board 1410 of the second EEC 130), each of which can be configured to direct energy to a plurality of fuel igniting devices 190. Each of the programmable controllers 1400 can be configured to apply a timing curve (or timing map, as will be described) to the plurality of fuel igniting devices 190 and deliver an electrical spark to each combustion chamber in the order of compression and combustion of the fuel-air mixture in the combustion chambers.

The engine 100 can further comprise a fuel system (not shown) for delivery of the fuel—directly or indirectly—to the combustion chamber; an electrical system (shown only partially in the form of the ignition system 120); an air delivery system comprising an intake manifold; and a variety of other components such as, for example and without limitation, a fuel injector system or carburetor; and an exhaust system for removal of waste products from the engine 100. In some aspects, the engine 100 can be normally aspirated or ventilated. In other aspects, the engine 100 can comprise a turbocharger. As familiar to one of ordinary skill in the art, an engine such as the engine 100 can come in a variety of sizes and configurations and is not limited to the examples described herein.

In some aspects, the aircraft can be a small aircraft comprising a single engine 100. In other aspects, the aircraft can comprise more than one engine 100. In some aspects, the aircraft can be a fixed wing aircraft configured to generate lift through upward pressure on an airfoil shape that makes up each fixed wing of the aircraft as the airfoil shape—together with the rest of the aircraft—is propelled through the air through by the aforementioned propeller at a sufficient speed to create such lift. In other aspects, the aircraft can be a rotary aircraft (not shown) comprising a horizontal rotor (not shown) configured to create such lift. In some aspects, the engine 100 can comprise a full authority digital engine control (FADEC) system. In other aspects, the engine 100 need not comprise a FADEC system. As will be described, the ignition system 120 disclosed herein can facilitate ignition timing or EEC synchronization in such a FADEC system without a need for separate tool.

Each of the crankshaft and the camshafts can be housed within the crankcase 110. As shown, the engine 100 can comprise a plurality of cylinders 140 and a plurality of cylinder heads 150, each of which can be dedicated to a single cylinder 140 or to more than one cylinder 140. In some aspects, as shown, the engine 100 can comprise four cylinders 140 and four cylinder heads 150. In other aspects, the engine 100 can comprise more than four cylinders or less than four cylinders. For example and without limitation, to accommodate the ignition system shown at least in part in FIG. 3, the engine 100 can comprise six cylinders 140 and as many cylinder heads 150.

As familiar to one of ordinary skill in the art, each cylinder head can comprise a plurality of intake valves (not shown) and a plurality of exhaust valves (not shown) to allow, respectively, a fuel-air mixture to enter and an exhaust air mixture to exit the corresponding combustion chamber. Each of the valves can be moved in and out with a rod extending from the valve to the corresponding camshaft. Each set of valves can be covered with a valve cover 160. The fuel-air mixture can be brought into each combustion chamber via the aforementioned intake air manifold and can be brought out of the combustion chamber via an exhaust air manifold 170. The ignition system 120 can comprise a pair of coil packs 180. Heat can be delivered to each combustion chamber via a spark produced by each of a plurality of fuel igniting devices 190. Each of the plurality of fuel igniting devices 190 can be, for example and without limitation, a spark plug.

Operation of the engine 100 with ignition controllers such as the EECs 130 can yield any one or more of several benefits over operation of the engine 100 without the EECs (e.g., with magnetos). With the EECs 130, as will be described, timing can be varied to match loads encountered in each of the flight stages and sub-stages to improve efficiency. Moreover, with the EECs 130, a P-lead connection 650 described herein can allow for functionality beyond that allowed by the P-lead connection on a magneto: the P-lead connection 650 on the EEGs 130 can automatically cut power to the engine 100 or the ignition circuit at low speeds when, for example, a technician is working on the engine, can also test the independent power source of the EEC 130 without a need for separate hardware, and can receive power from airframe or ship's power and direct such backup power to the ignition circuit and ultimately each spark plug were both independent power supplies to fail during flight. Because the P-lead connection 650 is built into each of the EECs 130, the steps above can be accomplished after the engine 100 is assembled and installed into an aircraft. Moreover, the EECs 130 and the associated hardware including the new ignition switch can be made to operate in some of the same ways as a magneto system so that it will be familiar to pilots. Additionally, the EECs 130 can be synchronized with the engine 100 for initial ignition timing calibration purposes by incorporating an indicator configured to indicate when the rotational position of the respective EEC corresponds to full advance or top dead center (TDC) of a number one cylinder of the engine 100.

Figure 2:
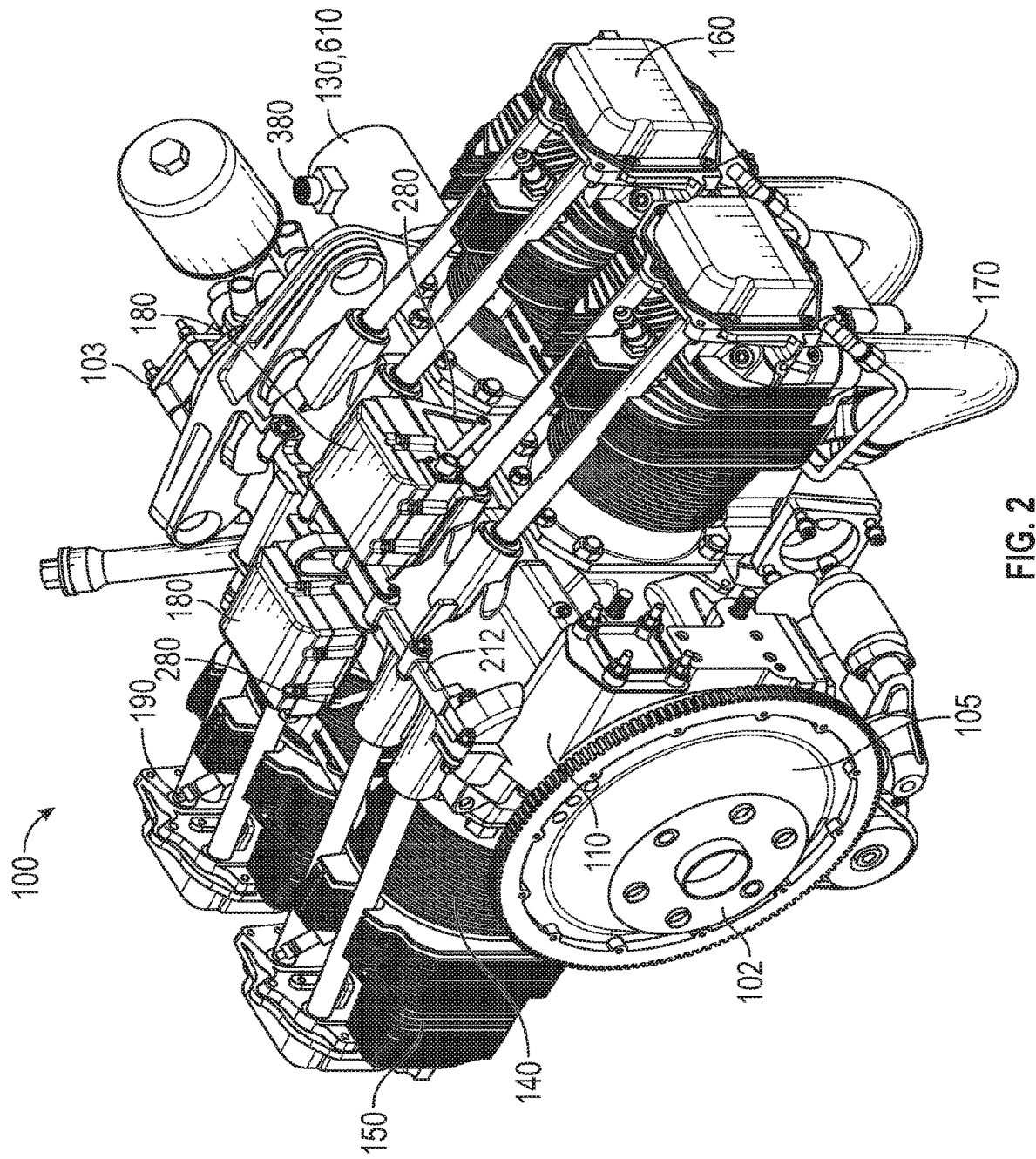
FIG. 2 is a front perspective view of the engine of FIG. 1.

As shown in FIG. 2, each of the coil packs 180 can be mounted on a coil bracket 280. In some aspects, either of the coil brackets 280 can be mounted to a "backbone" 212 of the engine 100, which can be defined by flanges defined by a connection joint between first and second halves of the crankcase 110. In other aspects, the coil brackets 280 can be mounted elsewhere on the engine 100. Each of the ignition controllers 130 can comprise the connection hub 380, which can extend radially outward from a body 610 of the ignition controller 130.

As shown in FIG. 3, the ignition system 120 and specifically the ignition controllers 130 can comprise a pair of magnetos. As typically seen on an engine such as disclosed herein, ignition wires 230, which can be high tension leads, from each magneto can extend to each of the combustion chambers of the engine 100 via the corresponding fuel igniting device 190. As will be described, the pair of magnetos can be replaced with a pair of EEGs 130 and associated components. While both a magneto and an EEC can, in a broad sense, be considered an ignition controller 130 in that each controls the timed ignition of the fuel-air mixture in each combustion chamber based on mechanical and/or electrical inputs, when comprising an EEC the ignition controller 130 can yield benefits such as, for example and without limitation, improved reliability due to the addition of a backup power source and due to additional manual and automatic monitoring and control of the ignition system 120 during start-up and also during operation of the engine 100 and also improved fuel efficiency, easy installation, reduced maintenance cost, and the elimination of an impulse coupling (not shown) typically used between the drive shaft 620 of the magneto and the engine 100. The impulse coupling, which can help "spin" up the magneto to provide ignition at a low rotational speed of the engine 100, is not needed with the EEC 130 described herein because any voltage required by the EEC 130 can be supplied by ship's power through the P-lead connection 650 (shown in FIG. 6) or even by its own internally generated independent power supply.

Figure 4:
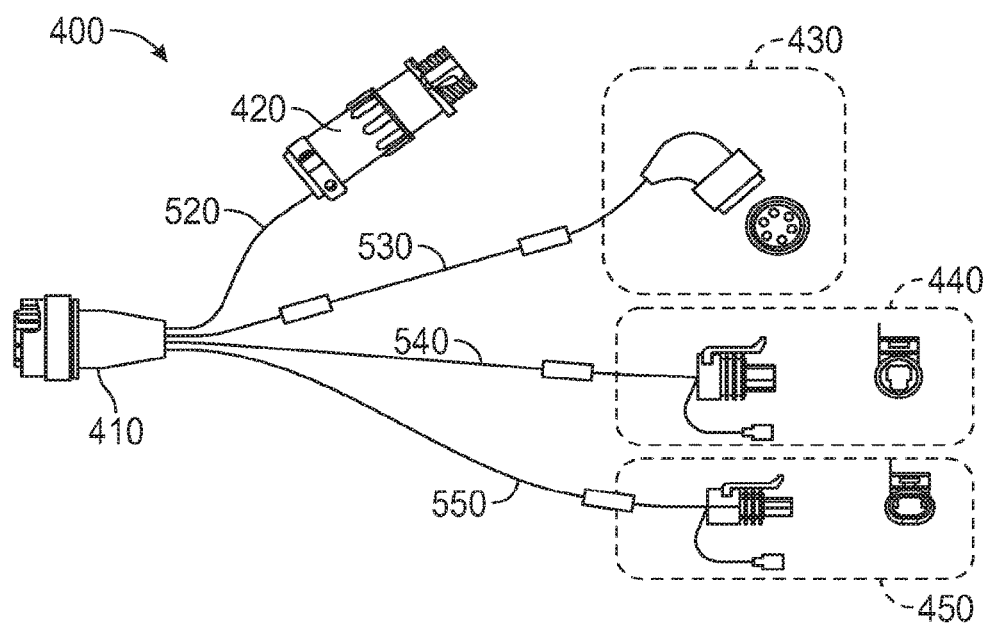
FIG. 4 is a schematic of a wiring harness for the engine of FIG. 1, the wiring harness connecting each of the pair of EECs and their respective permanent magnet generators to other components of the ignition system of the engine in accordance with another aspect of the current disclosure.
Figure 5:
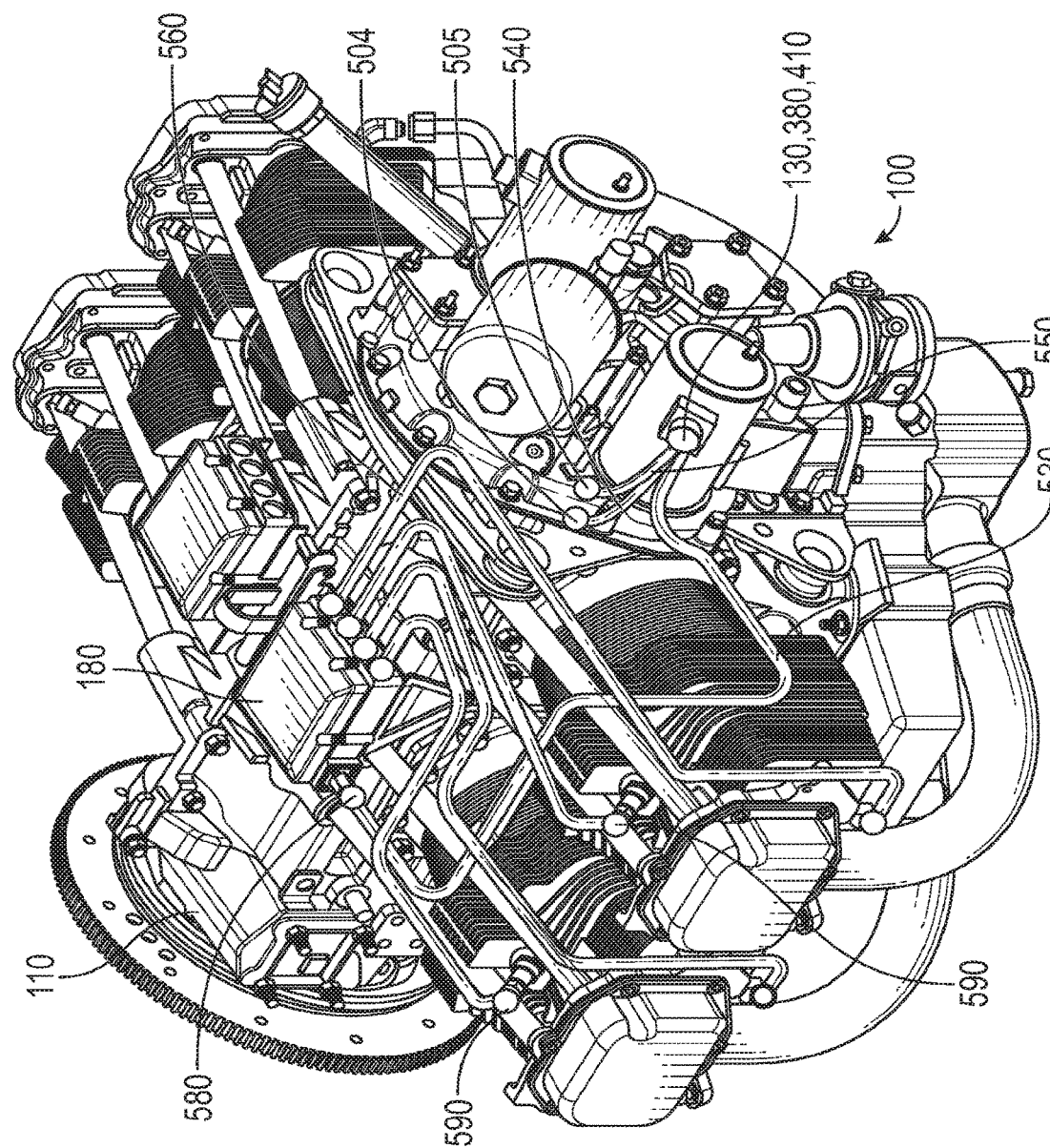
FIG. 5 is a top rear perspective view of the engine of FIG. 1 comprising wiring connecting a first EEC of the pair of EEGs with a coil pack of the ignition system and connecting the first EEC with a pair of sensors measuring the manifold air temperature and manifold air pressure, respectively, in accordance with another aspect of the current disclosure.

As shown in FIG. 4, a wiring harness 400 can connect each of the pair of ignition controllers 130 to other components of the ignition system 120 or the engine 100 such as through, for example and without limitation, the connection hub 380 (shown in FIG. 1). More specifically, the wiring harness 400 can comprise a main connector 410 on a first end. Distal from the main connector 410, the wiring harness 400 can comprise a second connector 420 comprising a tachometer or engine speed sensor, a third connector 430 configured to connect to a connection 580—which can be an input—of the coil pack 180 (as shown in FIG. 5), a fourth connector 440 for connecting to a manifold air pressure (MAP) sensor 504 (shown in FIG. 5), and a fifth connector 450 for connecting to a manifold air temperature (MAT) sensor 505 (shown in FIG. 5). Each of the MAP sensor 504 and the MAT sensor 505 can be positioned on a portion of the intake air manifold. As shown, wiring 520,530,540,550, respectively, can connect each of the connectors 420,430, 440,450 to the main connector 410.

The rotational speed of at least the EEC 130 can be measured without the second connector 420 connector to an external tachometer and instead an angular position detector or angular position encoder 1100 (shown in FIG. 12) can be so used. As will be described below, based on a predetermined map for the engine 100, the timing (e.g., the timing advance in degrees before top dead center) can be automatically adjusted based on the rotational speed of the engine as well as the load of the engine as determined from the input from the MAP sensor 504 and the MAT sensor 505. In effect, this automatic adjustment of the timing can lead to more efficient running of the engine 100 and therefore lower fuel consumption in the range of 5 to 7 percent, particularly during cruise operation of the aircraft. In the case of failure of either or both of the sensors 504,505, the EEC 130 can return to base timing.

As shown in FIG. 5, wiring 530 can electrically connect the connection hub 380 of the ignition controller 130—such as embodied in a first EEC 130 of the pair of EECs 130—with a connection 580 of the coil pack 180—such as embodied in a first coil pack 180 of the ignition system 120. Also as shown, the wiring 540,550, respectively, can electrically connect the first EEC 130 with the sensors 504,505 measuring the manifold air pressure and manifold air temperature, respectively. Wiring 560 can electrically connect the first coil pack 180 with each of the fuel igniting devices 190 via a connection 590.

Figure 6:
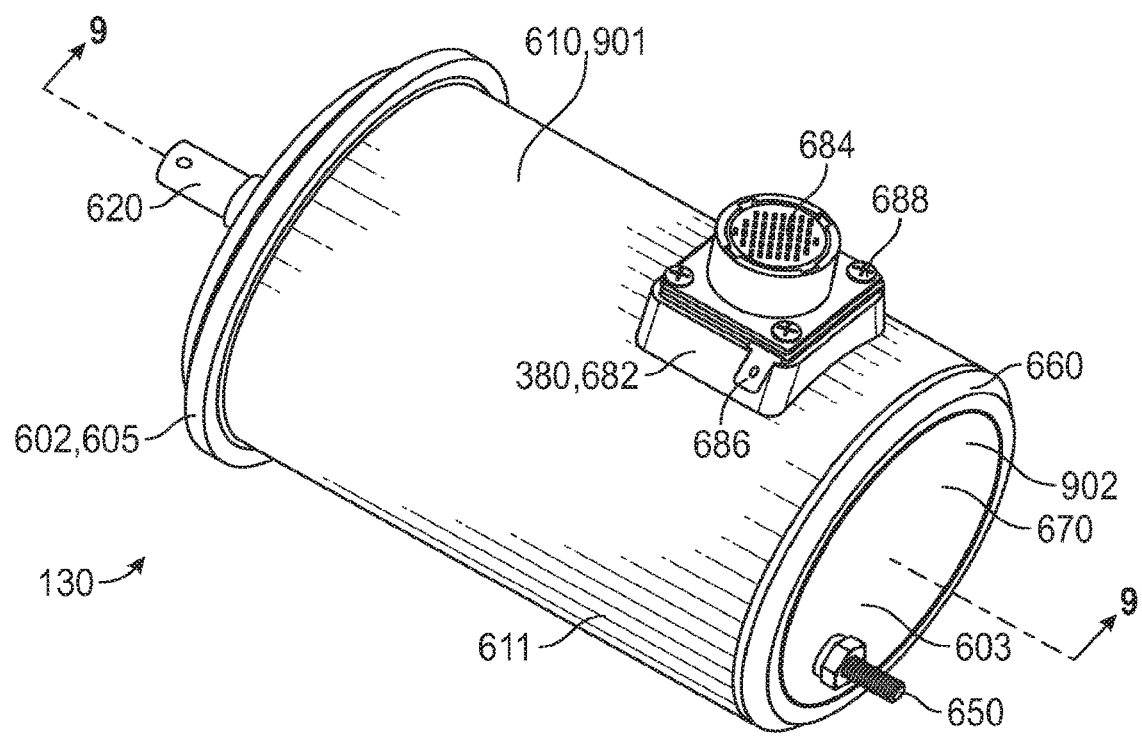
FIG. 6 is a top rear perspective view of a one of the pair of EEGs of the engine of FIG. 1, the EEC comprising a visual indicator and a P-lead connection.
Figure 7:
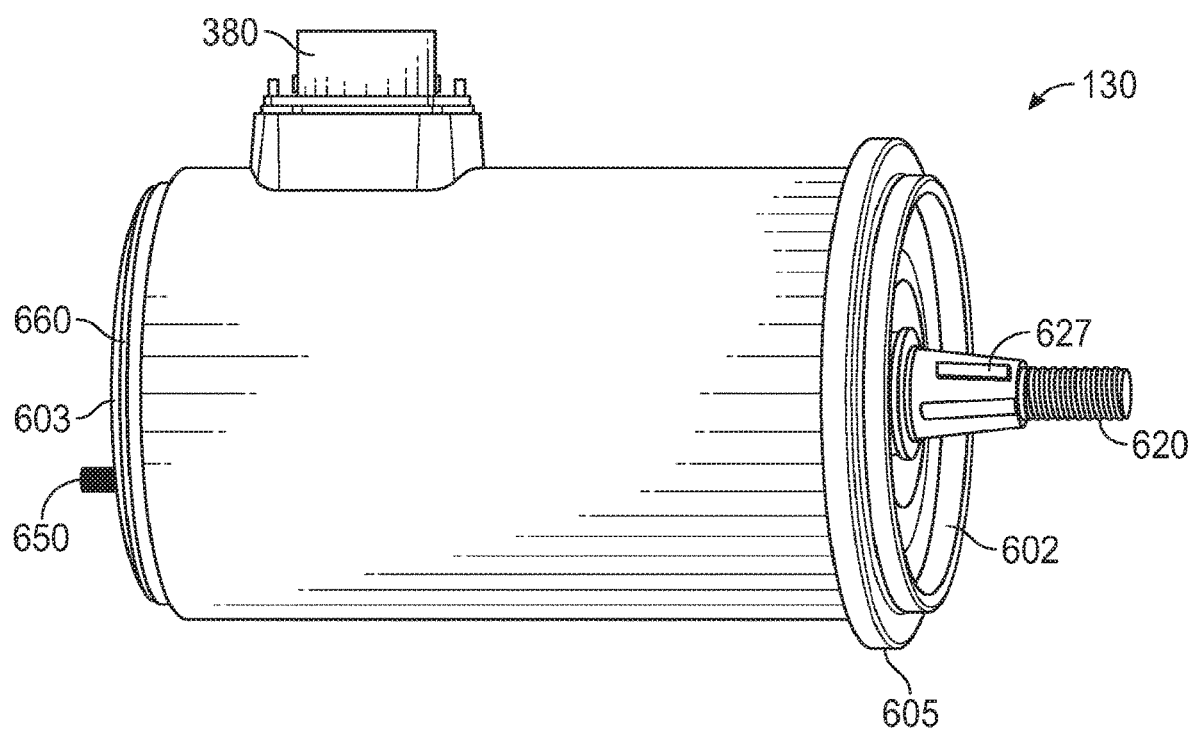
FIG. 7 is a side perspective view of the EEC of FIG. 6.
Figure 8C:
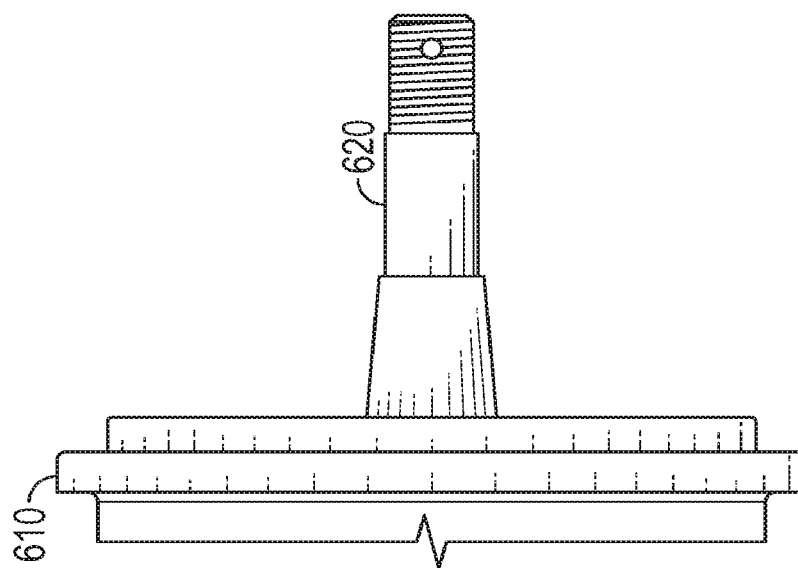
FIG. 8C is a side view of a mounting end of the EEC of FIG. 6 in accordance with another aspect of the current disclosure.
Figure 8B:
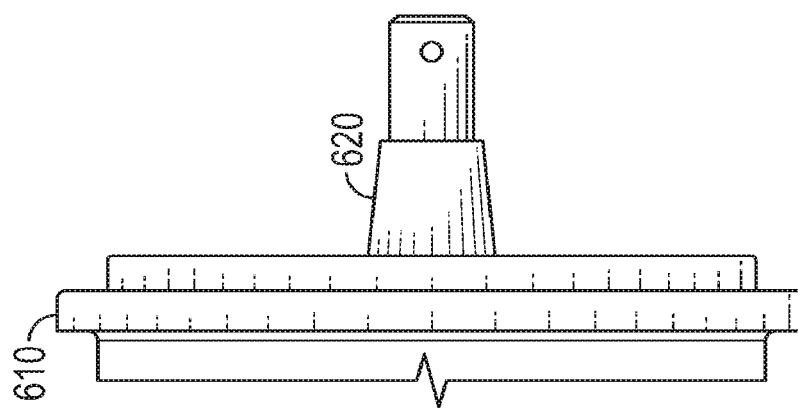
FIG. 8B is a side view of a mounting end of the EEC of FIG. 6 in accordance with another aspect of the current disclosure.
Figure 8A:
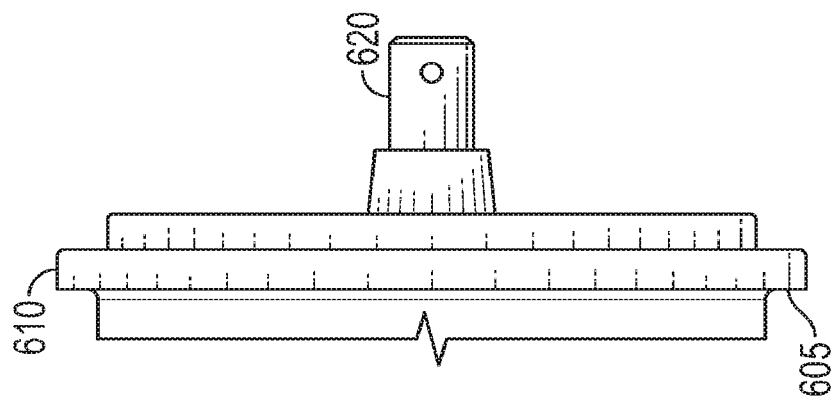
FIG. 8A is a side view of a mounting end of the EEC of FIG. 6 in accordance with one aspect of the current disclosure.

As shown in FIG. 6, the EEC 130 can comprise a body 610 and a drive shaft 620, The body 610 can be divided into a first portion 901 proximate to a front end, a mounting end, or a first end 602 and a second portion 902 proximate to a rear end, a free end, or a second end 603, The body 610 can comprise a flange 605 and define an outer surface 611, from which the connection hub 380 can extend. The drive shaft 620 can extend from and connect, directly or indirectly, to the crankshaft. In some aspects, the ignition controller 130, including when embodied as an EEC 130, can interface with the engine 100 as would the aforementioned magneto (shown in FIG. 3), The connection hub 380 can comprise a base 682, a port 684, a terminal 686, and fasteners 688 for securing any or all of the base 682, the port 684, and the terminal 686 to the body 610. The EEC 130 can further comprise the P-lead connection 650, which can extend from the rear end or free end 603 of the body 610. The EEC 130 can comprise a visual indicator 660, which can comprise a plurality of light emitting diodes (LEDs) for producing light. A rear cover 670 of the body 610 can define the rear end or free end 603 and a rear end surface of the EEC 130.

As shown in FIG. 7 and FIG. 8A-8C, the drive shaft 620 of the ignition controller 130 can take any one of several different forms in order to mount to various forms of the engine 100 and can comprise a key 627 as shown. The key 627 can be, for example and without limitation, a Woodruff key.

FIG. 9 shows a sectional view of the EEC 130, which can further comprise a first inner cavity 612 and a second inner cavity 614 defined by a front end or mounting end 910 and a rear end or free end 920 of the first portion 901 of the body 610, As shown, a drive gear 950 mounted and secured to a rear end or second end 626 of the drive shaft 620 can engage a timing gear 960 mounted on a secondary shaft or a timing shaft 970 defining a timing shaft axis 971. The drive shaft 620 can define a front end or first end 625, the second end 626, and an axis 621. A generator portion of the EEC 130 can define a coil 930 through which the drive shaft 620 can rotate and generate current through the wiring thereof. The mounting end 910 can define a front end or first end 912 and a rear end or second end 913. The free end 920 can define a front end or first end 922 and a rear end or second end 923. The body 610 can define a seat 990 and a groove 980 proximate to the free end 920. As shown, the timing gear 960 can comprise a position magnet 1160, which can at least in part define an axially rearmost or outermost surface of the timing gear 960.

Figure 10:
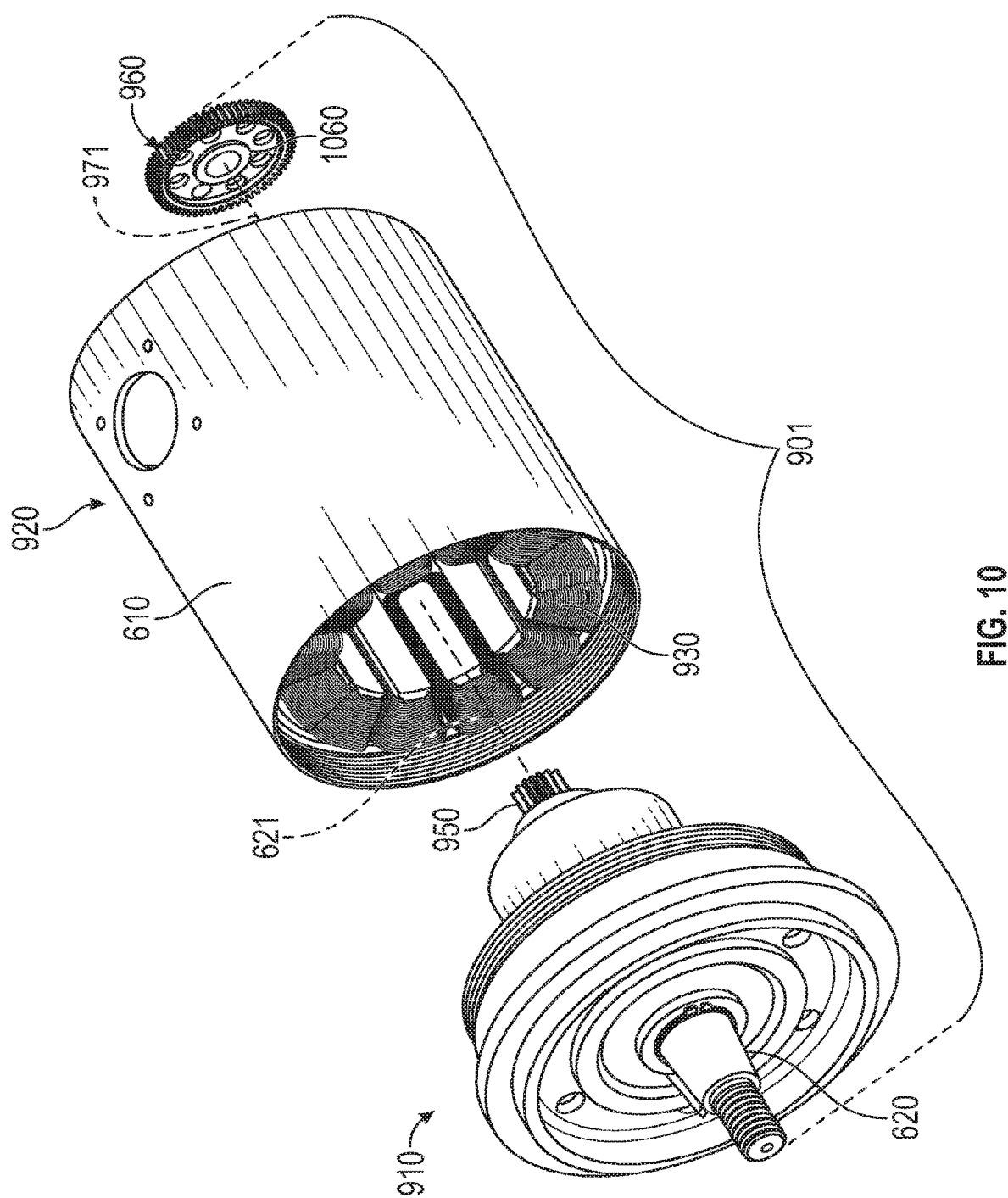
FIG. 10 is a top front partially exploded perspective view of the EEC of FIG. 6 exploded along an axis of a drive shaft of the EEC and with a rear cover and a connection port of the EEC removed.

FIG. 10 shows a top front partially exploded perspective view of the first portion 901 of the body 610 of the EEC 130 of FIG. 6 exploded along the axis 621 of the drive shaft 620 of the EEC 130. As shown, the rear cover 670 and a connection hub 380 of the EEC 130 can be removed. Again, the timing gear 960 can be mounted on and magnetically held to the timing shaft 970 (shown in FIG. 9) without the need for a retaining clip. The timing gear 960 can comprise a shoulder bearing 1060.

Figure 11:
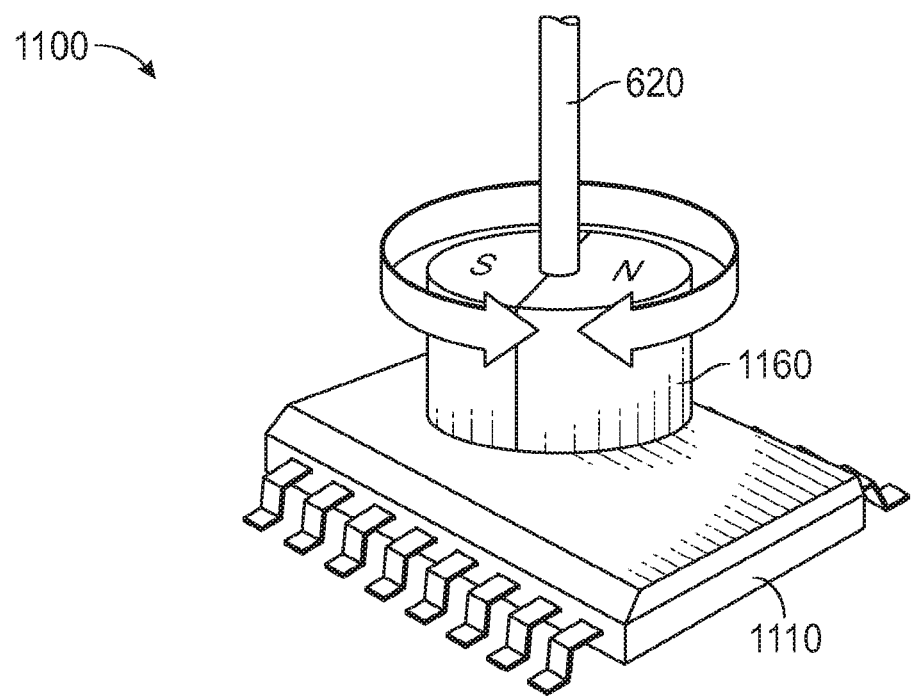
FIG. 11 is a perspective view of an angular position encoder or incremental rotary encoder, the incremental rotary encoder comprising a rotating drive shaft, a magnet secured to an end of the drive shaft, and a chip positioned proximate to the magnet in accordance with one aspect of the current disclosure.

FIG. 11 shows a perspective view of an angular position encoder 1100, which can comprise an incremental rotary encoder. The incremental rotary encoder can comprise the rotating drive shaft 620 (shown in a simplified form), a position magnet 1160, which can be secured to an end of the drive shaft 620 (or, in the case of the EEC 130 disclosed herein, can be embedded in the timing gear 960), and a chip 1110, which can be an application-specific integrated circuit (ASIC), can be positioned proximate to the position magnet 1160.

Figure 12:
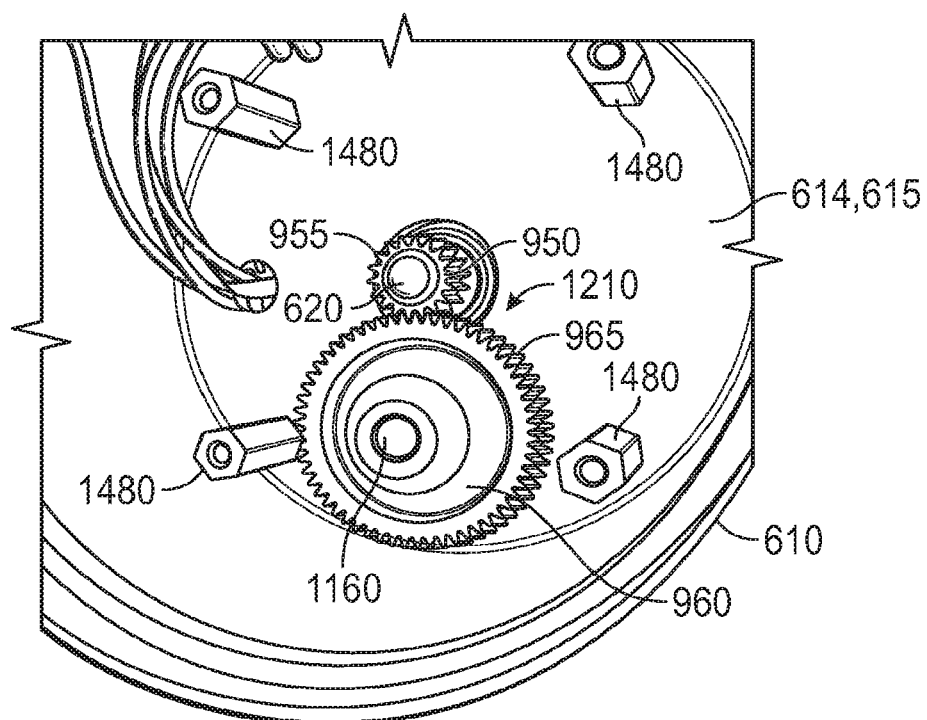
FIG. 12 is a rear perspective view of the EEC of FIG. 10 showing, with a rear cover of the EEC removed, a timing gear positioned to be driven by a drive gear fixed to and configured to rotate with the drive shaft.

As shown in FIG. 12, the timing gear 960 can be positioned to be driven by the drive gear 950, which can be fixed to and configured to rotate with the drive shaft 620. Standoffs 1480 can fix other components inside the inner cavity 614 of the body 610 away from the gears 950,960. The inner cavity 614 can define an end wall 615. As shown, the drive gear 950 can define teeth 955 and the timing gear 960 can define teeth 965, which can be configured to engage the teeth 955 of the drive gear 950. A drive train or gear train 1210 of the EEC 130 can comprise each of the drive gear 950 and the timing gear 960.

Figure 13:
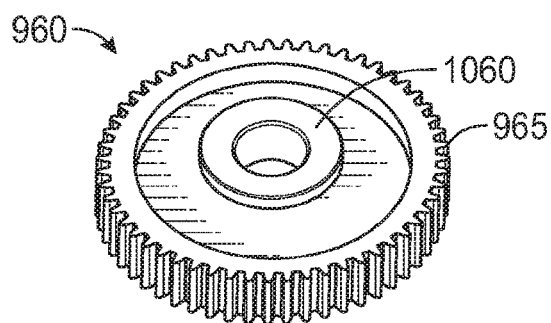
FIG. 13 is a top perspective view of the timing gear of FIG. 12.

Again, as shown in FIG. 13, the timing gear 960 can comprise the shoulder bearing 1060.

Figure 14:
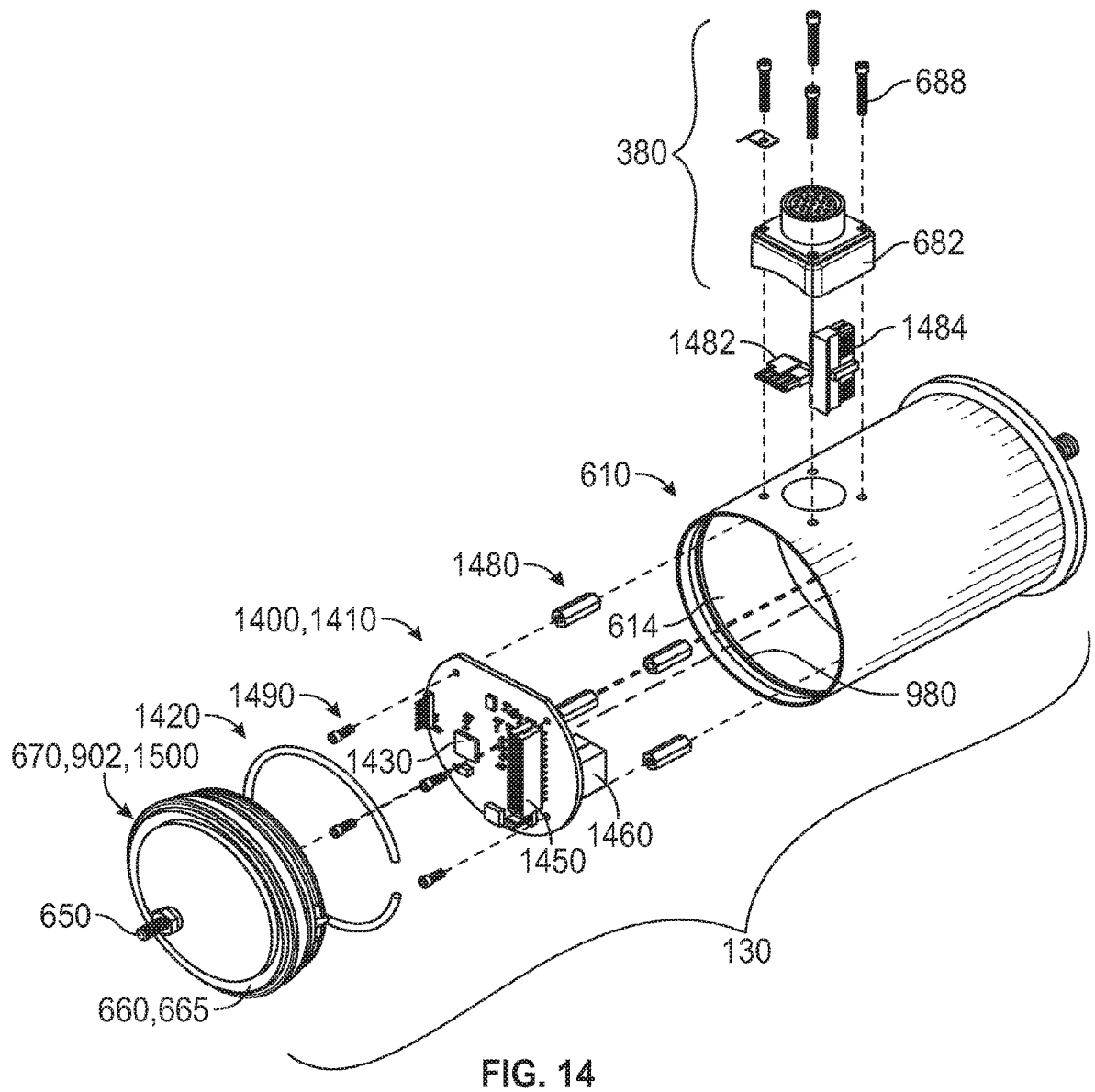
FIG. 14 is a top rear partially exploded perspective view of the EEC of FIG. 10 showing a portion of the EEC exploded along the axis of the drive shaft and a portion of the EEC exploded along an axis of the connection port.

As shown in FIG. 14, the programmable controller 1400 of the EEC 130 can comprise the control board 1410. The EEC 130 can comprise an open-ended circular spring 1420 for securing or mechanically locking the rear cover 670 inside the groove 980 of the body 610. The standoffs 1480 can secure the control board 1410 to the inner cavity 614 of the body 610. The control board 1410 can comprise a connector 1450 and a charge capacitor 1460 and can be mounted to the body 610 with fasteners 1490. The rear cover 670 can seal the housing with an O-ring 1510 (shown in FIG. 15). Alignment of the rear cover 670 and any associated components can be controlled by an alignment pin 1530

Figure 15:
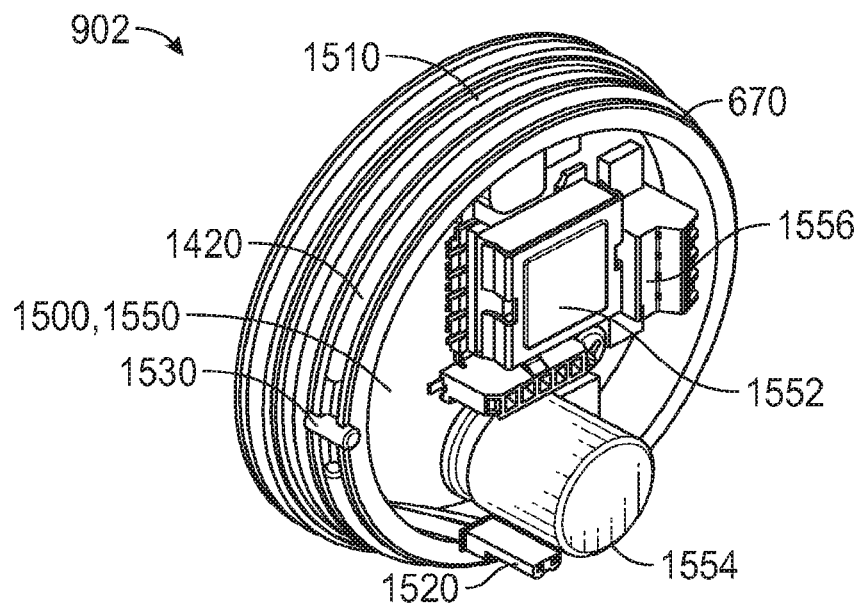
FIG. 15 is a top front perspective view of the rear cover of the EEC of FIG. 6.

(shown in FIG. 15). The spring 1420 can be a circular clip and can be formed from spring steel. The rear cover 670 can support the external annunciation light (the visual indicator 660). A protective lens 665 can cover the visual indicator 660, The rear cover 670 can provide pass through clearance for a #10 P-lead stud (shown in FIG. 16) defining the P-lead connection 650. The stud can be insulated with a fiber shoulder washer positioned between a shoulder 655 (shown in FIG. 16) of the stud (in which case the shoulder can have a hex shape) and set with the potting compound. An external surface 1611 (shown in FIG. 16) of the rear cover 670 can be used for part marking of the mechanical configuration part number, revision, serial number, or any other information. The stud can be held in place against an opposite or inside surface of the rear cover 670 with a nut. The stud defining the P-lead connection 650 can extend to and directly contact and be secured to an axially outward facing surface of the regulator-rectifier board 1550 (shown in FIG. 15).

The control board 1410 can be mounted "above" or offset in an axial direction along the axis 621 from the timing gear 960 with the standoffs 1480 anchored to a center bearing support of a housing of the EEC 130, which can define the end wall 615 (shown in FIG. 12) of the inner cavity 614 of the body 610. The control board 1410 can use a magnet field detection integrated circuit to detect timing gear angular position (absolute incremental encoder output). Two capacitors for the CDI (capacitor discharge ignition) process employed by the ignition system 120, including the aforementioned charge capacitor 1460, can be located between the control board 1410 and the end wall 615. In some aspects, a data connector such as a Micro SD socket can be incorporated into the EEC 130 for data logging. A microcontroller of the control board 1410 can utilize an In-Circuit Serial Programming (ICSP) header for programming the microcontroller with the boot software after fabrication of the EEC 130. The control board 1410 can be coated with a conformal coating for protection, An internal harness (not shown) housed inside the inner cavity 614 can connect the regulator-rectifier board 1550 (including the regulator-rectifier portion 1500 shown in FIG. 15), the control board 1410, and the 19-pin external main connector 410. As shown, the EEC can further comprise the connectors 1482, 1484.

As shown in FIG. 15, a second portion 902 of the EEC 130 and, more specifically, a regulator-rectifier portion 1500 of the EEC 130 can comprise the rear cover 670 and a regulator-rectifier board 1550. The regulator-rectifier portion 1500 can comprise the O-ring 1510, a visual indicator lead wire 1520, the spring 1420, and the alignment pin 1530 for consistently aligning the rear cover 670 with respect to the body 610, The regulator-rectifier board 1550 can comprise components for regulating and rectifying the voltage at the P-lead connection 650 including, for example and without limitation, the transformer 1552 able to convert a system supply voltage to an elevated voltage of, for example and without limitation, 250 V, for use by the coil pack 180, a rectifier capacitor 1554 for reducing variation in the power that can be transmitted via the P-lead connection 650 to the EEC 130, and a connector 1556 for connecting to the leads of the generator portion of the EEC 130. The aluminum housing and potting compound can provide a heat sink for the regulator-rectifier circuitry. The regulator-rectifier board 1550 can be potted into the cover with a potting compound such as, for example and without limitation, 3M® Scotch Weld DP-270, including up to the axial outer surface of a transformer 1552. In some aspects, the EEC 130 can utilize two separate control boards (e.g., the control board 1410 and the regulator-rectifier board 1550). In other aspects, the EEC 130 can utilize more than two boards or only a single board, as will be discussed with respect to later figures. In some aspects, one or more of the disclosed components are not required or can be implemented using other hardware.

Figure 16:
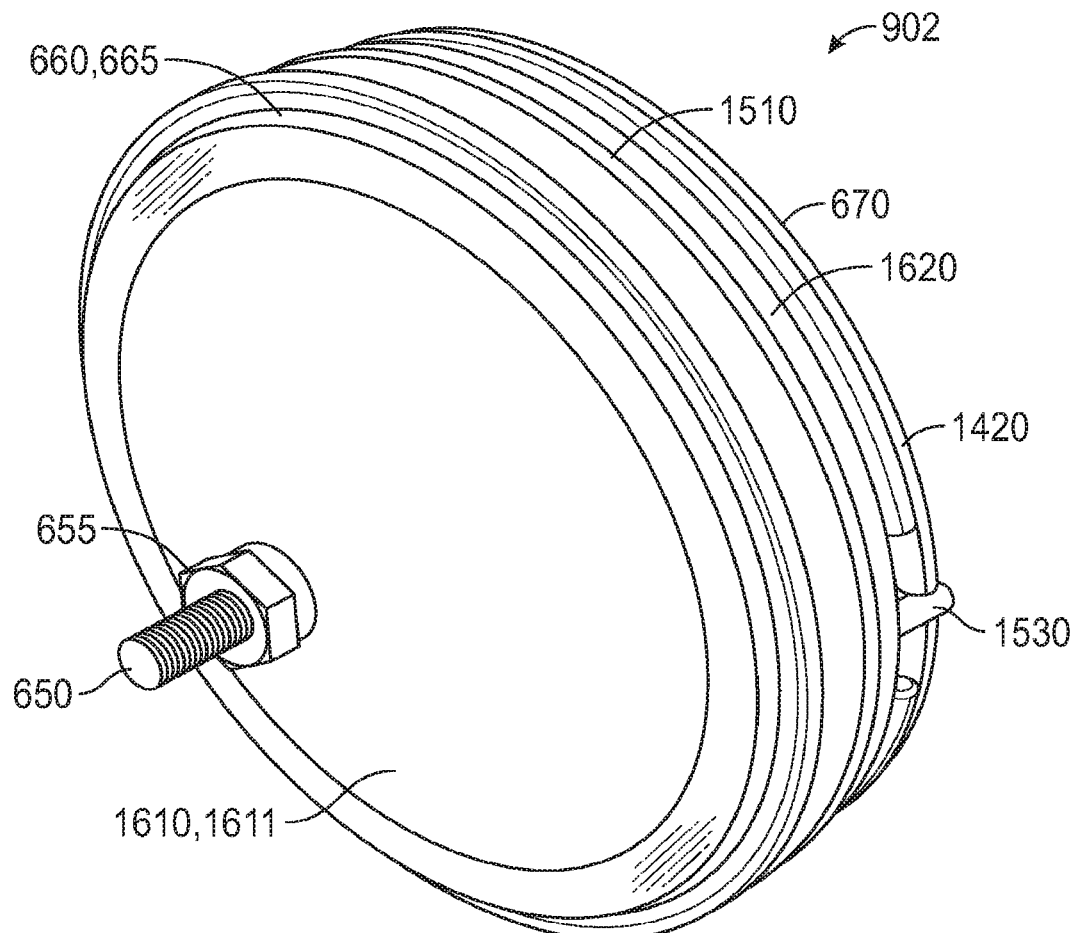
FIG. 16 is a top rear perspective view of the rear cover of FIG. 15.

As shown in FIG. 16, the rear cover 670 of the EEC 130 can comprise a main body 1610 defining the external surface 1611 and a flange 1620 defining a first groove for receiving the O-ring 1510 and a second groove for receiving the spring 1420. In some aspects, the visual indicator 660 can extend around a perimeter of and end of an ignition device like the ignition controller or EEC 130, can comprise an LED, and can be configured to produce a signal at a predetermined angular position of the engine. In other aspects, the visual indicator 660 can comprise a full or partially circular lighted ring or a plurality of LEDs or other light-producing devices forming a ring. In other aspects, the visual indicator 660 need not produce a visual signal but can produce an audible signal or other type of signal using conventional signaling methods.

Figure 17:
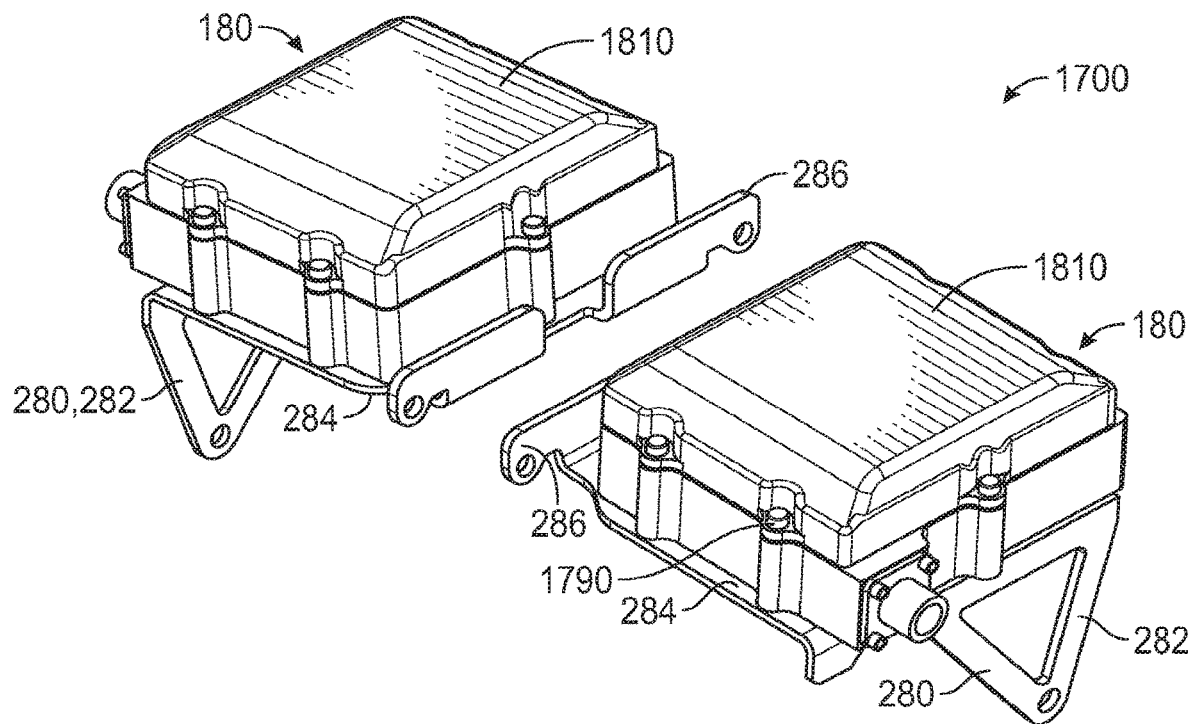
FIG. 17 is a top front perspective view of the pair of coil packs of FIG. 1.

As shown in FIG. 17, a coil pack assembly 1700 can comprise the pair of coil packs 180 of FIG. 1. Each coil pack 180 can be mounted to the coil bracket 280. Each coil bracket 280 can comprise a receiving portion 284 sized and positioned to support and secure the coil pack 180, a first mounting portion 282 extending from the receiving portion 284 and sized and positioned to mount the coil bracket 280 to a first portion of the crankcase 110, and a second mounting portion 286 extending from the receiving portion 284 and sized and positioned to mount the coil bracket 280 to a second portion of the crankcase 110. Each of the first mounting portion 282 and the second mounting portion 286 can be angled with respect to the receiving portion 284. A thickness and geometry of the coil bracket 280 can be sized to reduce or eliminate the effect of engine vibration on the coil pack 180. Each of the coil packs 180 can be formed in any desirable shape. In some aspects, the coil pack 180 can be formed in more than one piece and the individual pieces can be joined by a plurality of fasteners 1790. As shown in FIG. 1, each of the coil packs 180 can comprise a plurality of female connectors for receiving the wiring 530,560 (shown in FIG. 5). The coil pack 180 can comprise a coil body 1810. Each of the ignition controllers 130, the coil packs 180, and the wiring 530,540,550,560 can be electrically shielded to reduce electrical interference between the current transmitted through the ignition system 120 and other nearby wiring of the engine 100 or the vehicle in which it is installed and to additionally provide some lightning protection.

Figure 18:
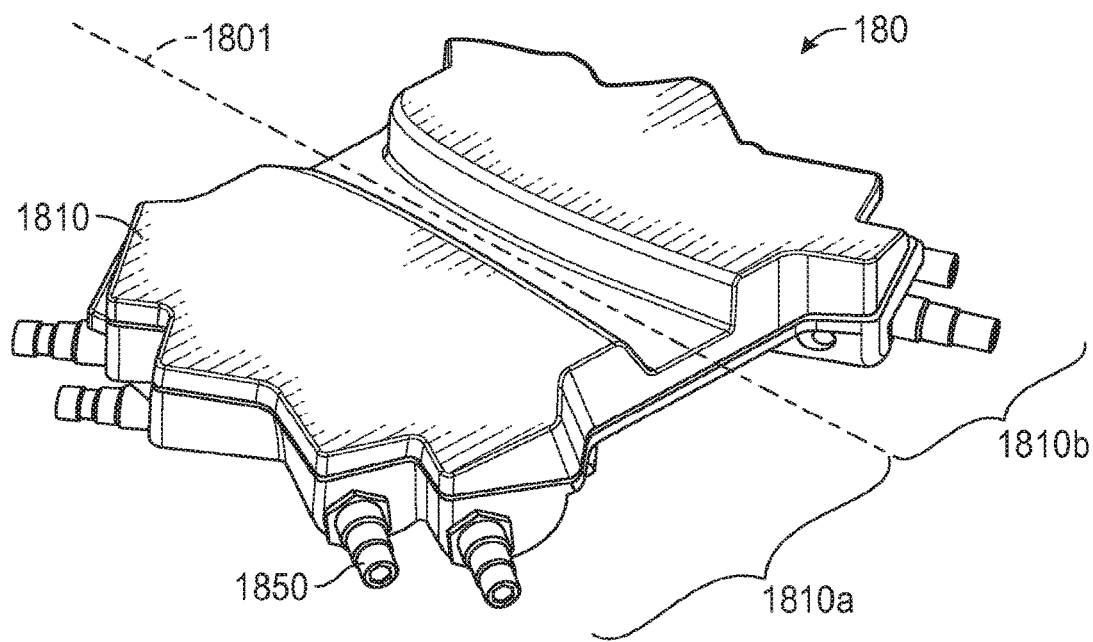
FIG. 18 is top perspective view of a coil pack in accordance with another aspect of the current disclosure.

As shown in FIG. 18, the coil pack 180 can comprise a plurality of male connectors 1850, one connector for each fuel igniting device 190 joined to the ignition controller 130 by the coil pack 180. The coil pack can comprise the coil body 1810, which can be symmetrical about a centerline 1801. The coil body 1810 can comprise a first half 1810a and a second half 1810b substantially the same as the first half 1810a. As shown, a separate or remote coil pack 180 can be made in a variety as shapes or sizes as desired and use of such a remote coil pack 180 can minimize the size of the EEC 130, utilize open space in the engine compartment, and improve serviceability.

Figure 19:
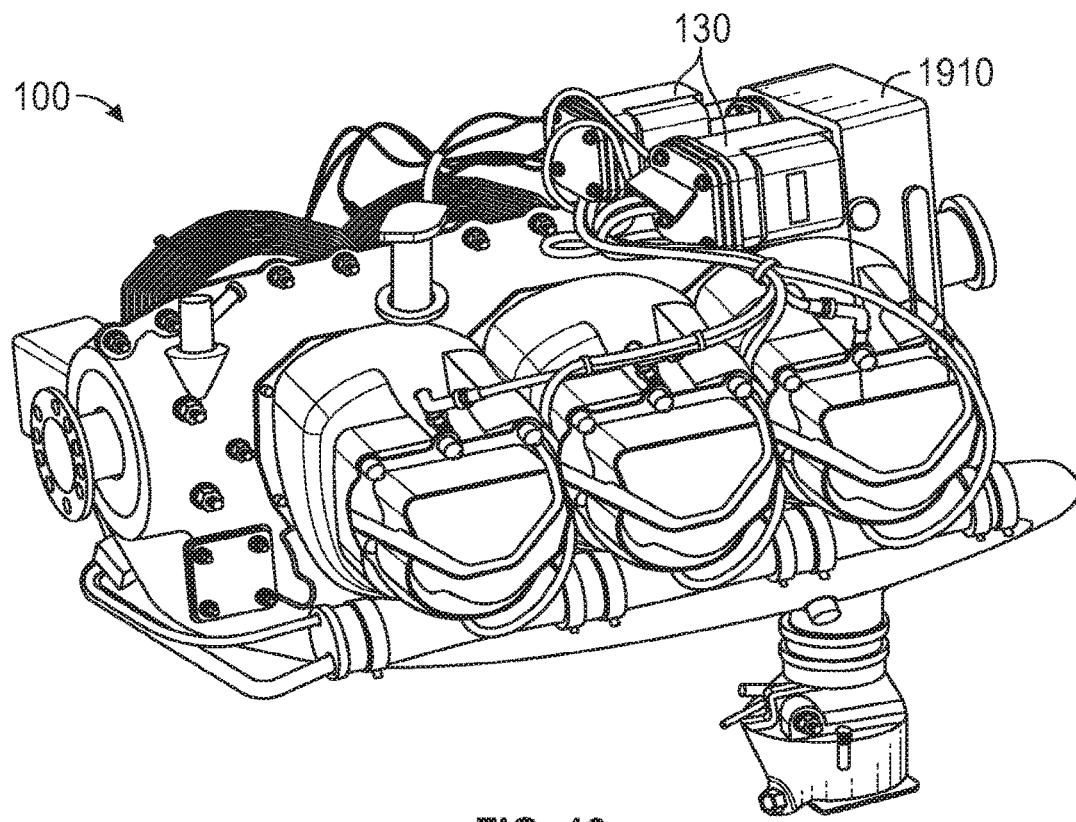
FIG. 19 is a side front perspective view of an internal combustion engine for a small aircraft comprising an ignition system, the ignition system comprising a pair of magnetos, all in accordance with another aspect of the current disclosure.
Figure 20:
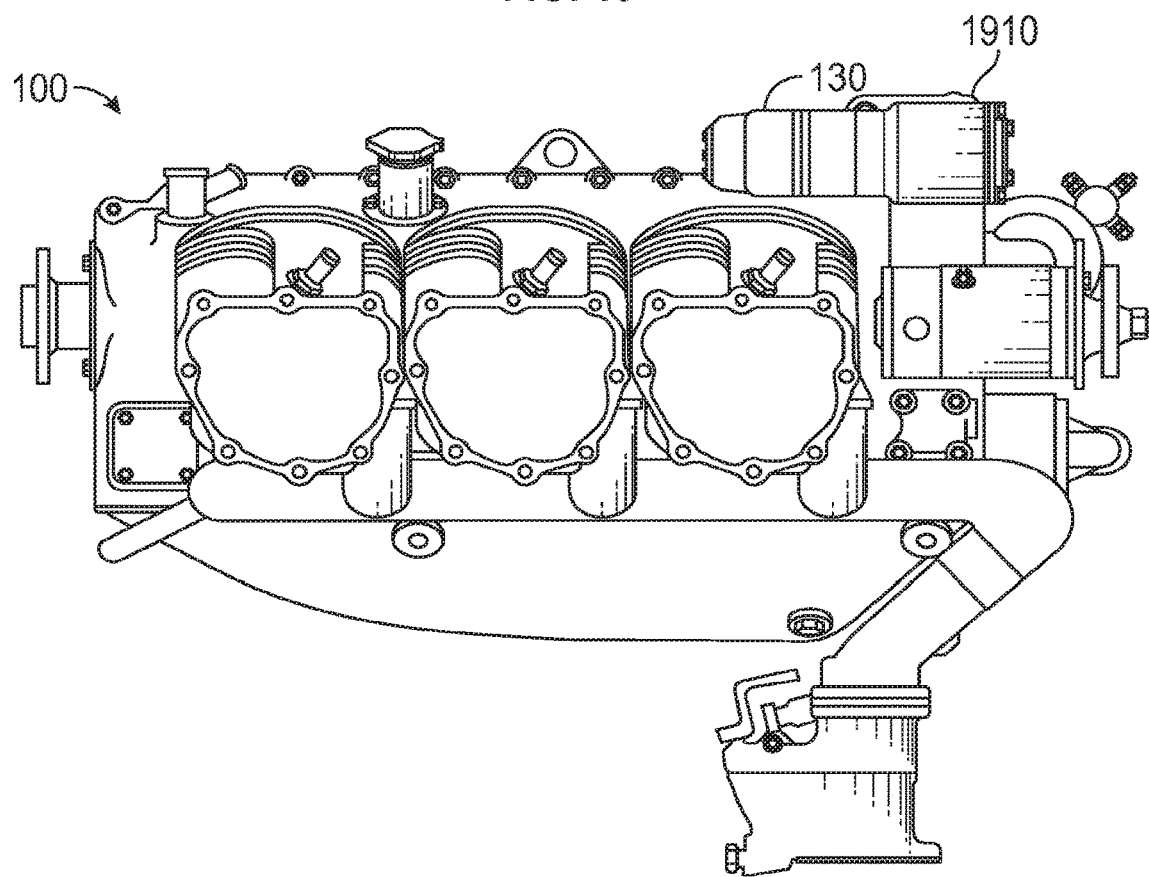
FIG. 20 is a side view of the engine of FIG. 19.

As shown in FIGS. 19 and 20, the aforementioned magnetos of the ignition system 120 can face in an opposite direction from that shown in FIGS. 1 and 3. As noted below, the EECs 130 can in any case be installed as a replacement or substitute for the magnetos—a replacement that does not require the redesign of the engine even if regulatory (e.g., FAA) approval may be involved. In either case, the ignition controllers 130 can engage with the crankshaft of the engine 100 via a gear train 1910 shown, which can transmit the rotation of the crankshaft to the drive shaft 620 (shown in FIG. 6), In some aspects, the camshaft, which can determine and control the timing of the valves and therefore also the combustion cycle of the engine 100, can spin at a different speed than the crankshaft. The drive shaft can be made to correspondingly spin at the same rotational speed as the camshaft by the design of the gear train 1910. Including in variations of the engine 100 not using the gear train 1910, a diameter of each of the aforementioned drive gear 950 and timing gear 960 of the EEC 130 can be adjusted to accommodate use on either 4-cylinder or 6-cylinder configurations of the engine 100 or the otherwise match the speed of the camshaft.

Figure 21:
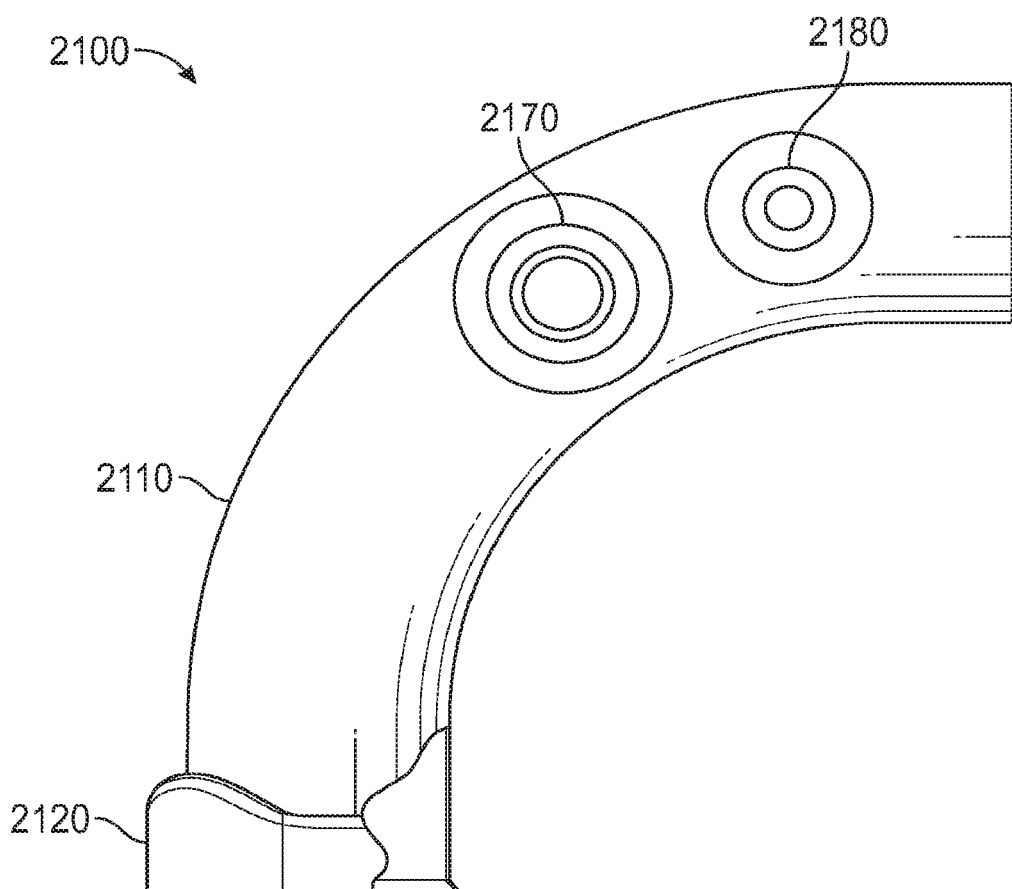
FIG. 21 is a rear view of a portion of an intake manifold of the engine of FIG. 1 defining a pair of ports configured to receive a corresponding pair of sensors for measuring properties of air inside the intake manifold at the ports.
Figure 22:
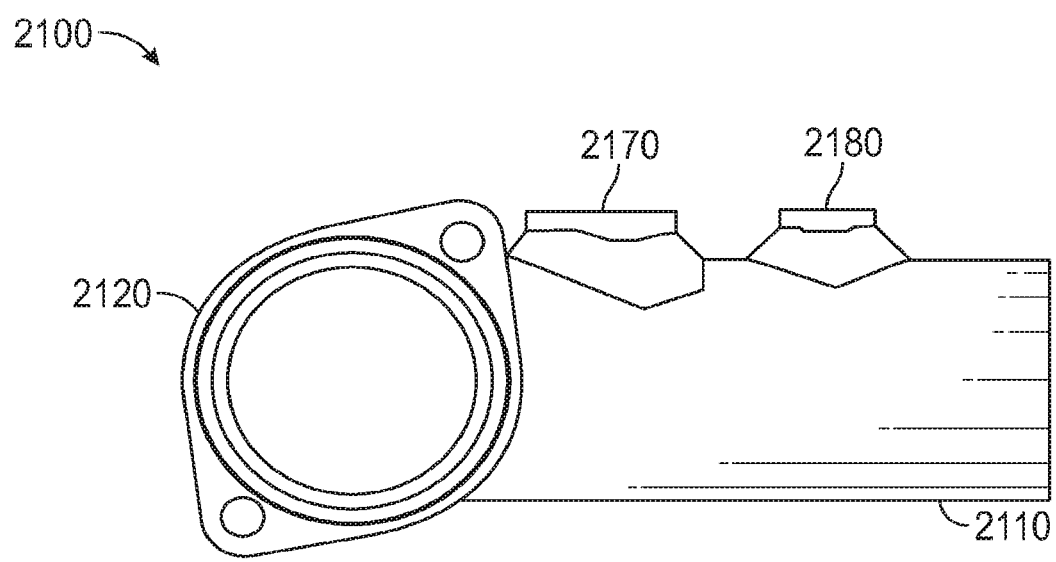
FIG. 22 is a top view of the intake manifold of FIG. 21.

As shown in FIGS. 21 and 22, an intake air manifold portion 2100 of an intake air manifold of the engine 100 can define a pair of ports 2170,2180, which can be configured to receive a corresponding pair of sensors for measuring properties of air inside the intake air manifold at the ports 2170,2180. For example and without limitation, the manifold air pressure (MAP) sensor 504 can be mounted to a one of the ports 2170,2180 and the manifold air temperature (MAT) sensor 505 can be mounted to the other of the ports 2170,2180. In some aspects, the portion of the intake air manifold defining the ports 2170,2180 can also define a main portion 2110 and one or more connecting portions 2120 for inserting and removing the intake air manifold portion 2100. In some aspects, the intake air manifold portion 2100 can be added later to the engine 100. In other aspects, the intake air manifold portion 2100 can be incorporated into engines with the sensors 504,505 to facilitate later modification of the engine 100 to incorporate the sensors 504,505. As shown, the port 2170 can be configured to receive the MAT sensor 505 and the port 2180 can be configured to receive the MAP sensor 504.

Figure 23:
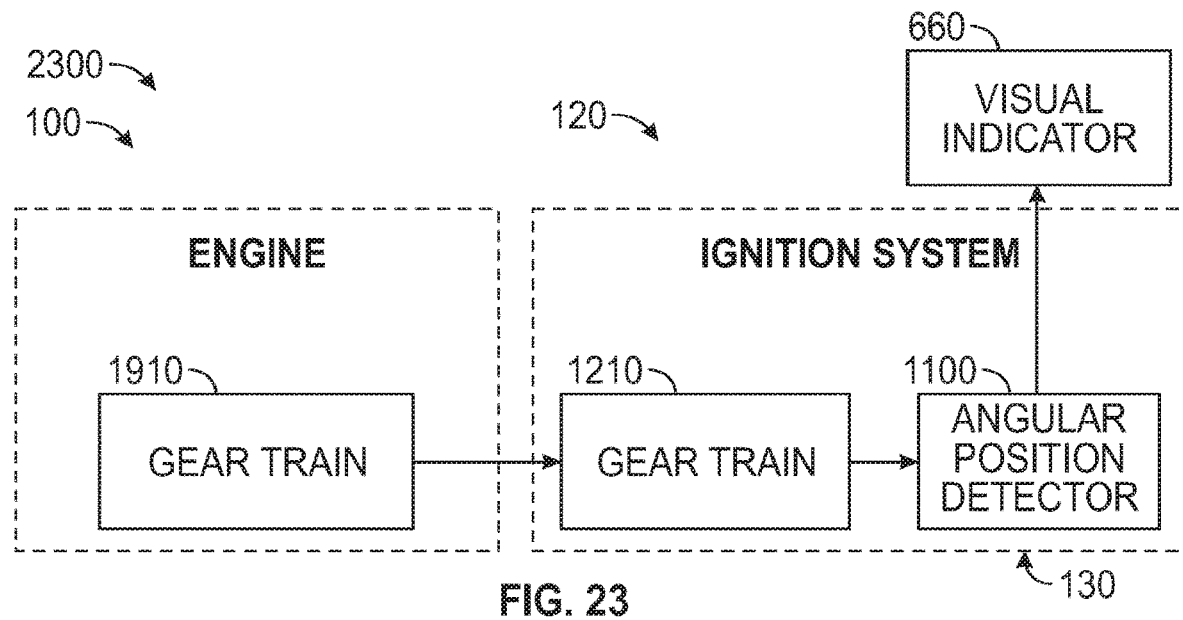
FIG. 23 is a block diagram, which can be considered a schematic, of the engine of FIG. 1 comprising the ignition system of FIG. 1.

In some aspects, for example and without limitation, the MAP sensor 504 can be configured to have a 0-30 PSIA range, to run on a 5 VDC supply voltage, and produce a 0.5-4.5 VDC signal voltage. A connector on the MAP sensor 504 can define, for example and without limitation, 1/8-27 NPTF threads. In some aspects, for example and without limitation, the MAT sensor 505 can be configured as a −40 to 130° C. negative temperature coefficient temperature sensor. A connector on the MAT sensor 505 can define, for example and without limitation, 3/8-18 NPT threads, FIG. 23 is a block diagram 2300 (which can be considered a schematic) of the engine 100 of FIG. 1 comprising the ignition system 120 of FIG. 1, The camshaft or a portion of the engine 100 can rotate at the camshaft speed and through a mechanical connection with the drive shaft 620 of the ignition controller 130 can rotate the drive shaft 620 (shown in FIG. 6) of the ignition controller 130. For example and without limitation, an output of the gear train 1910 (shown in FIG. 19) can become the "drive input" for the ignition controller 130 (e.g., via the drive shaft 620). The rotation of the drive shaft 620 can in turn rotate the gear train 1210 of the EEC 130 and, more specifically, the drive gear 950 and the timing gear 960 if the drive shaft 620 is not already turning at the desired speed (again, typically the rotational speed of the camshaft). Then the angular position encoder 1100, the chip 1110 of which can be mounted to the control board 1410 proximate to the position magnet 1160 (as shown in FIG. 11), can sense the rotation of the position magnet 1160, which as described above can be positioned in the timing gear 960. As will be described, the angular position encoder 1100 and, more generally, the control board 1410 (shown in FIG. 14) can use data from the angular position encoder to selectively activate the visual indicator 660 of the EEC 130. As defined in FIG. 23, the angular position detector can include the main microcontroller for the EEC 130 such as, for example and without limitation, the microcontroller 1430 shown in FIGS. 14 and 43.

Figure 24:
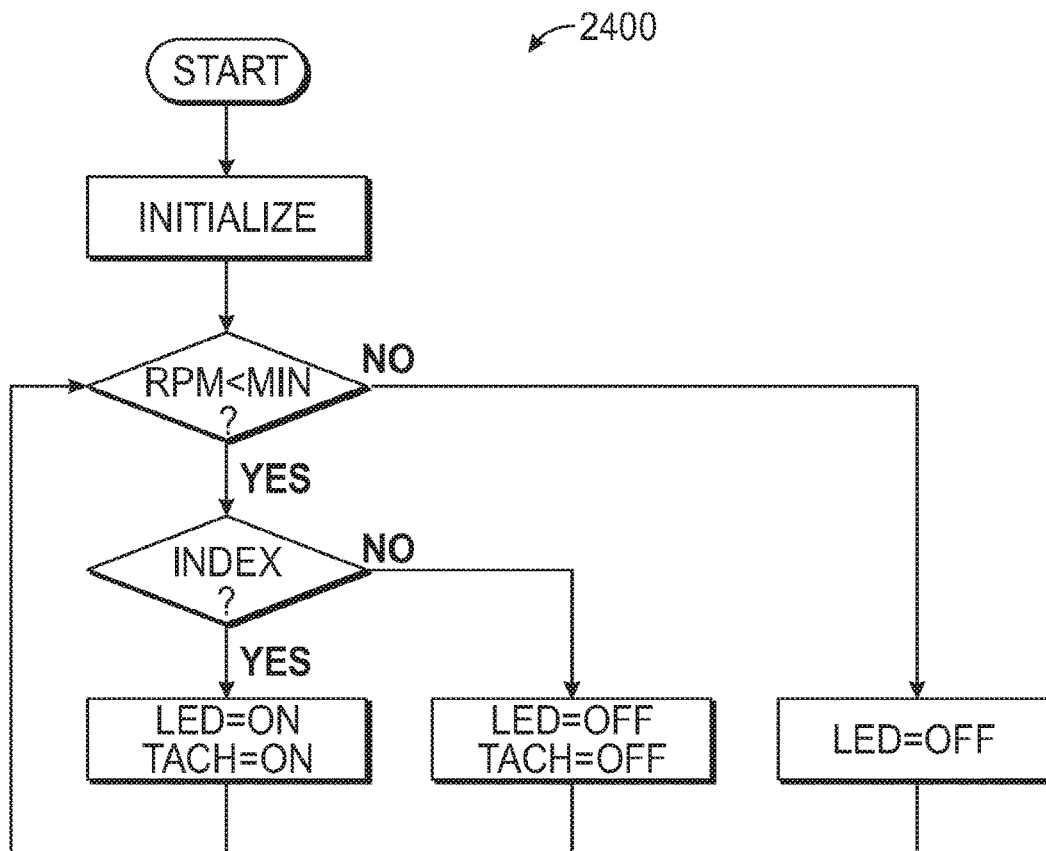
FIG. 24 is a flowchart showing an algorithm for initial operation—such as during the initial setting of a rotational position of the EEC—of the angular position encoder of FIG. 11 as incorporated into the engine of FIG. 1.

Specifically, the control board 1410 can be configured to activate the visual indicator 660 when the rotational position of the EEC 130 is at a predetermined position. In some aspects, the control board 1410 can be configured to activate the visual indicator 660 when the EEC 130 is generally right-side up (i.e., the connection hub 380 is facing directly up) but more exactly is at the rotational position required to ignite a number one cylinder of the plurality of cylinders 140 when a corresponding piston is at a top dead center (TDC) position or maximum extension inside the corresponding combustion chamber, which is generally defined as the point of maximum compression of the fuel-air mixture in the combustion chamber, or when the same piston is at a full advance position. However, configuring the control board 1410 so can result in many different variations covering the many different engine timing settings. In other words, a separate program could be required for the EEC 130 of each engine 100. In contrast, the control board 1410 can be configured to activate the visual indicator 660 when the EEC 130 is exactly at the rotational position required to ignite the number one cylinder when in the full advance position, which is when the engine 100 is mechanically rotated to the full advance setting of the number one cylinder, typically a nameplate value unique to each engine 100. By setting the rotational position of the EEC 130 based on the full advance position of the engine 100, programming of the control board 1410 can be made less complex and the number of variations of the EEC 130 can be significantly reduced. In addition, full advance is the worst-case timing setting and can therefore be a good reference for each engine 100, whereas the angular position between TDC and full advance varies for each engine 100, FIG. 24 is a flowchart showing an algorithm 2400 for initial operation (such as during the initial setting of a rotational position of the ignition controller) of the angular position encoder 1100 of FIG. 11 as incorporated into the engine of FIG. 1. On start-up, the software in the control board 1410 (shown in FIG. 14) can initialize each of an oscillator (an integrated RC or resistor-capacitor circuit), pin mapping, interrupts, an analog to digital converter, timers (1,2,3,4), a controller area network (CAN) bus, and a quadrature encoder interface (QED, which can comprise the angular position encoder 1100. As shown, a main loop can control the visual indicator 660 (shown, e.g., in FIG. 14). If the engine rotational speed is less than a cut-on value (for example and without limitation, 25 or 50 rpm) then the control board 1410 can check for the absolute angular position index and activate the visual indicator 660 if the index value I or 2630 is a HI value (as shown, for example, in FIG. 26). The control board 1410 can also turn ON a tachometer such as the tachometer integral to the EEC 130. If the engine speed is greater than the cut-on value or if the index value 2630 is a LOW value (even if the engine speed is less than the cut-on value), then the control board 1410 can disable the visual indicator 660 as well as the tachometer, which can have benefits such as, for example and without limitation, saving energy and reducing wear on the visual indicator 660.

Figure 25:
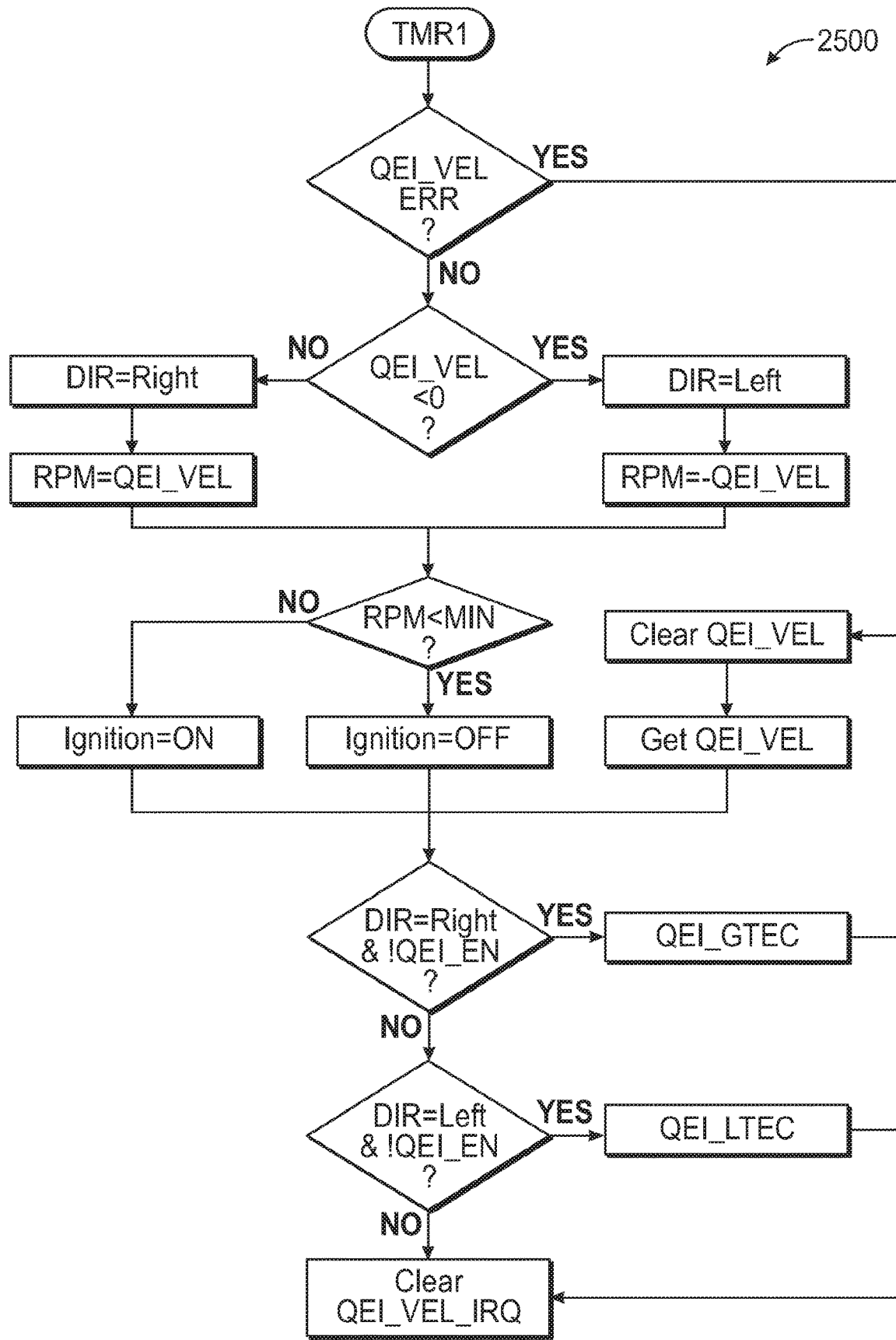
FIG. 25 is a flowchart showing an algorithm for ongoing operation of the angular position encoder of FIG. 11 as incorporated into the engine of FIG. 1.

FIG. 25 is a flowchart showing a TMR1 algorithm, sequence, or process 2500 for ongoing operation of the angular position encoder 1100 of FIG. 11 as incorporated into the engine 100 of FIG. 1. Using the algorithm shown, the control board 1410 can determine the precise position of the engine 100 inside the combustion cycle and whether the engine 100 is spinning in a clockwise (CW) or counter-clockwise (CCW) direction. The engine rotational speed can be calculated directly from counts during Timer 1's period. More specifically, as shown in FIG. 25, the sequence 2500 can incorporate an error-check step titled "QEI_VEL ERR?" If an error is detected, such as data overflow in a register of the chip 1110, subsequent steps can include clearing the error and then clearing the value of QEI_VEL. If no error is detected, the direction of rotation of the engine 100 (via detection of rotation of the timing gear 960 and specifically the position magnet 1160 secured therein) can be determined. From the value of QEI_VEL being positive, the chip 1110 can determine that the engine 100 is spinning to the left or in the COW direction. From the value of QEI_VEL being negative, the chip 1110 can determine that the engine 100 is spinning to the right or in the CW direction. In either case, once such a determination is made, an absolute value of the QEI_VEL value can be taken and set as the new QEI_VEL. In a subsequent step, for at least safety reasons the engine rotational speed can be checked. If the rotational speed is below a certain value (for example and without limitation, the aforementioned 25 or 50 rpm), the ignition can be switched OFF or maintained in an OFF position so that any fuel in the combustion chambers is not ignited and the engine 100 started when someone may be working nearby moving parts of the aircraft 80 such as the propeller. If the rotational speed is above the set value, however, the ignition can be switched ON or maintained in an ON position. In a subsequent step or series of steps the chip 1110 can perform an interrupt sequence, at the conclusion of which the chip 1110 can clear a QEI_VEL_IRQ value. At predetermined intervals as desired the chip 1110 can repeat the TMR1 sequence shown.

Figure 26:
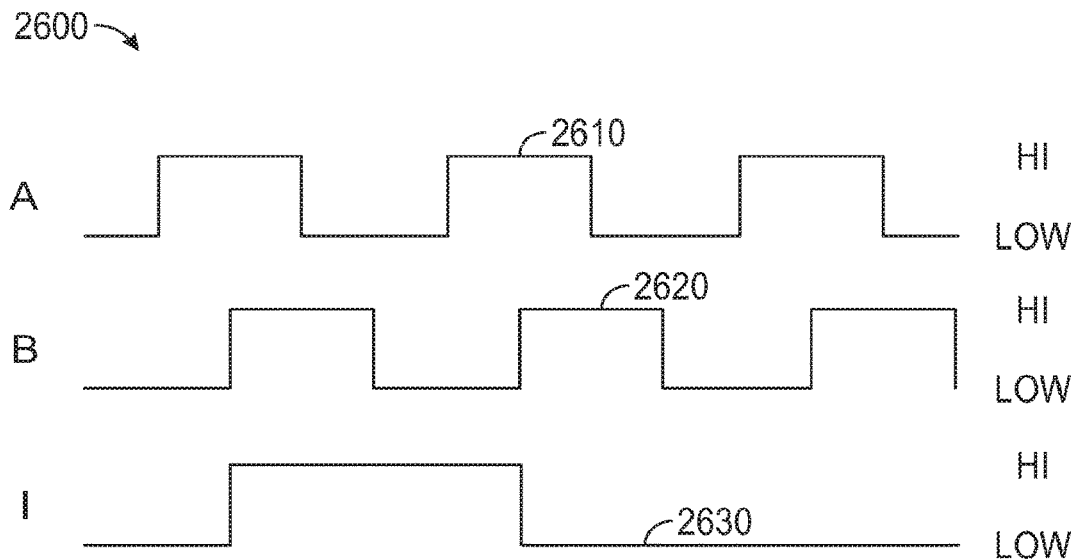
FIG. 26 is a pulse diagram corresponding to operation of the angular position encoder of FIG. 11 showing sequences of ON-OFF values—or pulses—for each of three values A, B, and I, where "A" corresponds to a first position count, "B" corresponds to a second position count offset from the first position count, and "I" corresponds to an index count.

FIG. 26 is a pulse diagram 2600 showing sequences of ON-OFF or HI-LOW values—or pulses—for each of three values A, B, and I, where "A" corresponds to a first position count, i.e., an A value 2610, "B" corresponds to a second position count or a B value 2620, which can be offset from the first position count, and "I" corresponds to an index count or the index value 2630. The pulses indicated by the peaks of each sequence of A, B, and I values are generated as the polarized magnet 1160 (shown in FIG. 11 in simplified form and comprising north and south magnetic poles) rotates in close proximity to the chip 1110 (shown in FIG. 11). Each of the A and B sequences can be made to pulse at a particular frequency such as, for example and without limitation, a frequency of 1024 pulses per revolution, while the sequence can be made to pulse at a particular frequency such as, for example and without limitation, a frequency of only one pulse per revolution. The offset A and B sequences, which can be offset by a 90 degree phase shift as shown (hence the "quadrature" in QEI), effectively can increase the accuracy of the I pulse. The I pulse, which can be timed to capture plus or minus a half degree or a degree of rotation in each full rotation of the position magnet 1160, can be used to identify that point at which the EEC 130 is properly positioned with the engine 100 at TDC or at full advance on the number one cylinder.

Again, to help set the ignition timing, each of the EEGs 130 (shown in FIG. 6) can include the visual indicator 660 (shown in FIG. 6) encircling at least one end of a housing of the EEC 130. The visual indicator 660 can be activated within a particular angular range of engine angular positions (typically relative to either the number one piston TDC position or the full advance position of the number one cylinder of the plurality of cylinders 140) and can be visible from anywhere a technician may be positioned around the engine 100 (shown in FIG. 1).

In some aspects, the engine 100 can have a mark indicating TDC or full advance—it could be a mark on a pulley or other rotating component that is mechanically linked to the crankshaft. Such a mark can be viewed on the outside of the engine or on an internal portion of the engine 100 by looking through a hole in the crankcase 110 or cover and confirming, for example, the position at which the mark on the rotating part lines up with the stationary mark on the engine 100. In other aspects, a fuel igniting device 190 such as a spark plug can be removed from the number one cylinder of the engine 100 and the TDC position or full advance position determined through direct measurement or with a tool through a process such as described in Mandatory Service Bulletin MSB94-8D available from Continental Motors, Inc. and revised on Feb. 17, 2010.

According to MSB94-8D, in addition to performing several safety checks and diagnostic measures and situating the aircraft 80 in "a normal attitude on a level surface," the following steps (all quoted directly from the document itself) can be performed with a TDC locator tool to determine TDC for the number one cylinder:

1. Remove all spark plugs. Rotate piston to the start of the compression stroke on No. 1 cylinder. Install the TDC locator into the number one cylinder top spark plug hole.
2. Install the timing disc of the indicator being used on the crankshaft flange, propeller spinner, hub or blade. Ensure that the timing disc support is stationary throughout the timing procedure to prevent error.
3. Turn the propeller slowly in the direction of normal rotation until the piston lightly but positively touches the TDC locator.
4. Rotate the disc of the timing indicator until 0 degrees aligns with the pointer. A light tap of the finger against the dial will ensure that the pointer is centered.
5. Slowly turn the propeller in the opposite direction of normal rotation until the piston lightly but positively touches the TDC locator. Observe the reading, (total degrees of travel) and record. This is the "X" value.
6. Rotate the disc to align 0 degrees with the pointer. Use the following formula, as applicable [to the below-listed gear-driven engine models, although similar formulas exist or can be easily prepared for other gear-driven engine models and are not generally required for direct-drive engine models], to determine[ ] the TDC.

| GO-300, GIO-470, GTSIO-520-C | X Degrees Divided By 2 + 135 Degrees = Y Degrees |
| GTSIO-520-D, H, F, K, L, M, N | X Degrees Divided By 2 + 120 Degrees = Y Degrees |
| Tiara 6-285, 6-320 | X Degrees Divided By 2 + 90 Degrees = Y Degrees |

Y = DEGREES OF PROP ROTATION FROM 0 DEGREES (PARAGRAPH 6) TO TDC.

7. Remove the TDC locator from the cylinder.
8. With the Y degrees determined, move the propeller that number of degrees (Y degrees) in the direction of normal rotation. This will place the piston at TDC.
9. Once the TDC has been established and set, reset the timing disc to 0 degrees at TDC.

10. Now the correct timing can be set by using the appropriate "propeller shaft angle" (which generally is equal to the full advance position on the number one cylinder) for the corresponding engine model. Move the propeller in the opposite direction of normal rotation past the specified propeller shaft angle magneto timing setting and then back in the direction of normal rotation until the specified propeller shaft angle before TDC is under the pointer. (This removes the factor of gear backlash) reference the following example and [a table provided by an engine manufacturer such as Continental Motors, Inc.] for propeller shaft angle.

EXAMPLE

For a geared engine with a 0.75 propeller to crankshaft RPM ratio and timing specification of 24 degrees BTC [or 24 degrees BTDC, which is 24 degrees before TDC], the propeller shaft angle would be 0.75×24 degrees, or 18 degrees BTC. If the propeller shaft to crankshaft ratio was 0.667, then the propeller shaft timing angle would be 0.667×24 degrees, or 16 degrees BTC.

As described elsewhere herein, the visual indicator 660 can be configured to activate upon the initial supply of power as a tool to show that the visual indicator 660 is operational. Each EEC 130 can also comprise an encoder for tracking the rotational speed and other characteristics of the EEC 130 and the engine 100 overall.

A separate tool such as a magneto timing light or "buzz box" is typically used to set timing on the engine 100 when the ignition controllers 130 are magnetos (see, for example, the Magneto Timing Light Model E50 by Eastern Technology Corporation or ETC of East Hartford, Conn.). Timing with such a tool can require at least the following steps (as quoted directly from the above document itself):

1. Remove all top spark plugs. Rotate the piston to the start of the compression stroke on #1 cylinder. Install the piston stop into the #1 cylinder top spark plug hole.
2. Install the timing disc indicator on aircraft propeller spinner or hub using the supplied rubber bands. Make sure the timing disc indicator is securely fastened to prevent movement during the timing test.
3. Turn the propeller slowly in the direction of rotation until the piston lightly touches piston stop.
4. Rotate the disc of the timing indicator [while ensuring that the timing indicator base (aluminum flower pot) does not move] until Top Center (T.C.) mark is under the point of the weighted pendulum pointer.
5. Slowly turn the propeller in the opposite direction until the piston again lightly touches the piston stop. Observe the reading on the indicator disc under the pointer and rotate the disc (while ensuring that the timing indicator base (aluminum flower pot) does not move) to exactly one half of the number of degrees toward the Top Center (T.C.) mark.
6. Remove the piston stop from the cylinder. Move the propeller back in the direction of normal rotation and verify the engine is on the compression stroke of #1 cylinder by placing a finger over the spark plug hole until building pressure is felt. Continue the rotation until the pointer is under T.C. You now have found top center on the compression stroke.
7. To either check the magneto timing or to time the magnetos to the engine, move the propeller opposite direction of rotation past the specified magneto timing setting and then back in direction of rotation until the desired setting before top center is under the pointer (this removes the factor of gear backlash). NOTE: Engines equipped with impulse couplings must be turned in the direction of rotation until the impulse coupling(s) trip prior to centering the pointer on the desired timing setting.
8. The breaker points should just be starting to open at this setting. Breaker points opening should be checked with an Eastern Model E-50 Synchronizer.

With the EEC 130 as disclosed herein, the ignition timing or synchronization operation can be accomplished after the engine 100 is assembled and installed into an aircraft and without a separate tool such as the aforementioned magneto timing light or "buzz box." The method can include attaching the EEC 130 to the engine 100, rotating the crankshaft until the engine 100 is at either the TDC position or the full advance position for the number one cylinder (such as by using the aforementioned method), rotating each of the EECs 130 until the visual indicator 660 for the EEC 130 activates—indicating that the EEC 130 is in the desired orientation, and securing each EEC 130, e.g., by staking the respective EEC 130 to the engine 100.

The timing itself can be made adjustable to any one of a number of preset values (or other non-preset values) through the programmable controller 1400—which again can be embodied in the control board 1410, in which case the initial setting of the EEC 130 can appear more like a method of synchronization and less like a method of timing. It can be considered more like synchronization in the sense that the disclosed method can synchronize each EEC 130 with respect to a known position of the engine 100 so that any one of a number of timing changes can be made later (including during flight) based on knowledge of the confirmed initial setting.

Figure 27:
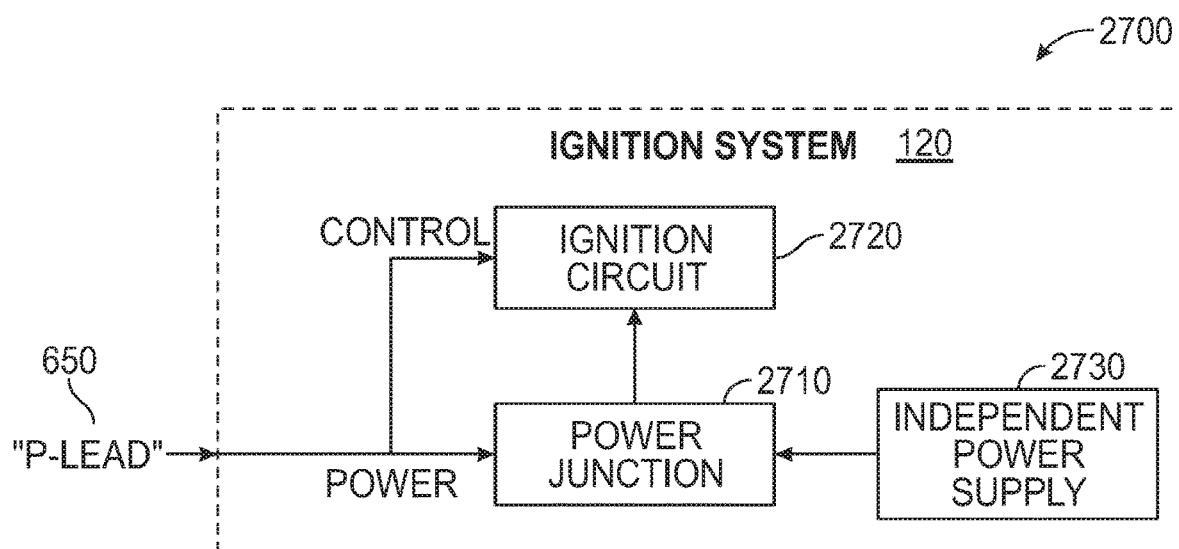
FIG. 27 is a block diagram of the ignition system of FIG. 1 comprising a multi-function P-lead connection.

FIG. 27 is a block diagram 2700 of the ignition system of FIG. 1 comprising a multi-function P-lead connection such as the P-lead connection 650. To selectively help supply ongoing "ship's" power, cut such power, supply independent power, or test the power to the ignition system 120, with a single wire the P-lead connection 650 can be connected to a power junction 2710 and an ignition circuit 2720. The power junction 2710 can receive power from both the independent power supply 2730 and the P-lead connection 650, and the power junction 2710 can distribute that power to the ignition circuit 2720 as described herein. The P-lead connection 650 can, in addition to being a conduit for power to the power junction, can control the ignition circuit 2720 as also described herein. Under starting conditions and under normal operating (including flight) conditions, the power junction 2710 can accept power from the P-lead connection 650, including when the P-lead voltage is higher than the voltage of an independent power supply 2730, which can be the permanent magnet generator built into the EEC 130, or higher than a predetermined cut-off voltage. In some aspects, the ignition circuit can be disabled when the P-lead voltage is at or below the cut-off voltage. In other aspects, when the P-lead voltage potential is at or below the cut-off voltage, the ignition circuit can automatically switch to the independent power supply. When the voltage output of the independent power supply is at or below the cut-off voltage, the ignition circuit can automatically receive power through the P-lead connection 650. As will be described with respect to later figures, a diode-OR circuit can be used to "switch" between power sources although no comparison or evaluation of the various power sources to each other or to a reference voltage need be made in the process. The ignition circuit can also be powered by the independent power supply when the P-lead connection 650 is disconnected (i.e., open), in which case the voltage can be allowed to float above the cut-off voltage and below the independent power supply voltage.

In a typical configuration of the engine 100 comprising two magnetos, five different settings—OFF, RIGHT, LEFT, BOTH, and START—are possible for an ignition switch 2800 (shown in FIG. 28), any of which can and would typically be used for at least testing purposes during pre-flight operations of the engine 100. The possible settings for a typical magneto itself are OPEN (corresponding to normal operation) and GROUND (when the magneto is disabled).

Figures 28, 29:
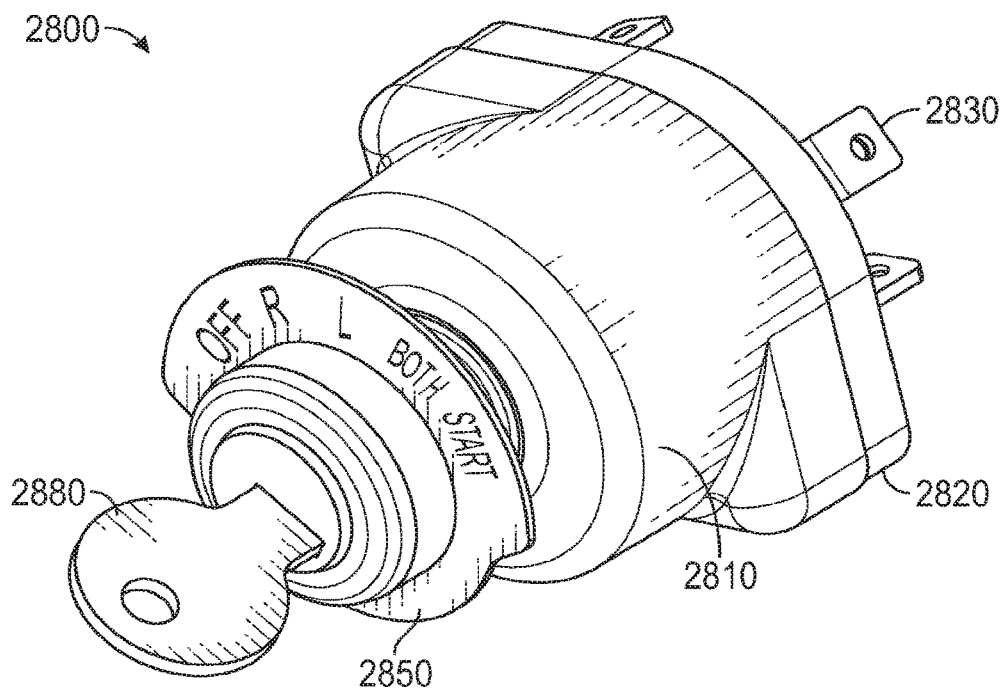
FIG. 28 is an ignition switch configured to control the ignition system of FIG. 1.
FIG. 29 is a table showing the "P-lead input" for each of the first EEC and a second EEC of the pair of EECs of FIG. 5 corresponding to LEFT and RIGHT EECs in each of five ignition switch positions.

Shown in FIG. 28, the ignition switch 2800 can be configured to control the ignition system 120 when comprising an EEC 130, The switch 2800 can comprise a body 2810 and can use many components of a standard switch including, for example and without limitation, a key 2880. A plastic support plate 2820 and contacts 2830 can be configured to send system or ship's power through the P-lead connection 650 when the switch 2800 is in the START and BOTH positions. As shown on a switch plate 2850 of the switch 2800, the same five settings are possible for the ignition switch 2800 in the ignition system 120 comprising the disclosed pair of EECs 130, but in addition each EEC 130 can comprise a permanent magnet generator producing an independent power supply (which can also be referred to as a primary generator system for the EEC 130). In contrast to an ignition system 120 using the magnetos, the possible settings for each of the EECs 130 is POWER (connected to aircraft, battery, or "ship's" power, all of which are equivalent), OPEN (connected not to ship's power but rather simply its own independent power supply), and GROUND (when the EEC 130 is disabled). The operation of the switch 2800 can otherwise be identical to an existing switch configured for use with an ignition system 120 using the magnetos. While the appearance of the switch 2800 may be standard, the internal circuitry, as will be explained with respect to FIG. 30, is new and unique in comparison with the switch that is used with typical magneto systems.

FIG. 29 is a table 2900 showing the "P-lead input" for each of the first EEC 130 and a second EEC 130 of the pair of EECs 130 corresponding to LEFT and RIGHT EECs 130 in each of five positions of the ignition switch 2800. When set in the OFF position, the P-lead on each of the left EEC 130 and the right EEC 130 can be disabled, which means that the EEC 130 is connected to ground. When set in the RIGHT position, the P-lead on the left EEC 130 can be disabled (by connecting its P-lead to ground) but the P-lead input on the right EEC 130 can still have generator power, in which case the independent power supply and the operation generally of the right EEC 130 can be tested (because the battery is disconnected and therefore battery power unavailable). Similarly, when set in the LEFT position, the P-lead on the right EEC 130 can be disabled (by connecting its P-lead to ground) but the P-lead input on the left EEC 130 can have generator power, in which case the independent power supply and the operation generally of the left EEC 130 can be tested (again, because the battery is disconnected and therefore battery power unavailable).

Again, when set in either the BOTH or START positions, the EEC 130 can have access to both battery power ("ship's" power) and its own independent power supply for redundancy (i.e., if one power source fails, power should be available from the other power source). In effect, in the BOTH and START positions the P-lead is "closed" to ship's power (generally a voltage of 28 V) as opposed to being closed to ground (in which case the PMG would be disabled). Not only is battery power available through the P-lead connection 650 to the ignition system in the case of failure of the power generating function of one or both EEC 130s or at least the permanent magnet generators contained therein, but as long as the EECs 130 otherwise function and battery power is available (for example, the battery itself is charged or is being charged through the use of charging equipment such as, for example and without limitation, an alternator), the ignition system 120 can run on available power from the battery and alternator without an independent power supply.

Figure 30:
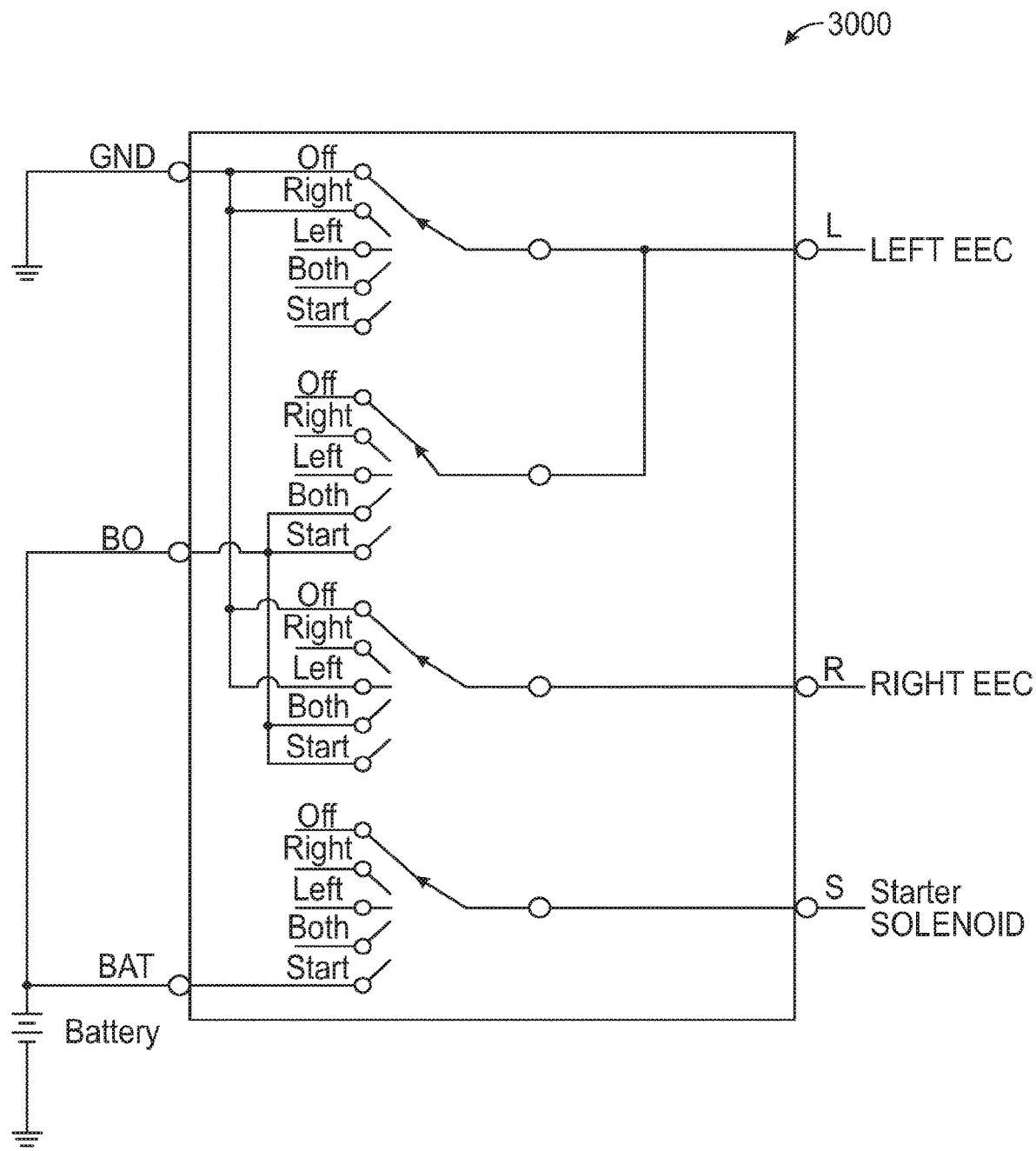
FIG. 30 is an electrical schematic showing the operation of the ignition switch in each of the ignition switch positions of FIG. 29.

FIG. 30 is an electrical schematic 3000 showing the operation of the ignition switch in each of the ignition switch positions of FIG. 29. As shown, any movement of the switch 2800 between any of the aforementioned switch settings will cause the arrow shown adjacent to each set of five settings to make the same movement simultaneously. The "LEFT EEC" can correspond to the left EEC 130 comprising the first permanent magnet generator, the "RIGHT EEC" can correspond to the right EEC 130 comprising the second permanent magnet generator, and the "STARTER SOLENOID" can correspond to a typical component for starting the engine 100—typically through engagement of a starter motor with the flywheel 105 of the engine 100. The independent power supply for each EEC 130 can function at an engine speed of as little as 200 RPM, and each EEC 130 can operate consistently with power in a 9.5V-32V range.

Figure 31:
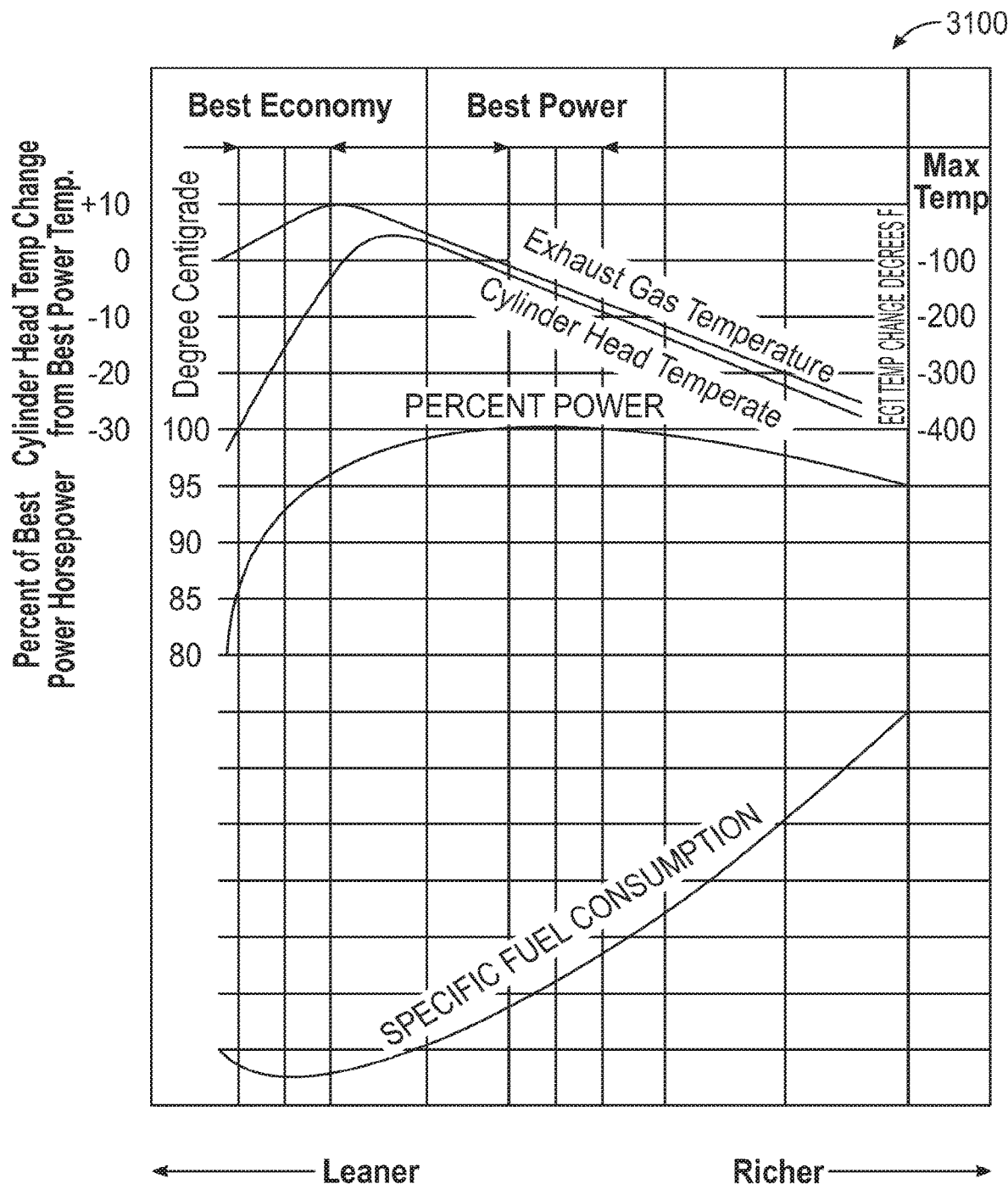
FIG. 31 is an engine performance diagram for an engine such as the engine of FIG. 1 in accordance with another aspect of the disclosure in which a magneto ignition system is used.

FIG. 31 is an engine performance diagram 3100 for a typical engine such as the engine 100 but with magnetos installed.

Figure 32:
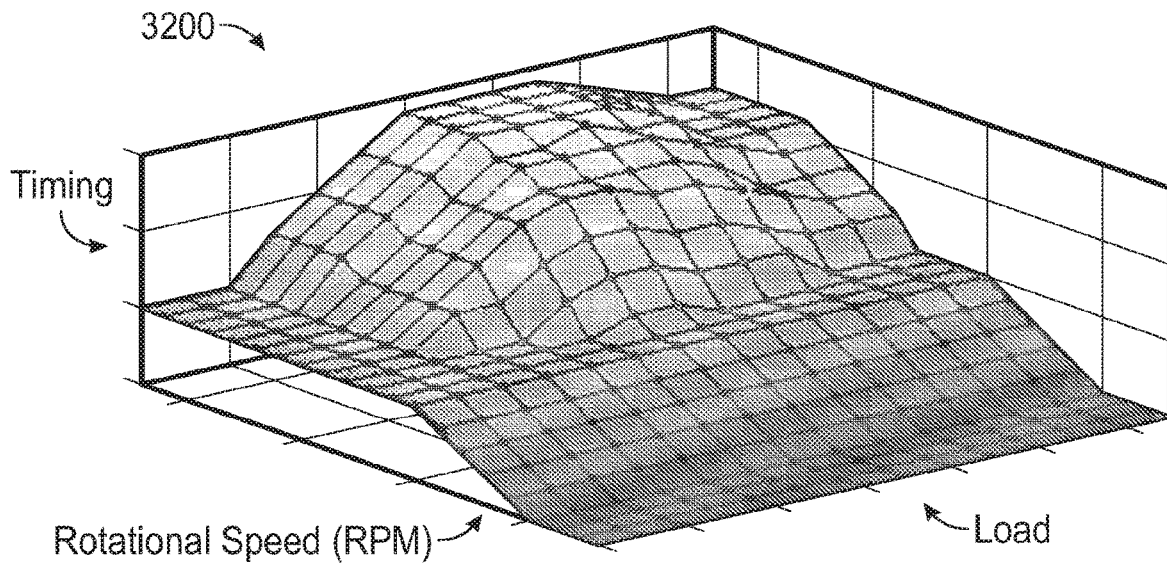
FIG. 32 is a top perspective view of a three-dimensional chart representing an ignition timing map in which the timing varies with respect to a rotational speed of the engine—as represented by a first horizontal axis—and with respect to a load placed on the engine—as represented by a second horizontal axis.

As shown in FIG. 32, an ignition timing map 3200 can represent how the timing of the ignition system 120 of the engine 100 can vary with respect to a rotational speed of the engine—as represented by a first horizontal axis—and with respect to a load placed on the engine—as represented by a second horizontal axis. Again, based on a predetermined map for the engine 100, which can vary by size, type, and configuration of the engine 100, the timing (e.g., the timing advance in degrees before top dead center or full advance) can be automatically adjusted based on the load of the engine as determined from the input from the MAP sensor 504 and the MAT sensor 505 and the RPM of the engine as measured inside the EEC 130 or independently through the aforementioned tachometer.

Figure 33:
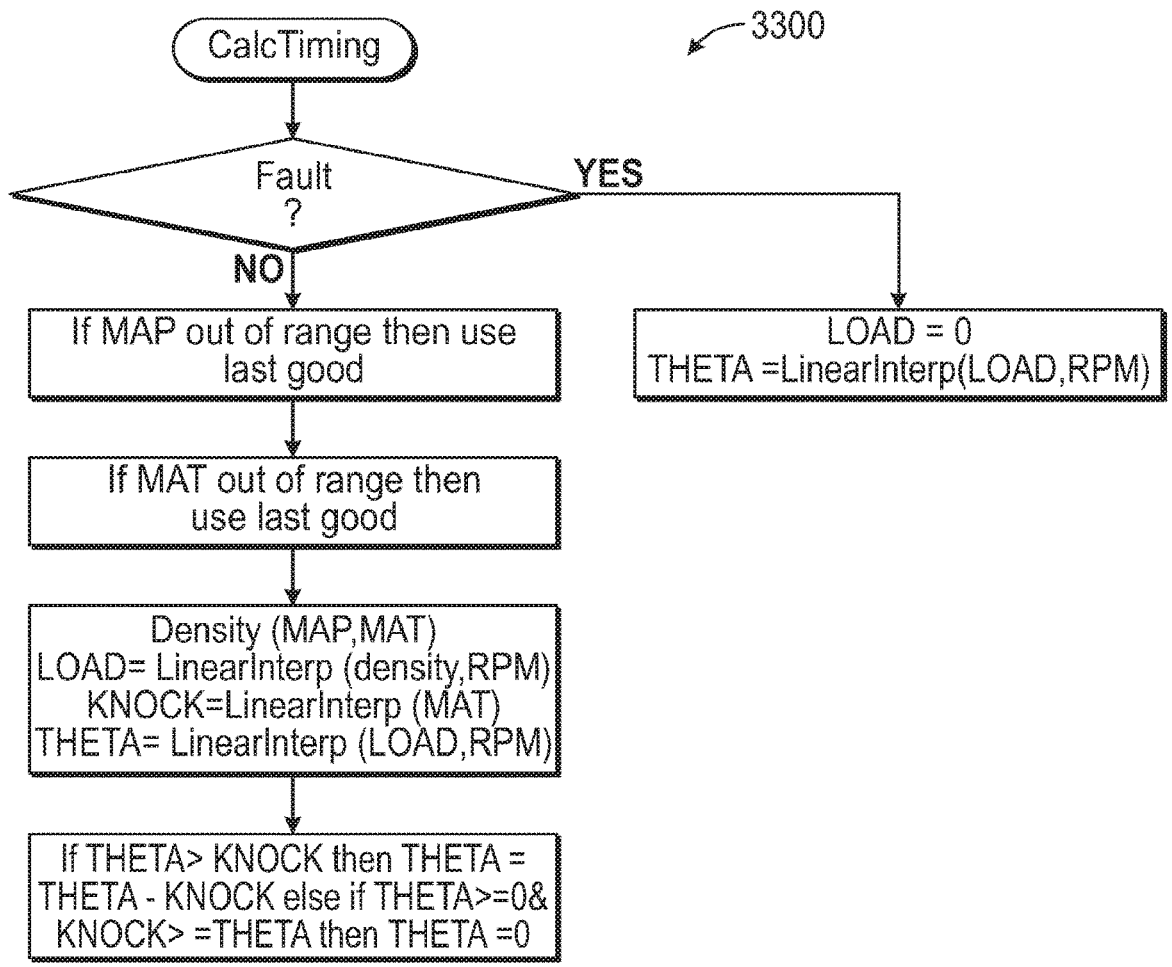
FIG. 33 is a flowchart describing, at least in part, the operation of the ignition system of FIG. 1 and, more specifically, a method of timing calculation and fault accommodation.

FIG. 33 is a flowchart describing, at least in part, the operation of the ignition system of FIG. 1; and, more specifically, a method of timing calculation and fault accommodation. An ignition timing calculation routine 3300 can handle sensor faults; calculate density, load, and ignition timing; and de-rate ignition timing according to readings from the MAT sensor 505. The ignition timing calculation routine 3300 can be the fourth and final step in the Timer 4 routine 3600 shown in FIG. 36. If a fault is detected, for example, an assumption about the load can be made (e.g., no load) and the timing (as represented by THETA) can be interpolated from this load value and the rotational speed of the engine.

Figure 34:
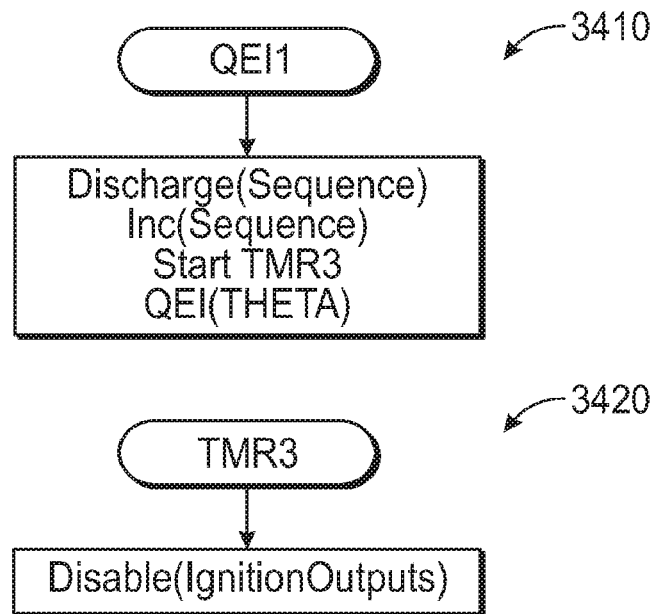
FIG. 34 is a pair of flowcharts describing, at least in part, the operation of the ignition system of FIG. 1; and, more specifically, a first routine enabling ignition outputs and a second routine disabling the ignition outputs.

FIG. 34 is a pair of flowcharts describing, at least in part, the operation of the ignition system of FIG. 1; and, more specifically, a QEI1 routine 3410 enabling ignition outputs and a Timer 3 or TMR3 routine 3420 disabling the ignition outputs. The QEI1 routine 3410 can be called when a position count (encoder) is reached. The QEI1 routine 3410 can enable the ignition output according to the current sequence (counter). When the sequence is incremented, Timer 3 routine 3420 can be started, and the next ignition position value can be stored in the QEI interrupt register. The Timer 3 routine 3420 can interrupt after the 1 microsecond period has expired and can subsequently disable all ignition outputs.

Figure 35:
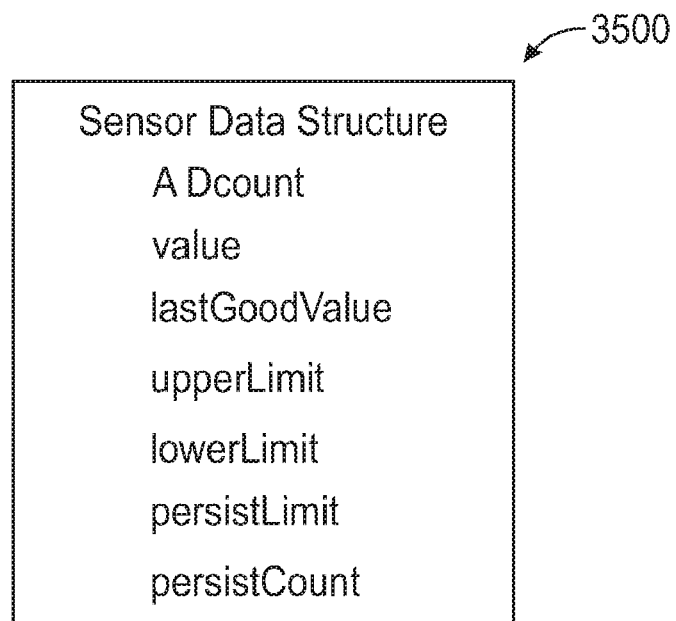
FIG. 35 is a list of variables for use in describing, at least in part, the operation of the ignition system of FIG. 1.
Figure 36:
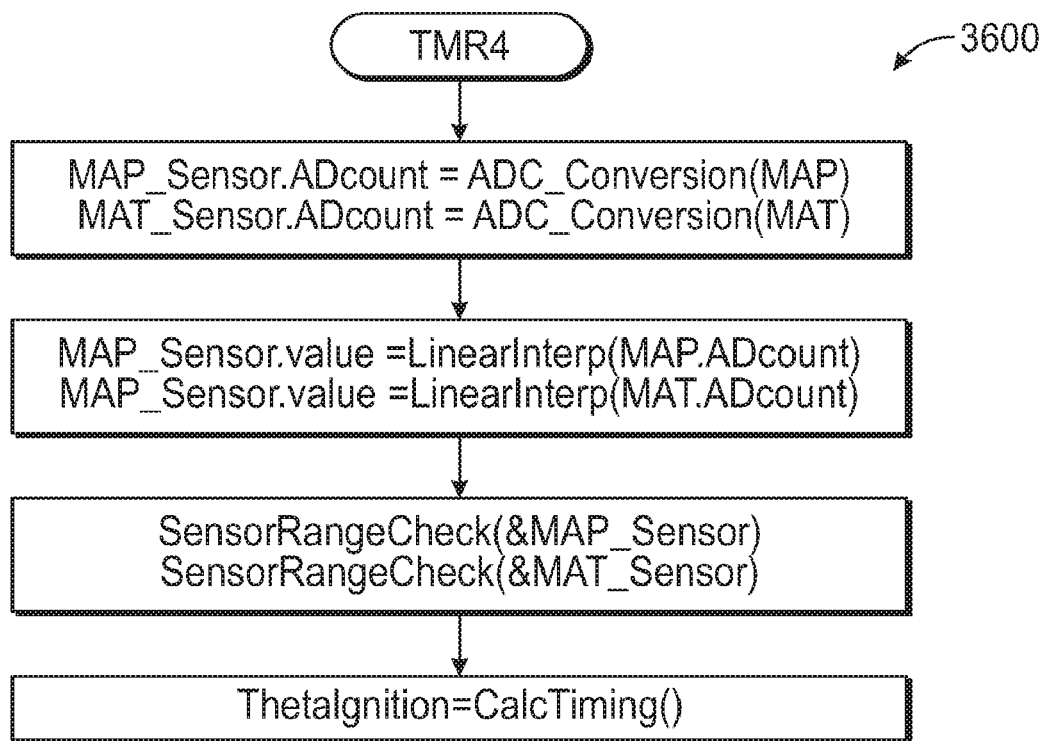
FIG. 36 is a flowchart describing, at least in part, the operation of the ignition system of FIG. 1 and, more specifically, a timer routine comprising an analog to digital converter (ADC) routine, a linear interpolation routine, a sensor range check routine, and an ignition timing calculation routine.

FIG. 35 is a list 3500 of variables for describing, at least in part, the operation of the ignition system of FIG. 1 and the variables used in the various routines disclosed herein, FIG. 36 is a flowchart describing, at least in part, the operation of the ignition system of FIG. 1; and, more specifically, a Timer 4 or TMR4 routine 3600 comprising an analog to digital converter (ADC) routine, a linear interpolation routine, a sensor range check routine, and an ignition timing calculation routine. The Timer 4 routine 3600 can be called at a fixed period of 99.9 milliseconds. The Timer 4 routine 3600 can call the ADC routine for each of the sensor channels (e.g., MAP and MAT) and the ADC can return counts in a range of 0 to 1023. A linear interpolation routine can be used to convert AD counts to engineering units according to the data provided by the manufacturer of the respective sensors 504,505. The range of each of the sensors 504,505 can be checked and fault persistence can be monitored. For example and without limitation, a persist limit of 40 (which can correspond to a duration of 4 seconds) can be set. Finally, the Timer 4 routine 3600 can end with the ignition timing calculation routine 3300 (shown in FIG. 33 and described previously).

Figure 37:
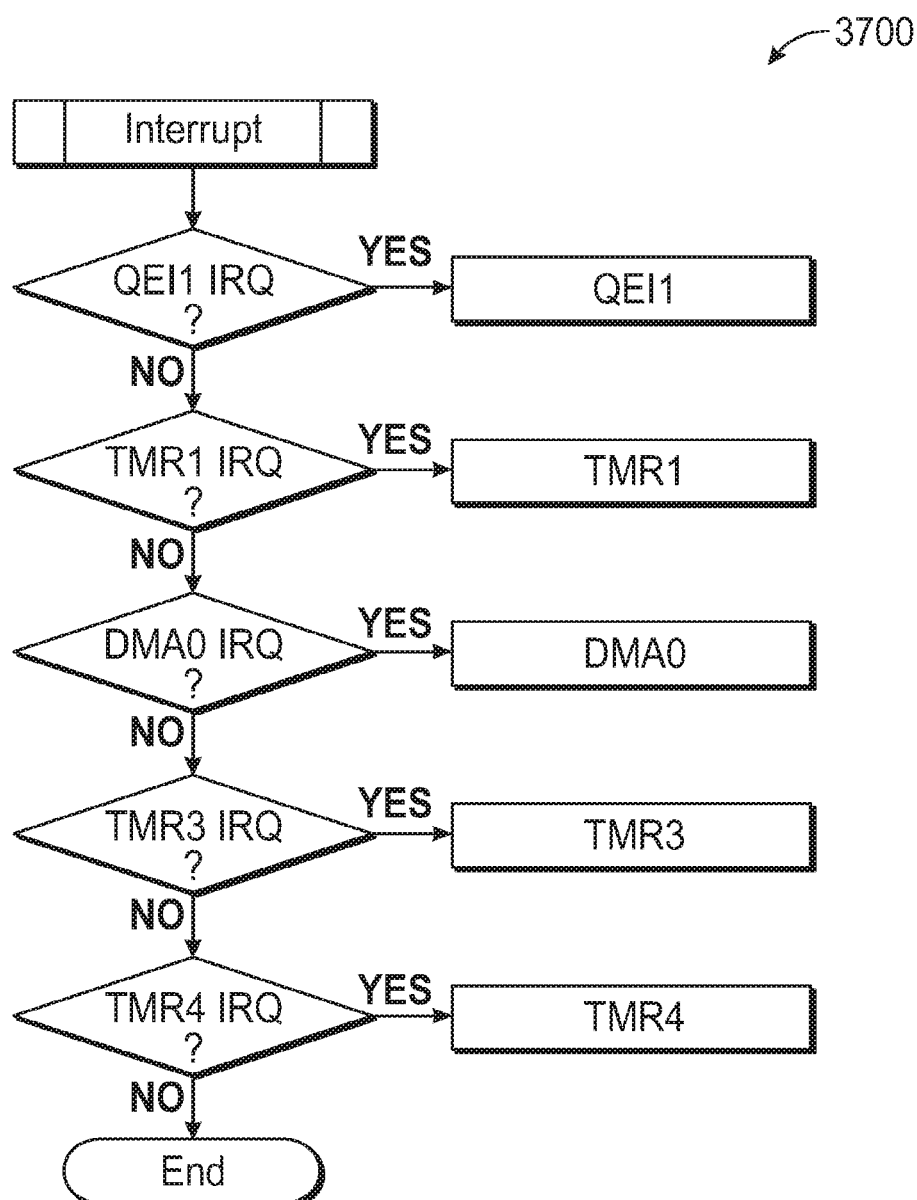
FIG. 37 is a flowchart describing, at least in part, the operation of the ignition system of FIG. 1 and, more specifically, an interrupt architecture for the ignition system.

FIG. 37 is a flowchart 3700 describing, at least in part, the operation of the ignition system of FIG. 1; and, more specifically, an interrupt architecture for the ignition system. A QEI interrupt or interrupt request line (IRQ), which can be called QEI IRQ, can interrupt a routine used to determine the angular position of the engine 100 and can be used to trigger ignition events, e.g., at each cylinder of the engine 100. A Timer 1 interrupt TMR1 IRQ can be used to calculate angular velocity of the engine 100 by counting the number of encoder pulses over a fixed period. A DMA interrupt DMA0 IRQ can be used to process incoming CAN bus messages. A Timer 3 interrupt TMR3 IRQ can be used to turn off the ignition trigger after a period of time such as, for example and without limitation, 1 microsecond (1 µs). A Timer 4 interrupt TMR IRQ can be used to process the sensor inputs—such as from the sensors 504,505—on a fixed time interval.

Figure 38:
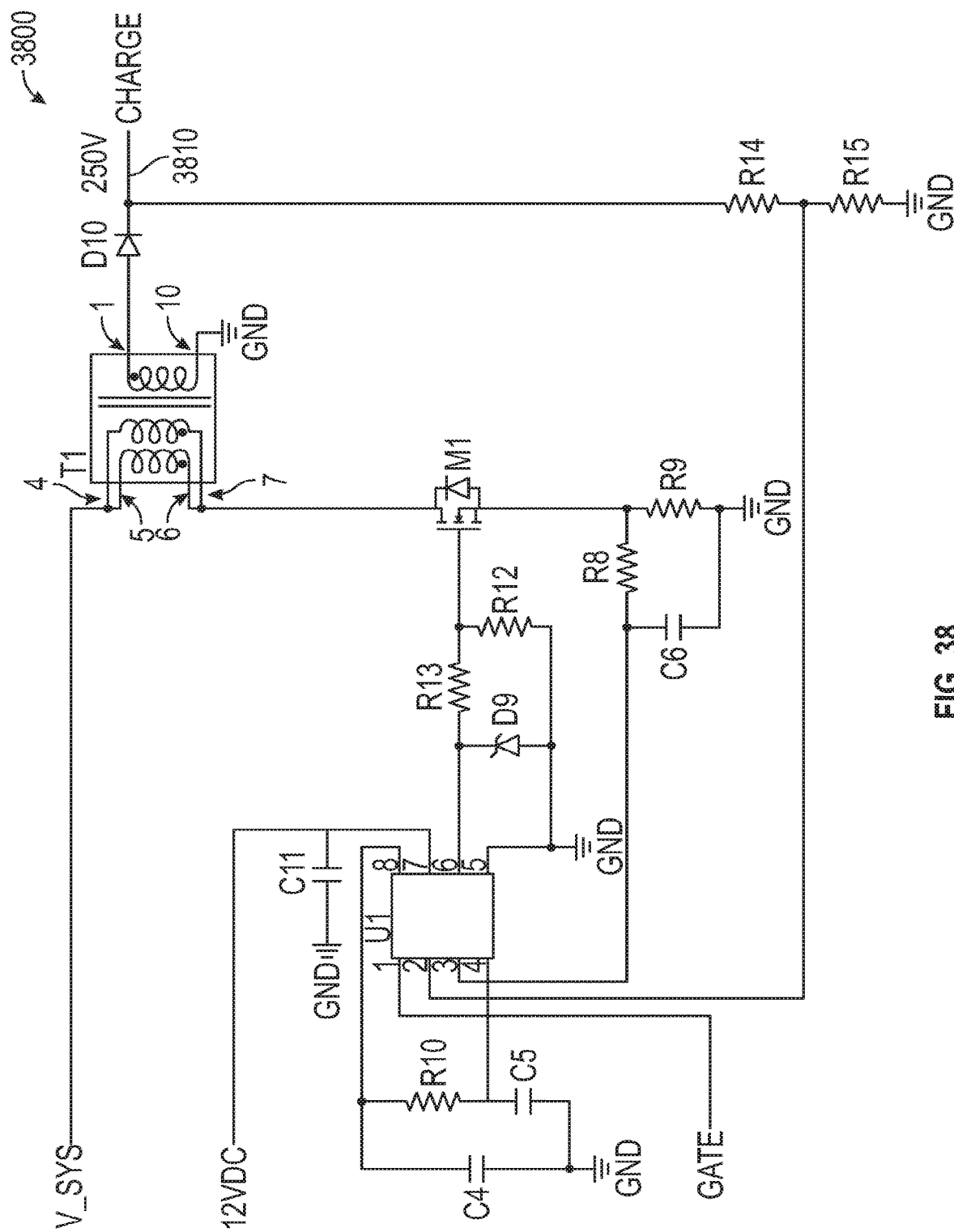
FIG. 38 is an electrical schematic describing, at least in part, electrical interconnections of the ignition system of FIG. 1 and, more specifically, a charge circuit of the ignition system.

FIG. 38 is an electrical schematic describing, at least in part, electrical interconnections of the ignition system of FIG. 1; and, more specifically, a charge circuit 3800 of the ignition system. As shown, the charge circuit 3800 can comprise a controller U1, For example and without limitation, the controller U1 can be a standard flyback converter such as a UC1845 current-mode pulse-width modulation controller from Texas Instruments of Dallas, Tex., U.S.A. The controller U1 can be powered by a 12 VDC power leg shown also in FIG. 39 entering the charge circuit 3800. As shown, various resistors (e.g., R8-R10 and R13-R15), various capacitors (e.g., C4-C6 and C11), diodes (e.g., the Zener diode D9 and the diode D10), the transformer T1, the transistor M1—which can function as a switch to turn current to the transformer ON and OFF, and optionally other or different electrical components within the knowledge of one of ordinary skill in the art can, when mounted on a printed circuit board or equivalent structure, together facilitate production of a high voltage (e.g., 250 V) coil input 3810 labeled CHARGE in the schematic. The coil input 3810 can provide the voltage necessary for the coil pack 180—whether integrated into the EEC 130 as shown in FIG. 48 or not as shown in FIG. 1—to provide current to each of the fuel igniting devices 190, e.g., the spark plugs. As a fourth input to the charge circuit 3800, a GATE signal, as will be described below, can selectively enable and disable the charge circuit 3800 via a pin 1 of the controller U1. For example and without limitation, the transformer T1 can be a flyback transformer such as model no, 750032051 from Wuerth Electronik GmbH & Co. KG of Waldenburg, Germany.

Figure 39:
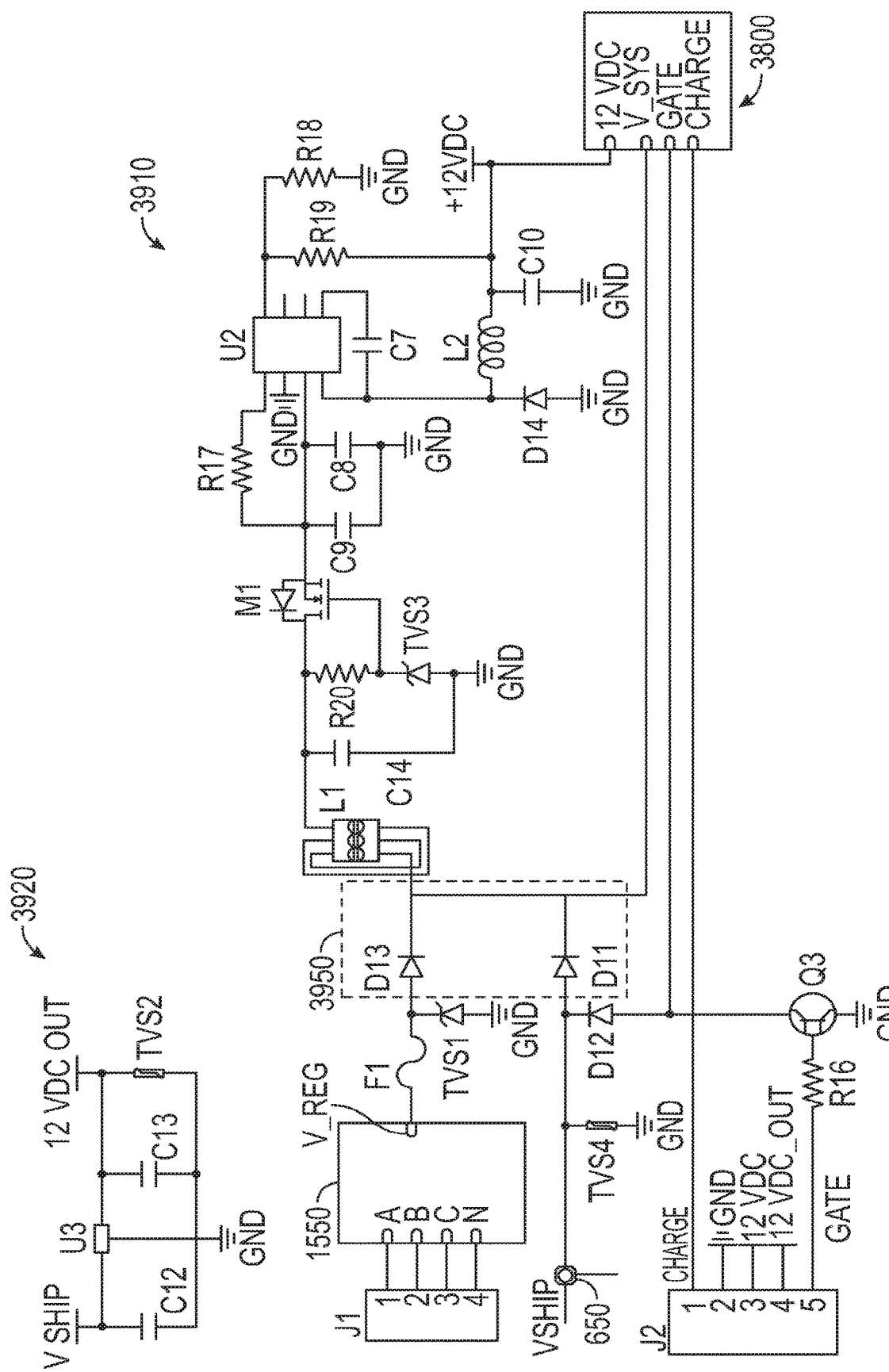
FIG. 39 is an electrical schematic further describing, at least in part, the electrical interconnections of the ignition system of FIG. 1 and, more specifically, a P-lead and power supply circuit of the ignition system.

FIG. 39 is a pair of electrical schematics further describing, at least in part, the electrical interconnections of the ignition system of FIG. 1; and, more specifically, power supply circuits 3910,3920 of the ignition system. As shown, the P-lead connection 650 can be connected via the diode D12 and the GATE line shown in FIGS. 38 and 39 to the pin 1 of the controller U1 (shown in FIG. 38) of the charge circuit 3800, which can be considered a disable pin of the controller U1, Grounding the P-lead connection 650 by operation of the transistor Q3 to close a connection between the P-lead connection 650 and ground can ground pin 1 of the controller U1 and thereby disable the charge circuit. With this feature, the microcontroller 1430 can disable the ignition circuit at speeds below the "cut-on" to prevent turning of the engine at times when such operation may not be desired such as when, for example and without limitation, maintenance is being performed on or around the engine 100, The P-lead connection 650 can be overvoltage protected by the varistor or transient voltage suppressor TVS4, which can be a Metal Oxide Varistor (MOV). Risk of failure of the generator/regulator portion of the system—connected to and supplying power to the power supply circuit 3910 through the connector J1, can be reduced with a fuse F1 and a transient voltage suppressor TBS1. The regulator-rectifier portion 1500 and specifically the regulator-rectifier board 1550—or the control board 1410 where the control board 1410 incorporates functions of the regulator-rectifier board 1550—can supply a rectified and regulated DC voltage as an output. A ferrite bead or EMI filter L1 and an active clamp M1 (e.g., set at 32 VDC) can be located after the P-lead and a generator diode-OR circuit 3950, A switched mode power supply (SMPS) can regulate the system voltage (9.5-32 V) to 12 VDC. The control board 1410 and specifically the microcontroller 1430 (shown in FIG. 43) can also disable the charge circuit. For example, this can be done when the drive shaft 620 turns below 50 rpm. Optionally, a linear regulator such as shown in the power supply circuit 3920 can be incorporated into the EEC 130.

As shown, the power supply circuits 3910,3920 can comprise various resistors (e.g., R16-R20), various capacitors (e.g., C7-C10 and C12-014), transient voltage suppressors (e.g., the transient voltage suppressors TVS1-TVS4, which can at least in some cases be diodes), diodes (e.g., D11-D14), the transformer T1 (which can be the same as the aforementioned transformer 1552), the filter L1, the active clamp M1, an inductor L2, a switching voltage regulator U2, the transistor Q3. One or more of these components and optionally other or different electrical components within the knowledge of one of ordinary skill in the art can, when mounted on a printed circuit board or equivalent structure, together facilitate production of the 12 VDC output used to supply power to the controller U1 of the charge circuit 1800 and the system voltage V_SYS used to supplier power to the coil input 3810 (shown in FIG. 38). For example and without limitation, the switching voltage regulator U2 can be a standard switching voltage regulator such as a model LM22670MRX-ADJ/NOPB device from Texas Instruments. For example and without limitation, a controller U3 of the power supply circuit 3920 can be a voltage regulator such as model no. MC7812BDT 1.0 A positive voltage regulator from ON Semiconductor of Tokyo, Japan. For example and without limitation, the transistor Q3 can be an NPN transistor.

The diode-OR circuit 3950 comprising the diode D11 and the diode D13 can be in electrical communication with the permanent magnet generator via the diode D13 and can be in electrical communication with the battery or VSHIP of the aircraft 80 (shown in FIG. 54) via the diode D11. The diode-OR circuit 3950 can be positioned between each of the battery of the aircraft 80 and the permanent magnet generator on the one side and an output system voltage V_SYS on the other side, the EEC 130 being configured to automatically supply power to the coil input 3810 from a one of the permanent magnet generator (e.g., via the regulator-rectifier board 1550) and the battery or VSHIP (e.g., via the P-lead connection 650). Current will flow through one line or another as needed not based on the operation of a switch but by the presence of a voltage or voltages through each branch sufficient to produce V_SYS (e.g., by overcoming the bias of the respective diode D11,D13). For example and without limitation, each of the diodes D11,D13 can be a Schottky diode such as model no. B550C-13-F 5.0 A Schottky barrier rectifier from Diodes Incorporated of Plano, Tex., U.S.A.

Figure 40:
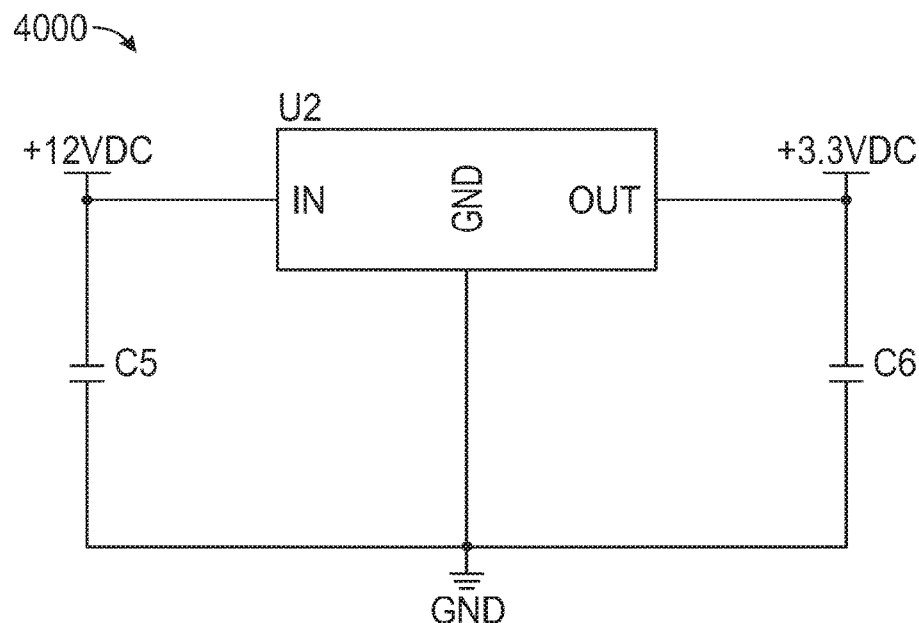
FIG. 40 is an electrical schematic further describing, at least in part, the electrical interconnections of the ignition system of FIG. 1 and, more specifically, a power supply of the ignition system.

FIG. 40 is an electrical schematic 4000 further describing, at least in part, the operation of the ignition system 120 of FIG. 1 and, more specifically, a power supply of the ignition system 120. For example and without limitation, the controller U2 can be a voltage regulator such as model no. TLE 4284 1.0 A NPN type voltage regulator from Infineon Technologies AG of Neubiberg, Germany.

Figure 41:
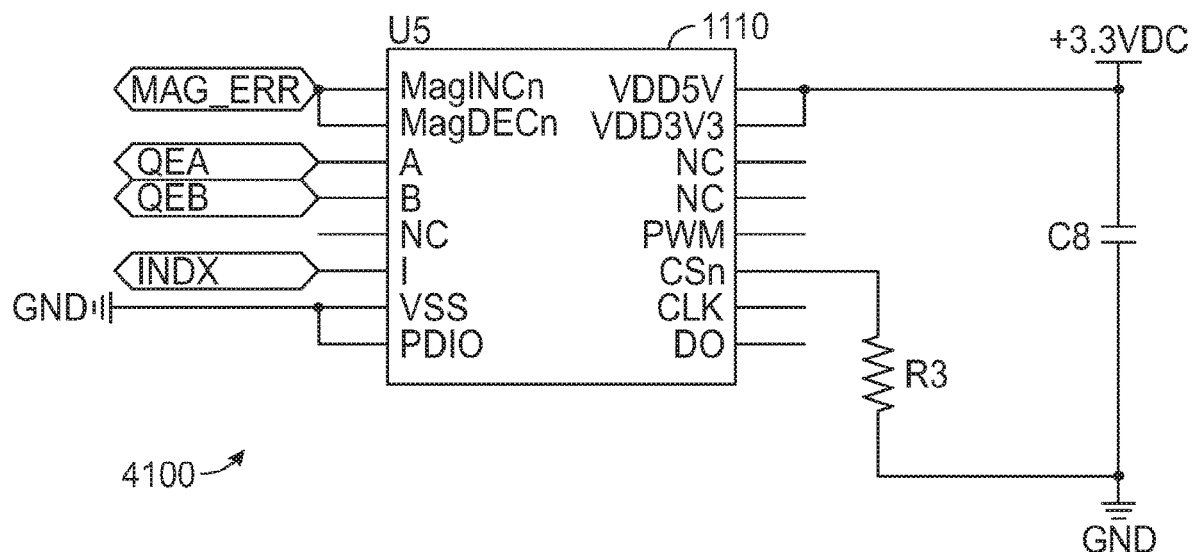
FIG. 41 is an electrical schematic further describing, at least in part, the electrical interconnections of the ignition system of FIG. 1 and, more specifically, the angular position encoder of the ignition system.

FIG. 41 is an electrical schematic 4100 further describing, at least in part, the electrical interconnections of the ignition system 120 of FIG. 1 and, more specifically, connecting the chip 1110 of the angular position encoder 1100 (shown in FIG. 11) of the ignition system 120. For example and without limitation, the chip 1110 of the angular position encoder 1100 can be a magnetic position sensor such as an AS5045B 12-bit programmable magnetic position sensor from ams AG of Premstaetten, Austria, which reports a resolution of 0.0879 degrees or 4096 measurable positions per revolution and a supply voltage of 3.3 V or 5 V.

Figure 42:
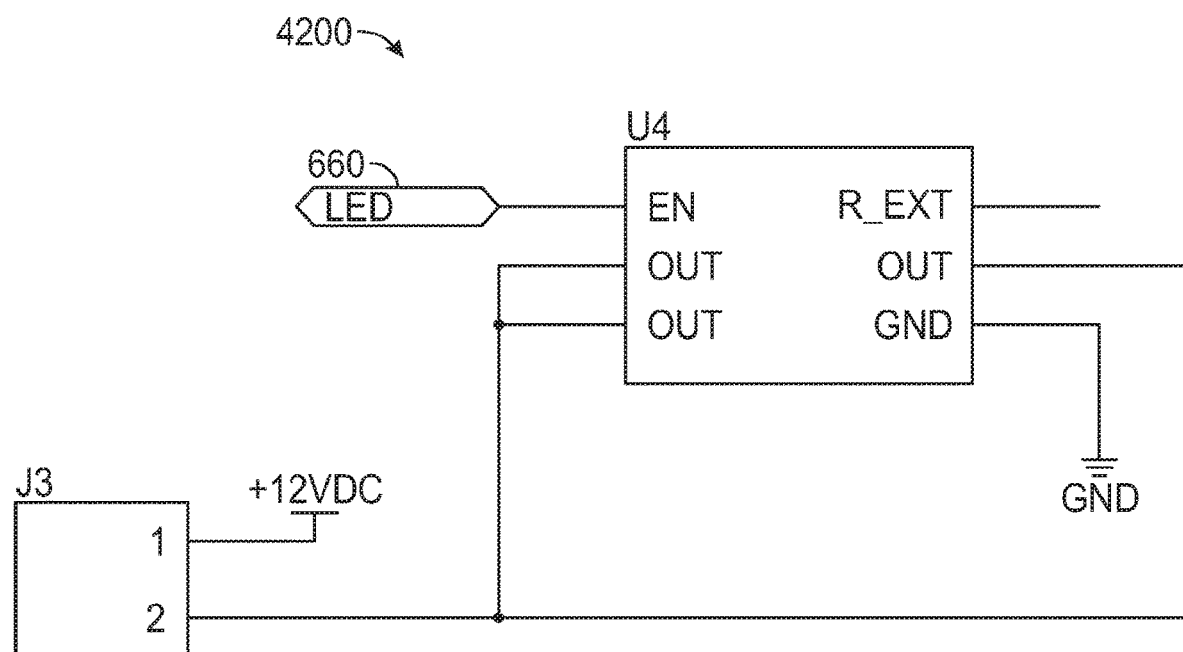
FIG. 42 is an electrical schematic further describing, at least in part, the electrical interconnections of the ignition system of FIG. 1 and, more specifically, an LED driver of the ignition system.

FIG. 42 is an electrical schematic further describing, at least in part, the electrical interconnections of the ignition system 120 of FIG. 1; and, more specifically, an LED driver circuit 4200 of the ignition system 120. For example and without limitation, a controller U4 of the LED driver circuit 4200 can be a current regulator such as an BCR421UW6-7 linear LED constant current regulator from Diodes Incorporated.

Figure 43:
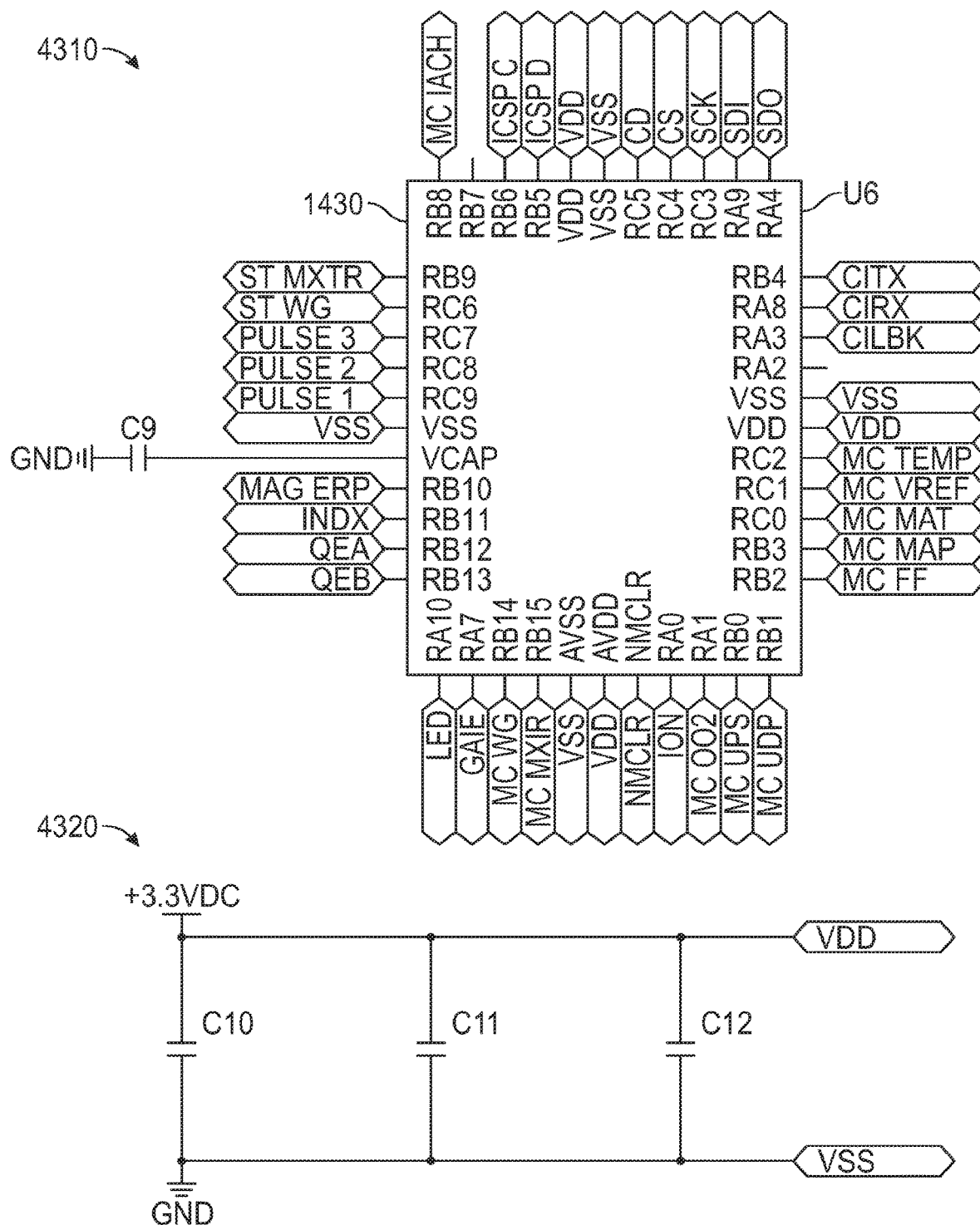
FIG. 43 is a pair of electrical schematics further describing, at least in part, the electrical interconnections of the ignition system of FIG. 1 and, more specifically, a microcontroller of the ignition system and its power supply.

FIG. 43 is a pair of electrical schematics further describing, at least in part, the electrical interconnections of the ignition system 120 of FIG. 1 and, more specifically, a circuit 4310 of the microcontroller 1430 of the ignition system 120 and its power supply circuit 4320. For example and without limitation, the microcontroller 1430 can be a microcontroller such as model no. dsPIC33EP512MC504-E/PT 16-bit microcontroller from Microchip Technology Inc. of Chandler, Ariz., U.S.A.

Figure 44:
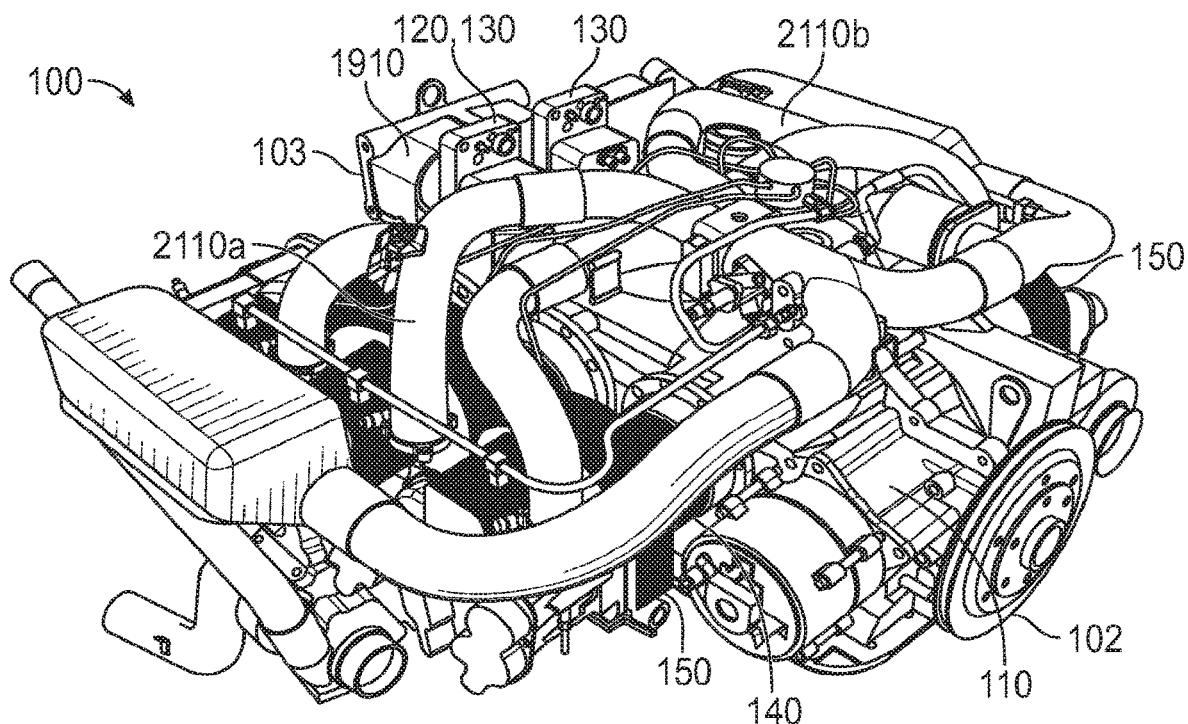
FIG. 44 is a top front perspective view of the engine of FIG. 1 in accordance with another aspect of the current disclosure and with various mechanical and electrical components removed.

As shown in FIG. 44, similarly as shown in the engine 100 of FIGS. 19 and 20, each of the EECs 130 of the engine 100 can be oriented in an opposite direction of that shown in the engine 100 of FIG. 1 and can be mounted to the gear train 1910. Intake manifold portions 2110a,b can receive the sensors 504,505 (shown in FIGS. 46 and 47, respectively).

Figure 45:
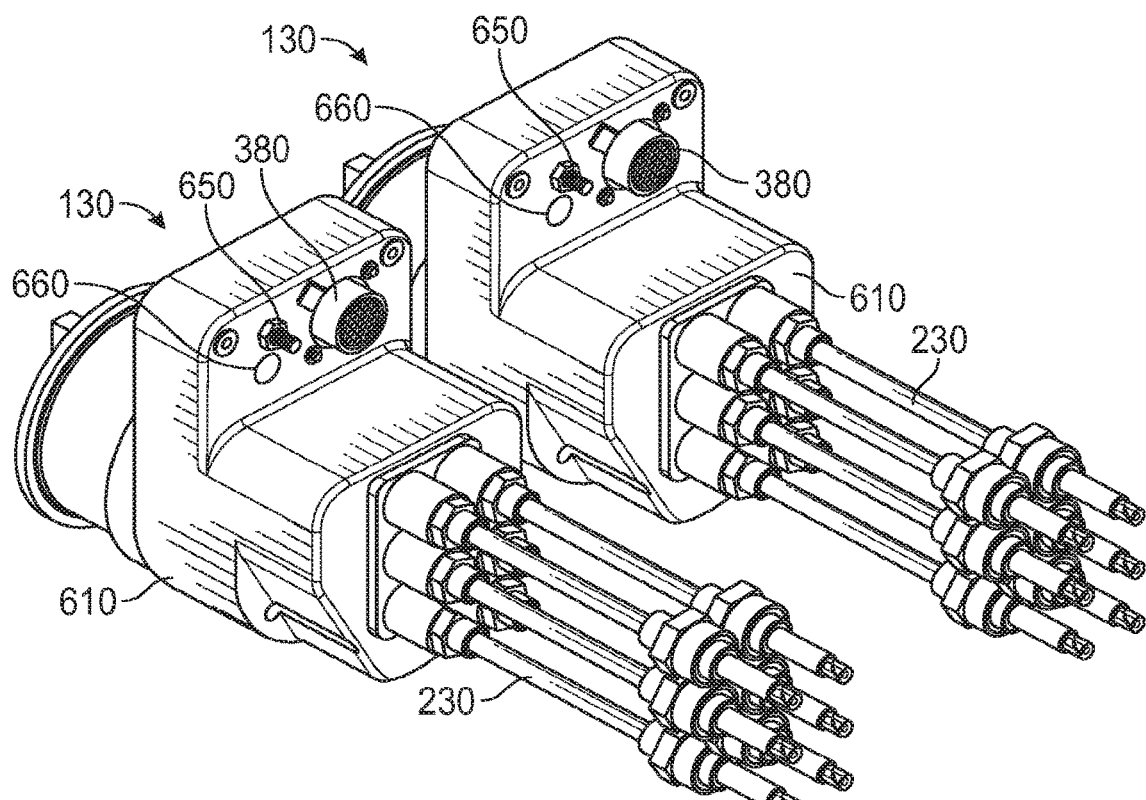
FIG. 45 is a pair of EECs of the engine of FIG. 44 also showing a high-tension wire assembly.

Each of the EECs 130 can comprise the aforementioned body 610, which can be shaped and oriented such that the connection hub 380 and other components such as the connection points for the high-tension leads 230 are easily accessible. In some aspects, as shown in FIG. 6, any of the P-lead connection 650, the visual indicator 660, and also the connection hub 380 can be positioned proximate to the second end 603 (shown in FIG. 48) of the body 610 of the EEC 130. In other aspects, as show in FIG. 45, any of the connection hub 380, the P-lead connection 650, and the visual indicator 660 can be positioned at a point between the first end 602 and the second end 603. In some aspects, as shown in FIG. 6, any of the connection hub 380, the P-lead connection 650, and the visual indicator 660 can be positioned offset radially from the axis 621 (shown in FIG. 52). In some aspects, as shown in FIG. 45, any of the connection hub 380, the P-lead connection 650, and the visual indicator 660 can be oriented in an axial direction with respect to the axis 621.

As shown in FIGS. 46 and 47, respectively, the intake manifold portions 2110a,b can comprise the ports 2170, 2180, which can be configured to receive the MAP sensor 504 and the MAT sensor 505.

As shown in FIG. 48, the EEC 130 can comprise a coil pack 4880, which can be integrated into the body 610. The coil pack 4880 can comprise individual connections 4885 for coupling or connecting with individual connectors 235 of the high tension leads 230. The P-lead connection 650 can be coupled to a P-lead wire 4850. The EEC 130 can further comprise a ground terminal 4870, which can be mounted proximate to the connection hub 380 and the P-lead connection 650. The EEC 130 can be secured to the engine 100 using a clamp 4820, which can press against the flange 605 (shown in FIG. 49) as a fastener 4810a,b is tightened. In some aspects, as shown, the fastener 4810a,b can comprise a stud 4810a fastened to the engine 100 and a nut 4810b fastened to the stud 4810a, In other aspects, different fasteners can be used. A gasket or seal 4830 can be positioned between the engine 100 and the EEC 130 before installation. The EEC 130 can also be coupled to a second connection covered by a boot 4860.

Figure 49:
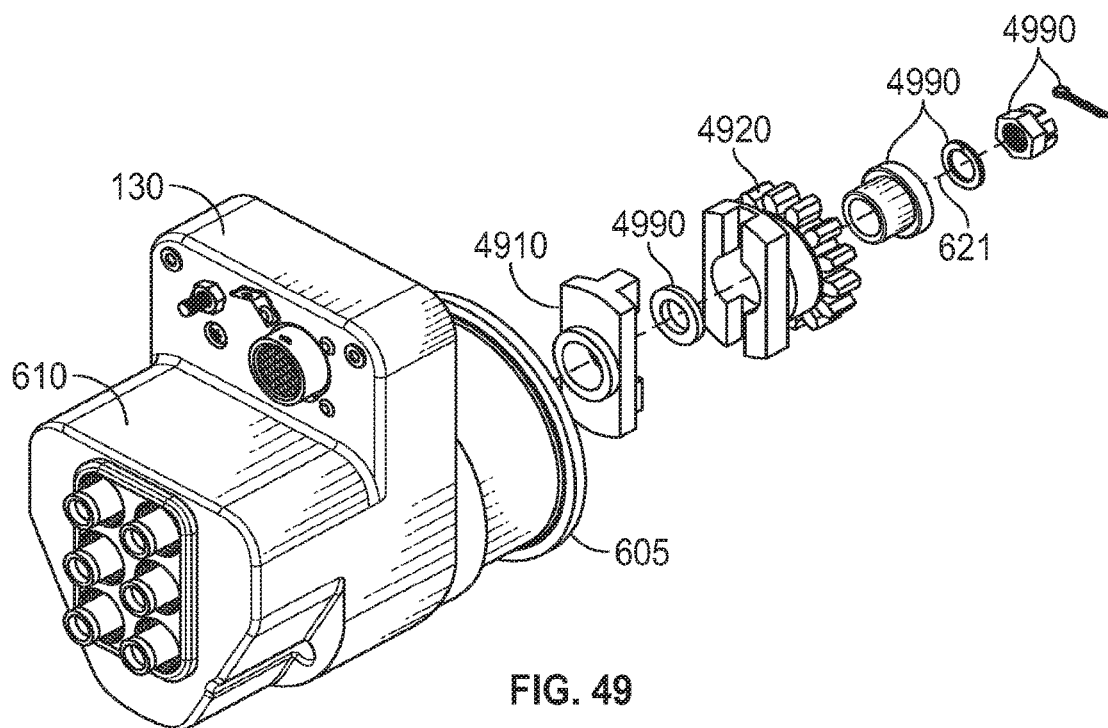
FIG. 49 is a partially exploded view of the EEC of FIG. 48 showing hardware for connection with a greater portion of the engine of FIG. 44.

As shown in FIG. 49, the drive shaft 620 of the EEC 130 can mount to the engine 100 by any one of several exemplary drive coupling structures shown, each of which can be aligned along the axis 621. In some aspects, a "dog drive" 4910 can interface with a gear 4920 to translate rotation of the output shaft from the engine 100 into rotation of the drive shaft 620. In some aspects, one or more of the fasteners 4990 can be used to secure either of the dog drive 4910 or the gear 4920 to the drive shaft 620 or each other. The fasteners 4990 can comprise, for example and without limitation, a plain washer, a spring washer, a flanged bushing, and a castle nut with a cotter pin. In some aspects, depending on the engine 100 and its configuration, the aforementioned connecting parts are not required.

Figure 50:
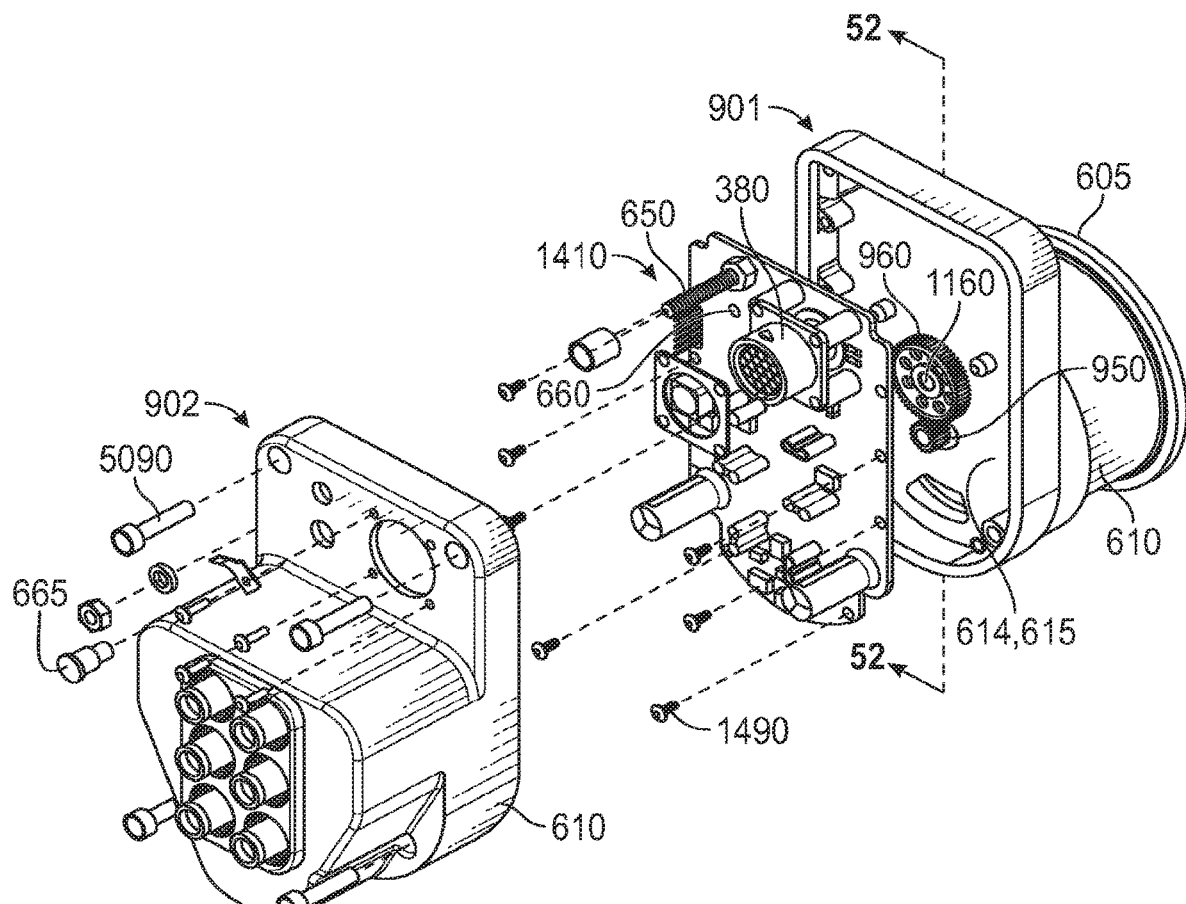
FIG. 50 is a partially exploded view of the EEC of FIG. 48 showing internal components of a first portion of the EEC.

As shown in FIG. 50, the first portion 901 of the body 610 can be joined to the second portion 902 of the body 610 with fasteners 5090. The control board 1410, which can be positioned or received within the cavity 614 defined within the first portion 901, can incorporate the desired features of and eliminate any need for the aforementioned regulator-rectifier board 1550 (shown in FIG. 15). The connection hub 380, the P-lead connection 650, and the visual indicator 660 can be mounted to a first side of the control board 1410, which can be mounted to the body 610 with fasteners 1490. The control board 1410 can receive a connector gasket (not shown) and a P-lead stud insulating spacer. The light pipe or lens 665 can be mounted "above" or axially outward from the visual indicator 660 with an adhesive such as, for example and without limitation, a thermoplastic adhesive. The chip 1110, while not shown in FIG. 50, can be aligned with the axis 971 (shown in FIG. 52) extending through the position magnet 1160 of the timing gear 960 and positioned on a second side of the control board 1410 and axially adjacent to the position magnet 1160, as the position magnet or at least a representation thereof as shown in FIG. 11 is positioned directly adjacent to the position magnet 1160. A combination of tight tolerance holes and slots—the holes determining a common reference point—can ensure that the chip 1110 is located directly over the position magnet 1160 of the timing gear 960. The first portion 901 and the second portion 902 of the body 610 can be joined with an adhesive material such as, for example and without limitation, RTV silicone sealant.

Figure 51:
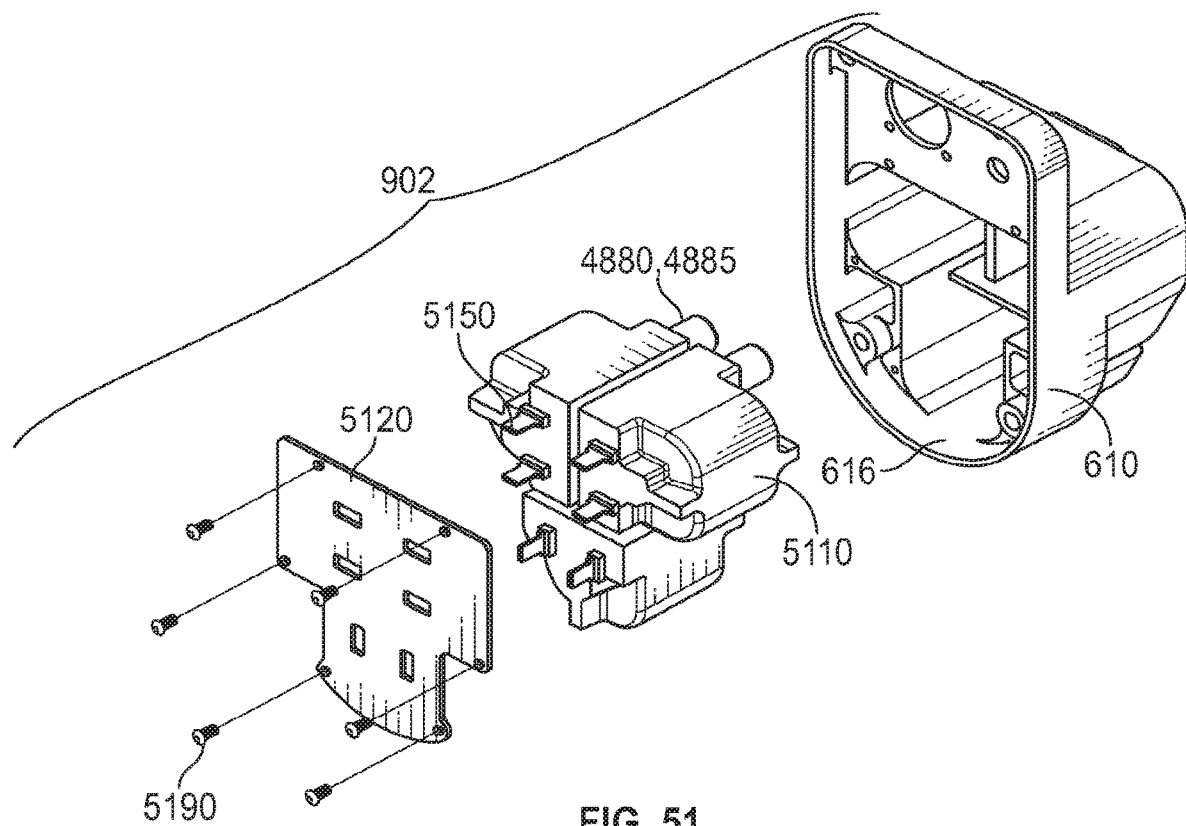
FIG. 51 is a partially exploded view of the EEC of FIG. 48 showing internal components of a second portion of the EEC.

As shown in FIG. 51, the coil pack 4880 can comprise a body 5110 comprising blades 5150 for connecting with an output of the charge circuit electrical schematic 3800 shown in FIG. 38. Adjacent to and covering or shielding the body 5110 except at the terminals 5150 can be a shield 5120. The shield 5120 can be formed from aluminum and can be configured to protect the control board 1410 (shown in FIG. 50) from spurious electromagnetic interference (EMI) generated by ignition events. The shield 5120 can be secured to the body 5110 with fasteners 5190 and can be replaceable. As shown; each of the elements of the coil pack 4880 can be positioned or received within a cavity 616 defined by the body 610. The coils pack 4880 can be set and secured into the body 610 with an adhesive material such as, for example and without limitation, RTV silicone sealant. The blades 5150 can be inserted directly into the control board 1410 with the shield 5120 positioned sandwiched in between, which can also help ensure alignment of the blades 5150.

As shown in FIG. 52, the timing gear can operate without the shaft 970 (shown in FIG. 9) and can instead rotate about the axis 971 with the aid of a bearing 1060, which as shown can be a ball bearing, fit around a protruding portion or boss of the timing gear 960 on the one side and fit within an opening defined in the body 610 on the other side. A rotor 5210 can rotate within the coil 930, which can be a stator of the permanent magnet generator and, more specifically, a permanent magnet alternator as shown. The coil 930 can be set and secured into the body 610 with an adhesive material such as, for example and without limitation, RTV silicone sealant. The gears 950,960 can be formed from any suitable materials. In some aspects, the drive gear 950 can be formed from a polyamide such as NYLON brand polyamide and the timing gear 960 can be formed from a metal such as aluminum. Where the drive gear 950 is slid onto the drive shaft 620; the drive shaft 620 can be knurled.

Figure 53:
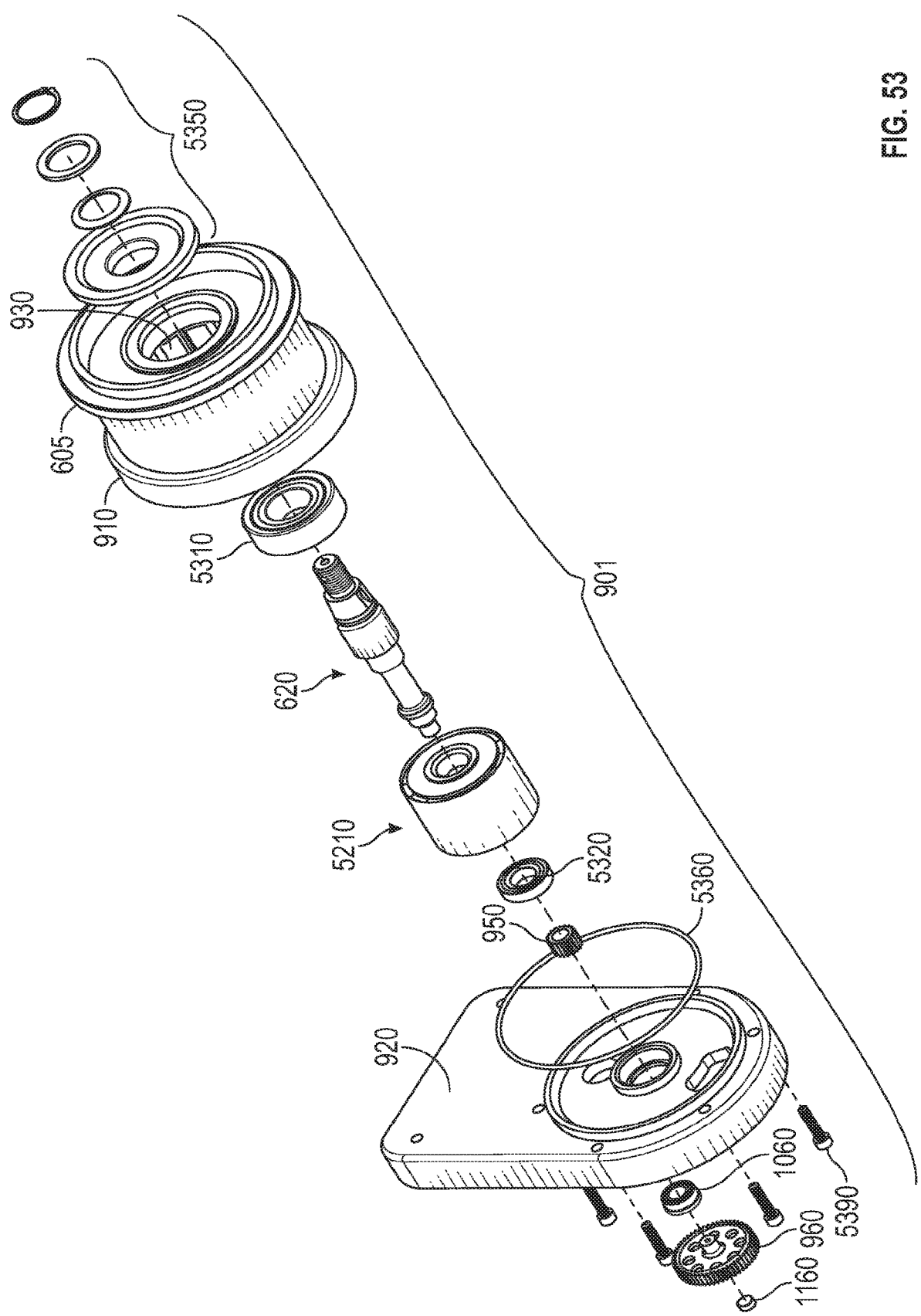
FIG. 53 is an exploded view of the first portion of the EEC of FIG. 48 showing internal components of the first portion of the EEC.

As shown in FIG. 53, the first portion 901 can further comprise bearings 5310,5320 for supporting and facilitating smooth rotation of the drive shaft 620. A gasket can be positioned between and seal between the first end 910 of the body 610 and the second end 920 of the body 610. Fasteners 5390 can secure the first end 910 to the second end 920. An end cover 5350 can comprise fasteners such as a retaining ring shown. The drive shaft 620, the rotor 5210, the bearing 5310,5320, and other components can be press fit in place.

Figure 54:
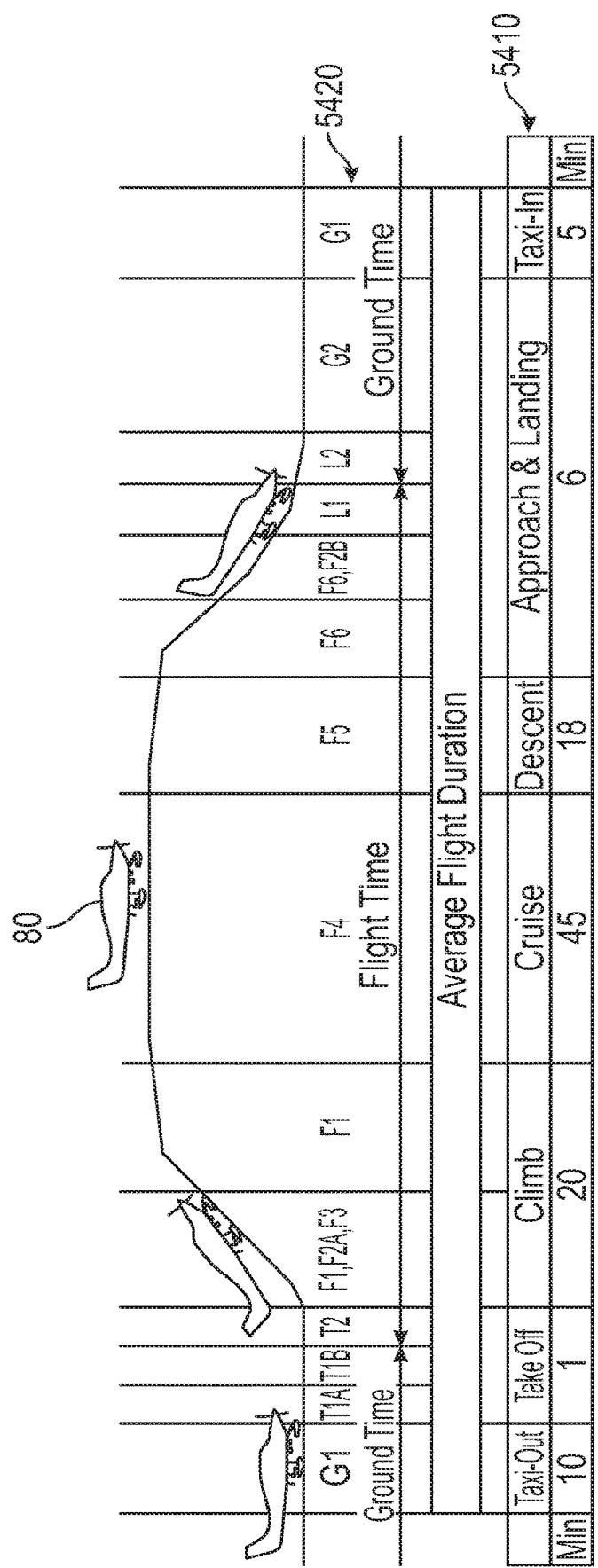
FIG. 54 is a diagram showing the typical phases of operation of an aircraft.

As shown in FIG. 54, a vehicle such as the aircraft 80 can experience a variety of loads and associated conditions during a typical flight. As shown; flight stages 5410 can include taxi-out, take off, climb; cruise, descent, approach and landing; and taxi-in. Also as shown, flight sub-stages 5420 can include the defined-below G1, T1A, T1B, T2, F1, F2A, F3, F1, F4, F5, F6, F2B, L1, L2, G2, and, again, G1 flight sub-stages. The taxi-out major stage 5410 can comprise minor flight stage G1, which can include start-up of the aircraft, start-up of the engine, and roll. The take off major stage 5410 can comprise minor flight stages T1A, T1B, and T2; which can comprise a take-off roll before a decision speed V at which the pilot has committed to take off, a take-off roll after the decision speed V, and take off after rotation of the aircraft 80, respectively. The climb major stage 5410 can comprise minor flight stages F1, F2A, and F3; which together can comprise initial climb without any configuration, (landing) gear up and "clean up" (retraction of not only the gear but also any other retractable devices such as wing flaps not required in the respective sub-stage), and continued climb. The cruise major stage 5410 can comprise minor flight stage F4, which can comprise cruise flight. The descent major stage 5410 can include the minor flight stage F5, which can include deceleration and descent of the aircraft 80. The approach and landing major stage 5410 can comprise minor flight stages F6, F2B, L1, L2, and G2; which can comprise approach, gear down, landing flare (before touch down, i.e., before the wheels are on the ground), ground roll (after touch down, i.e., after the wheels are on the ground), and braking (i.e., roll-out). The taxi-in major stage 5410 can again include the taxi-in sub-stage G1. Each of the EECs 130 can vary the timing to match appropriately each of the flight stages and sub-stages in a way that if performed manually would place an additional burden on the pilot(s) and would in some cases be difficult to achieve the same fuel-efficient flight as with the engine 100 comprising the EECs 130 disclosed herein.

A method of installing the ignition system 120 can comprise installing the switch 2800 and, for safety, a two amp (2 A) breaker on each channel. The method can comprise installing sensors and a low voltage harness such as the wiring harness 400. The method can comprise installing the EECs 130 on the engine 100. The method can comprise rotating the engine 100 to cylinder number one full advance for the particular desired configuration of the engine 100. For safety, the method can comprise disconnecting any coil packs 180 during installation. The method can comprise ensuring that the proper drive hardware is installed on the EEC drive shaft 620. The method can comprise connecting to the P-lead connection 650 and to ground on the 19-pin connector using the blade terminal (e.g., the ground terminal 4870) on the EEC 130. The method can comprise turning on master aircraft power. The method can comprise turning the ignition switch 2800 to BOTH. The method can comprise illuminating the visual indicator 660, which can create a "halo" light, for 1 second to test the visual indicator 660, after which time the light should extinguish. The method can comprise rotating the drive shaft 620 to the cylinder number one full advance position, at which point the visual indicator 660 can be made to illuminate. To eliminate backlash in the gears of the system, the method can comprise staking the EEC 130 and rotating counter to (i.e., opposite to) the drive rotation until the visual indicator 660 illuminates. The method can comprise locking the EEC 130 in position with standard flange clamps. At least where the coil pack 180 is not incorporated into the EEC 130, the method can comprise connecting the coil pack 180 to the EEC 130. In some aspects, the coil pack 180 can be configured to be energized above 50 rpm.

While the aforementioned magneto can comprise a stud defining the P-lead connection, such a P-lead connection cannot serve the functions that is serves on the EEC 130. Embodied in the EEC 130, the P-lead connection can supply or cut power to the engine 100 and can also test the independent power source of the EEC 130 without a need for separate hardware.

Because the P-lead is built into the EEC 130, the steps above can be accomplished after the engine 100 is assembled and installed into an aircraft and without separate hardware. Pre-flight testing on the ignition system in effect tests not only the operation of the EEC 130 itself but also the independent power supply contained therein. Because the design and operation of the disclosed EEC 130 requires no changes to the design of the engine 100 itself, outside of the new ignition switch and associated wiring, the disclosed EEC 130 and associated hardware including the new ignition switch can be a drop-in replacement for a magneto system.

The engine 100 can be and typically is dual-plugged (i.e., having more than one spark plug per chamber). The engine 100 can use waste spark operation, in which case upon the firing of a fuel igniting device 190 in a combustion chamber at a point proximate to maximum compression of the fuel-air mixture, a second fuel igniting device 190 in a second combustion chamber is also delivered a spark-producing charge.

In one exemplary aspect, an internal combustion engine can comprise a crankshaft configured to drive a propeller; a camshaft coupled to the crankshaft; and an ignition controller coupled to the camshaft and comprising a visual indicator, the visual indicator configured to produce a visual signal at a predetermined angular position of the engine. The ignition controller can comprise a permanent magnet generator. The visual indicator can extend around the perimeter of an end of the ignition controller. The visual indicator can comprise a light-emitting diode. The predetermined angular position of the engine can be a full advance position of a number one cylinder of the engine.

In another exemplary aspect, an ignition controller for an internal combustion engine can comprise a housing; and a visual indicator extending around the perimeter of an end of the housing, the visual indicator configured to produce a visual signal at a predetermined angular position of the engine. The predetermined angular position of the engine can be a top dead center position of a number one cylinder of the engine.

A method of timing an internal combustion engine can comprise: rotating the crankshaft to a predetermined angular position of the engine; rotating an ignition controller of the engine with respect to the engine; and activating a visual indicator 660 of the ignition controller when a drive shaft of the ignition controller reaches the predetermined angular position of the engine. The method can further comprise attaching the ignition controller to the engine. The method can further comprise securing the ignition controller to the engine after the ignition controller reaches the predetermined angular position of the engine. The predetermined angular position of the engine can be the top dead center position of a number one cylinder of the engine.

An internal combustion engine for an aircraft can comprise a crankshaft configured to drive a propeller; a camshaft coupled to the crankshaft; and an ignition controller coupled to the camshaft and comprising a P-lead connection, the ignition controller able to selectively supply or cut main electrical power from the engine via the P-lead connection, the ignition controller also able to selectively supply its own power. The ignition controller can comprise a permanent magnet generator. The P-lead connection can extend from an end of the ignition controller.

An ignition controller for an internal combustion engine, the controller comprising: a housing; and a P-lead connection extending from the housing, the controller able to selectively supply or cut main electrical power from the engine via the P-lead connection, the ignition controller also able to selectively supply its own power. The ignition controller can comprise a permanent magnet generator. The P-lead connection can extend from an end of the ignition controller.

In one exemplary aspect, a method of using an ignition system in an internal combustion engine can comprise supplying power to an ignition controller of the system via a P-lead connection of the ignition controller as long as the P-lead voltage is higher than a one of a voltage of an independent power supply of the ignition controller or a cut-off voltage of the ignition controller; and automatically switching to the independent power supply of the ignition controller when the P-lead voltage is at or below the cut-off voltage.

In a further exemplary aspect, the ignition controller can comprise a permanent magnet generator.

In one exemplary aspect, an internal combustion engine for an aircraft can comprise: a crankshaft configured to drive a propeller; a camshaft coupled to the crankshaft; and an ignition system comprising an ignition controller coupled to the camshaft and comprising a P-lead connection, the ignition system able to switch electrical power from the engine via the P-lead connection, the ignition controller also able to selectively supply its own power. In a further exemplary aspect, the ignition controller can be an electronic engine controller and the electronic engine controller can comprise a permanent magnet generator. In a further exemplary aspect, the P-lead connection can extend from an end of the ignition controller.

In another exemplary aspect, an ignition controller for an internal combustion engine can comprise: a housing; and a P-lead connection extending from the housing, the ignition controller configured to selectively supply or cut main electrical power from the engine via the P-lead connection, the ignition controller also configured to selectively supply its own power. In a further exemplary aspect, the P-lead connection extends from an end of the ignition controller.

In another exemplary aspect, a method of using an ignition system in an internal combustion engine of an aircraft can comprise: supplying power to an ignition controller of the system via an independent power supply of the ignition controller as long as a voltage of an independent power supply of the ignition controller is higher than a P-lead voltage; and automatically switching to supply power to the ignition controller via a P-lead connection when the voltage of the independent power supply of the ignition controller is below the P-lead voltage.

In another exemplary aspect, a method of testing a pair of electronic engine controllers in an internal combustion engine of an aircraft can comprise: grounding a P-lead connection of a first electronic engine controller of the pair of electronic engine controllers while opening a P-lead connection to a second electronic engine controller of the pair of electronic engine controllers; checking for normal operation of the second electronic engine controller while the P-lead connection of the first electronic engine controller is grounded and while the P-lead connection of the second electronic engine controller is open; grounding the P-lead connection of the second electronic engine controller while opening the P-lead connection to the first electronic engine controller; and checking for normal operation of the first electronic engine controller while the P-lead connection of the second electronic engine controller is grounded and while the P-lead connection of the first electronic engine controller is open. In a further exemplary aspect, grounding the P-lead connection of the first electronic engine controller and grounding the P-lead connection of the second electronic engine controller can be accomplished by activating a switch in a cockpit of the aircraft.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A method of timing an internal combustion engine of an aircraft, the method comprising:
    rotating a crankshaft of the engine to a predetermined angular position of the engine, the predetermined angular position of the engine being a one of a full advance and a top dead center position of a number one cylinder of the engine;
    rotating an ignition controller of the engine with respect to the engine, the ignition controller being an electronic engine controller, the electronic engine controller comprising a permanent magnet generator;
    activating a visual indicator of the ignition controller when a drive shaft of the ignition controller reaches an angular position that corresponds to the predetermined angular position of the engine; and
    securing the ignition controller to the engine after the ignition controller reaches the predetermined angular position of the engine.

2. The method of claim 1, wherein the permanent magnet generator is a permanent magnet alternator configured to produce an alternating current.

3. The method of claim 1, wherein the permanent magnet generator comprises a drive shaft, a drive gear coupled to the drive shaft, and a timing gear in mechanical communication with the drive gear; the timing gear comprising a position magnet fixed with respect to the timing gear and an application-specific integrated circuit (ASIC) positioned inside the controller proximate to the position magnet, the method further comprising monitoring the angular position of the position magnet with the ASIC.

4. The method of claim 3, wherein monitoring the angular position of the position magnet comprises monitoring an A output, a B output, and an index output from a quadrature encoder interface (QEI) of the ASIC and wherein activating a visual indicator of the ignition controller comprises the index output of the QEI reaching a high value.

* * * * *